United States Patent
Hedlund et al.

(10) Patent No.: US 12,397,878 B2
(45) Date of Patent: Aug. 26, 2025

(54) SYSTEMS AND METHODS OF ADJUSTABLE SUSPENSIONS FOR OFF-ROAD RECREATIONAL VEHICLES

(71) Applicant: Polaris Industries Inc., Medina, MN (US)

(72) Inventors: Michael A. Hedlund, Roseau, MN (US); Trevor F. Rhodes, Badger, MN (US); Jonathon P. Graus, Stacy, MN (US); Kyle W. Olson, Coon Rapids, MN (US); Justin T. Anderson, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 483 days.

(21) Appl. No.: 17/325,062

(22) Filed: May 19, 2021

(65) Prior Publication Data

US 2021/0362806 A1    Nov. 25, 2021

Related U.S. Application Data

(60) Provisional application No. 63/027,833, filed on May 20, 2020.

(51) Int. Cl.
| | | |
|---|---|---|
| *B60G 17/019* | (2006.01) | |
| *B60G 17/015* | (2006.01) | |
| *B62M 27/02* | (2006.01) | |

(52) U.S. Cl.
CPC .......... *B62M 27/02* (2013.01); *B60G 17/015* (2013.01); *B60G 2300/322* (2013.01); *B60G 2500/10* (2013.01); *B60G 2600/02* (2013.01); *B62M 2027/025* (2013.01); *B62M 2027/026* (2013.01); *B62M 2027/028* (2013.01)

(58) Field of Classification Search
CPC ................ B60G 17/019; B60G 17/015; B60G 2300/322; B60G 2500/10; B60W 10/22; B60W 30/045; B62M 27/02; B62M 2027/025; B62M 2027/026; B62M 2027/028

See application file for complete search history.

(56) References Cited

U.S. PATENT DOCUMENTS

| | | |
|---|---|---|
| 3,013,442 A | 12/1961 | Fox et al. |
| 3,623,565 A | 11/1971 | Ward et al. |
| 3,737,001 A | 6/1973 | Rasenberger |

(Continued)

FOREIGN PATENT DOCUMENTS

| | | |
|---|---|---|
| AU | 2012323853 A1 | 5/2014 |
| AU | 2015328248 A1 | 5/2017 |

(Continued)

OTHER PUBLICATIONS

Ackermann et al., "Robust steering control for active rollover avoidance of vehicles with elevated center of gravity", Jul. 1998, pp. 1-6.

(Continued)

*Primary Examiner* — Gonzalo Laguarda

(57) ABSTRACT

A damping control system is provided for an off-road recreational vehicles having a suspension located between a ground engaging member and a vehicle frame and including at least one adjustable shock absorber having an adjustable damping characteristic based on an input from a sensor.

33 Claims, 46 Drawing Sheets

(56) References Cited

U.S. PATENT DOCUMENTS

| | | |
|---|---|---|
| 3,760,246 A | 9/1973 | Wright et al. |
| 3,861,229 A | 1/1975 | Domaas |
| 3,933,213 A | 1/1976 | Trowbridge |
| 3,952,829 A | 4/1976 | Gray |
| 3,982,446 A | 9/1976 | Van Dyken |
| 4,075,841 A | 2/1978 | Hamma et al. |
| 4,112,885 A | 9/1978 | Iwata et al. |
| 4,116,006 A | 9/1978 | Wallis |
| 4,319,658 A | 3/1982 | Collonia et al. |
| 4,327,948 A | 5/1982 | Beck et al. |
| 4,340,126 A | 7/1982 | Larson |
| 4,453,516 A | 6/1984 | Filsinger |
| 4,462,480 A | 7/1984 | Yasui et al. |
| 4,508,078 A | 4/1985 | Takeuchi et al. |
| 4,580,537 A | 4/1986 | Uchiyama |
| 4,600,215 A | 7/1986 | Kuroki et al. |
| 4,620,602 A | 11/1986 | Capriotti |
| 4,658,662 A | 4/1987 | Rundle |
| 4,671,235 A | 6/1987 | Hosaka |
| 4,681,292 A * | 7/1987 | Thomas ............ B62J 1/02 267/132 |
| 4,688,533 A | 8/1987 | Otobe |
| 4,691,676 A | 9/1987 | Kikuchi |
| 4,691,677 A | 9/1987 | Hotate et al. |
| 4,722,548 A | 2/1988 | Hamilton et al. |
| 4,741,554 A | 5/1988 | Okamoto |
| 4,749,210 A | 6/1988 | Sugasawa |
| 4,759,329 A | 7/1988 | Nobuo et al. |
| 4,765,296 A | 8/1988 | Ishikawa et al. |
| 4,770,438 A | 9/1988 | Sugasawa et al. |
| 4,779,895 A | 10/1988 | Rubel |
| 4,781,162 A | 11/1988 | Ishikawa et al. |
| 4,785,782 A | 11/1988 | Tanaka et al. |
| 4,787,353 A | 11/1988 | Ishikawa et al. |
| 4,805,923 A | 2/1989 | Soltis |
| 4,809,179 A | 2/1989 | Klingler et al. |
| 4,809,659 A | 3/1989 | Tamaki et al. |
| 4,817,466 A | 4/1989 | Kawamura et al. |
| 4,819,174 A | 4/1989 | Furuno et al. |
| 4,826,205 A | 5/1989 | Kouda et al. |
| 4,827,416 A | 5/1989 | Kawagoe et al. |
| 4,831,533 A | 5/1989 | Skoeldheden |
| 4,838,780 A | 6/1989 | Yamagata et al. |
| 4,856,477 A | 8/1989 | Hanaoka et al. |
| 4,860,708 A | 8/1989 | Yamaguchi et al. |
| 4,862,854 A | 9/1989 | Oda et al. |
| 4,867,474 A | 9/1989 | Smith |
| 4,881,428 A | 11/1989 | Ishikawa et al. |
| 4,893,501 A | 1/1990 | Sogawa |
| 4,895,343 A | 1/1990 | Sato |
| 4,898,137 A | 2/1990 | Fujita et al. |
| 4,898,138 A | 2/1990 | Nishimura et al. |
| 4,901,695 A | 2/1990 | Kabasin et al. |
| 4,903,983 A | 2/1990 | Fukushima et al. |
| 4,905,783 A | 3/1990 | Bober |
| 4,913,006 A | 4/1990 | Tsuyama et al. |
| 4,919,097 A | 4/1990 | Mitui et al. |
| 4,926,636 A | 5/1990 | Tadokoro et al. |
| 4,927,170 A | 5/1990 | Wada |
| 4,930,082 A | 5/1990 | Harara et al. |
| 4,934,667 A | 6/1990 | Pees et al. |
| 4,949,262 A | 8/1990 | Buma et al. |
| 4,949,989 A | 8/1990 | Kakizaki et al. |
| 4,961,146 A | 10/1990 | Kajiwara |
| 4,966,247 A | 10/1990 | Masuda |
| 4,969,695 A | 11/1990 | Maehata et al. |
| 5,000,278 A | 3/1991 | Morishita |
| 5,002,028 A | 3/1991 | Arai et al. |
| 5,002,148 A | 3/1991 | Miyake et al. |
| 5,015,009 A | 5/1991 | Ohyama et al. |
| 5,018,408 A | 5/1991 | Bota et al. |
| 5,024,460 A | 6/1991 | Hanson et al. |
| 5,029,328 A | 7/1991 | Kamimura et al. |
| 5,033,328 A | 7/1991 | Shimanaka |
| 5,036,939 A | 8/1991 | Johnson et al. |
| 5,037,128 A | 8/1991 | Okuyama et al. |
| 5,040,114 A | 8/1991 | Ishikawa et al. |
| 5,054,813 A | 10/1991 | Kakizaki |
| 5,060,744 A | 10/1991 | Katoh et al. |
| 5,062,657 A | 11/1991 | Majeed |
| 5,071,157 A | 12/1991 | Majeed |
| 5,071,158 A | 12/1991 | Yonekawa et al. |
| 5,076,385 A | 12/1991 | Terazawa et al. |
| 5,078,109 A | 1/1992 | Yoshida et al. |
| 5,080,392 A | 1/1992 | Bazergui |
| 5,083,811 A | 1/1992 | Sato et al. |
| 5,088,464 A | 2/1992 | Meaney |
| 5,090,728 A | 2/1992 | Yokoya et al. |
| 5,092,298 A | 3/1992 | Suzuki et al. |
| 5,092,624 A | 3/1992 | Fukuyama et al. |
| 5,096,219 A | 3/1992 | Hanson et al. |
| 5,105,923 A | 4/1992 | Iizuka |
| 5,113,345 A | 5/1992 | Mine et al. |
| 5,113,821 A | 5/1992 | Fukui et al. |
| 5,114,177 A | 5/1992 | Fukunaga et al. |
| 5,129,475 A | 7/1992 | Kawano et al. |
| 5,134,566 A | 7/1992 | Yokoya et al. |
| 5,144,559 A | 9/1992 | Kamimura et al. |
| 5,150,635 A | 9/1992 | Minowa et al. |
| 5,163,538 A | 11/1992 | Derr et al. |
| 5,170,343 A | 12/1992 | Matsuda |
| 5,174,263 A | 12/1992 | Meaney |
| 5,189,615 A | 2/1993 | Rubel et al. |
| 5,218,540 A | 6/1993 | Ishikawa et al. |
| 5,233,530 A | 8/1993 | Shimada et al. |
| 5,253,728 A | 10/1993 | Matsuno et al. |
| 5,265,693 A | 11/1993 | Rees et al. |
| 5,307,777 A | 5/1994 | Sasajima et al. |
| 5,314,362 A | 5/1994 | Nagahora |
| 5,315,295 A | 5/1994 | Fujii |
| 5,337,239 A | 8/1994 | Okuda |
| 5,342,023 A | 8/1994 | Kuriki et al. |
| 5,343,396 A | 8/1994 | Youngblood |
| 5,343,780 A | 9/1994 | McDaniel et al. |
| 5,350,187 A | 9/1994 | Shinozaki |
| 5,361,209 A | 11/1994 | Tsutsumi |
| 5,361,213 A | 11/1994 | Fujieda et al. |
| 5,362,094 A | 11/1994 | Jensen |
| 5,366,236 A | 11/1994 | Kuriki et al. |
| 5,375,872 A | 12/1994 | Ohtagaki et al. |
| 5,377,107 A | 12/1994 | Shimizu et al. |
| 5,383,680 A | 1/1995 | Bock et al. |
| 5,384,705 A | 1/1995 | Inagaki et al. |
| 5,390,121 A | 2/1995 | Wolfe |
| 5,391,127 A | 2/1995 | Nishimura |
| RE34,906 E | 4/1995 | Tamaki et al. |
| 5,406,920 A | 4/1995 | Murata et al. |
| 5,413,540 A | 5/1995 | Streib et al. |
| 5,443,558 A | 8/1995 | Ibaraki et al. |
| 5,444,621 A | 8/1995 | Matsunaga et al. |
| 5,446,663 A | 8/1995 | Sasaki et al. |
| 5,467,751 A | 11/1995 | Kumagai |
| 5,475,593 A | 12/1995 | Townend |
| 5,475,596 A | 12/1995 | Henry et al. |
| 5,483,448 A | 1/1996 | Liubakka et al. |
| 5,485,161 A | 1/1996 | Vaughn |
| 5,487,006 A | 1/1996 | Kakizaki et al. |
| 5,490,487 A | 2/1996 | Kato et al. |
| 5,510,985 A | 4/1996 | Yamaoka et al. |
| 5,514,049 A | 5/1996 | Kamio et al. |
| 5,515,273 A | 5/1996 | Sasaki et al. |
| 5,521,825 A | 5/1996 | Unuvar et al. |
| 5,524,724 A | 6/1996 | Nishigaki et al. |
| 5,550,739 A | 8/1996 | Hoffmann et al. |
| 5,555,499 A | 9/1996 | Yamashita et al. |
| 5,575,737 A | 11/1996 | Weiss |
| 5,586,032 A | 12/1996 | Kallenbach et al. |
| 5,611,309 A | 3/1997 | Kumagai et al. |
| 5,632,503 A | 5/1997 | Raad et al. |
| 5,645,033 A | 7/1997 | Person et al. |
| 5,678,847 A | 10/1997 | Izawa et al. |
| 5,713,428 A | 2/1998 | Linden et al. |
| 5,749,596 A | 5/1998 | Jensen et al. |
| 5,774,820 A | 6/1998 | Linden et al. |

(56) References Cited

U.S. PATENT DOCUMENTS

| | | |
|---|---|---|
| 5,832,398 A | 11/1998 | Sasaki et al. |
| 5,845,726 A | 12/1998 | Kikkawa et al. |
| 5,873,802 A | 2/1999 | Tabata et al. |
| 5,880,532 A | 3/1999 | Stopher |
| 5,890,870 A | 4/1999 | Berger et al. |
| 5,897,287 A | 4/1999 | Berger et al. |
| 5,921,889 A | 7/1999 | Nozaki et al. |
| 5,922,038 A | 7/1999 | Horiuchi et al. |
| 5,938,556 A | 8/1999 | Lowell |
| 5,957,992 A | 9/1999 | Kiyono |
| 5,992,558 A | 11/1999 | Noro et al. |
| 6,000,702 A | 12/1999 | Streiter |
| 6,002,975 A | 12/1999 | Schiffmann et al. |
| 6,016,795 A | 1/2000 | Ohki |
| 6,019,085 A | 2/2000 | Sato et al. |
| 6,032,752 A | 3/2000 | Karpik et al. |
| 6,038,500 A | 3/2000 | Weiss |
| 6,070,681 A | 6/2000 | Catanzarite et al. |
| 6,073,072 A | 6/2000 | Ishii et al. |
| 6,073,074 A | 6/2000 | Saito et al. |
| 6,076,027 A | 6/2000 | Raad et al. |
| 6,078,252 A | 6/2000 | Kulczycki et al. |
| 6,086,510 A | 7/2000 | Kadota |
| 6,094,614 A | 7/2000 | Hiwatashi |
| 6,112,866 A | 9/2000 | Boichot et al. |
| 6,120,399 A | 9/2000 | Okeson et al. |
| 6,122,568 A | 9/2000 | Madau et al. |
| 6,124,826 A | 9/2000 | Garthwaite et al. |
| 6,125,326 A | 9/2000 | Ohmura et al. |
| 6,125,782 A | 10/2000 | Takashima et al. |
| 6,134,499 A | 10/2000 | Goode et al. |
| 6,138,069 A | 10/2000 | Ellertson et al. |
| 6,148,252 A | 11/2000 | Iwasaki et al. |
| 6,154,703 A | 11/2000 | Nakai et al. |
| 6,155,545 A | 12/2000 | Noro et al. |
| 6,157,297 A | 12/2000 | Nakai |
| 6,157,890 A | 12/2000 | Nakai et al. |
| 6,161,908 A | 12/2000 | Takayama et al. |
| 6,167,341 A | 12/2000 | Gourmelen et al. |
| 6,170,923 B1 | 1/2001 | Iguchi et al. |
| 6,176,796 B1 | 1/2001 | Lislegard |
| 6,178,371 B1 | 1/2001 | Light et al. |
| 6,181,997 B1 | 1/2001 | Badenoch et al. |
| 6,192,305 B1 | 2/2001 | Schiffmann |
| 6,206,124 B1 | 3/2001 | Mallette et al. |
| 6,217,480 B1 | 4/2001 | Iwata et al. |
| 6,226,389 B1 | 5/2001 | Lemelson et al. |
| 6,240,365 B1 | 5/2001 | Bunn |
| 6,244,398 B1 | 6/2001 | Girvin et al. |
| 6,244,986 B1 | 6/2001 | Mori et al. |
| 6,249,728 B1 | 6/2001 | Streiter |
| 6,249,744 B1 | 6/2001 | Morita |
| 6,254,108 B1 | 7/2001 | Germain et al. |
| 6,260,650 B1 | 7/2001 | Gustavsson |
| 6,263,858 B1 | 7/2001 | Pursifull et al. |
| 6,275,763 B1 | 8/2001 | Lotito et al. |
| 6,276,333 B1 | 8/2001 | Kazama et al. |
| 6,288,534 B1 | 9/2001 | Starkweather et al. |
| 6,290,034 B1 | 9/2001 | Ichimaru |
| 6,318,337 B1 | 11/2001 | Pursifull |
| 6,318,490 B1 | 11/2001 | Laning |
| 6,343,248 B1 | 1/2002 | Rizzotto et al. |
| 6,351,704 B1 | 2/2002 | Koerner |
| 6,352,142 B1 | 3/2002 | Kim |
| 6,370,458 B1 | 4/2002 | Shal et al. |
| 6,370,472 B1 | 4/2002 | Fosseen |
| 6,371,884 B1 | 4/2002 | Channing |
| 6,379,114 B1 | 4/2002 | Schott et al. |
| 6,427,115 B1 | 7/2002 | Sekiyama |
| 6,456,908 B1 | 9/2002 | Kumar |
| 6,463,385 B1 | 10/2002 | Fry |
| 6,470,852 B1 | 10/2002 | Kanno |
| 6,476,714 B2 | 11/2002 | Mizuta |
| 6,483,201 B1 | 11/2002 | Klarer |
| 6,483,467 B2 | 11/2002 | Kushida et al. |
| 6,485,340 B1 | 11/2002 | Kolb et al. |
| 6,488,609 B1 | 12/2002 | Morimoto et al. |
| 6,502,025 B1 | 12/2002 | Kempen |
| 6,507,778 B2 | 1/2003 | Koh |
| 6,513,611 B2 | 2/2003 | Ito et al. |
| 6,526,342 B1 | 2/2003 | Burdock et al. |
| 6,551,153 B1 | 4/2003 | Hattori |
| 6,573,827 B1 | 6/2003 | McKenzie |
| 6,581,710 B2 | 6/2003 | Sprinkle et al. |
| 6,604,034 B1 | 8/2003 | Speck et al. |
| 6,644,318 B1 | 11/2003 | Adams et al. |
| 6,647,328 B2 | 11/2003 | Walker |
| 6,655,233 B2 | 12/2003 | Evans et al. |
| 6,657,539 B2 | 12/2003 | Yamamoto et al. |
| 6,675,577 B2 | 1/2004 | Evans |
| 6,684,140 B2 | 1/2004 | Lu |
| 6,685,174 B2 | 2/2004 | Behmenburg et al. |
| 6,699,085 B2 | 3/2004 | Hattori |
| 6,704,643 B1 | 3/2004 | Suhre et al. |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 | 5/2005 | Barton et al. |
| 6,895,518 B2 | 5/2005 | Wingen |
| 6,897,629 B2 | 5/2005 | Wilton et al. |
| 6,938,508 B1 | 9/2005 | Saagge |
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B2 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |

(56) References Cited

U.S. PATENT DOCUMENTS

| | | |
|---|---|---|
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,287,760 B1 | 10/2007 | Quick et al. |
| 7,305,295 B2 | 12/2007 | Bauerle et al. |
| 7,311,082 B2 | 12/2007 | Yokoi |
| 7,315,779 B1 | 1/2008 | Rioux et al. |
| 7,316,288 B1 | 1/2008 | Bennett et al. |
| 7,318,410 B2 | 1/2008 | Yokoi |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,204,666 B2 | 6/2012 | Takeuchi et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,359,149 B2 | 1/2013 | Shin |
| 8,374,748 B2 | 2/2013 | Jolly |
| 8,376,373 B2 | 2/2013 | Conradie |
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |

(56) References Cited

U.S. PATENT DOCUMENTS

| | | |
|---|---|---|
| 8,626,389 B2 | 1/2014 | Sidlosky |
| 8,641,052 B2 | 2/2014 | Kondo et al. |
| 8,645,024 B2 | 2/2014 | Daniels |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Yang |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 8,994,494 B2 | 3/2015 | Koenig et al. |
| 8,997,952 B2 | 4/2015 | Goetz |
| 9,010,768 B2 | 4/2015 | Kinsman et al. |
| 9,022,156 B2 | 5/2015 | Bedard |
| 9,027,937 B2 | 5/2015 | Ryan et al. |
| 9,038,791 B2 | 5/2015 | Marking |
| 9,123,249 B2 | 9/2015 | Braunberger et al. |
| 9,151,384 B2 | 10/2015 | Kohler et al. |
| 9,162,573 B2 | 10/2015 | Grajkowski et al. |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,327,789 B1 | 5/2016 | Vezina et al. |
| 9,365,251 B2 | 6/2016 | Safranski et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,028 B2 | 8/2016 | Hawksworth |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,643,616 B2 * | 5/2017 | Lu .................... B60W 30/045 |
| 9,662,954 B2 | 5/2017 | Scheuerell et al. |
| 9,665,418 B2 | 5/2017 | Arnott |
| 9,695,899 B2 | 7/2017 | Smith |
| 9,771,084 B2 | 9/2017 | Norstad |
| 9,802,621 B2 | 10/2017 | Gillingham et al. |
| 9,809,195 B2 | 11/2017 | Giese et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,920,810 B2 | 3/2018 | Smeljanskij |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,154,377 B2 | 12/2018 | Post et al. |
| 10,195,989 B2 | 2/2019 | Braunberger et al. |
| 10,202,159 B2 | 2/2019 | Braunberger et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,363,941 B2 | 7/2019 | Norstad |
| 10,384,682 B2 | 8/2019 | Braunberger et al. |
| 10,391,989 B2 | 8/2019 | Braunberger |
| 10,406,884 B2 | 9/2019 | Oakden-Graus et al. |
| 10,410,520 B2 | 9/2019 | Braunberger |
| 10,436,125 B2 | 10/2019 | Braunberger et al. |
| 10,578,184 B2 | 3/2020 | Gilbert |
| 10,704,640 B2 | 7/2020 | Galasso |
| 10,723,408 B2 | 7/2020 | Pelot |
| 10,731,724 B2 | 8/2020 | Laird |
| 10,774,896 B2 | 9/2020 | Hamers |
| 10,933,710 B2 | 3/2021 | Tong |
| 10,981,429 B2 | 4/2021 | Tsiaras |
| 11,001,120 B2 | 5/2021 | Cox |
| 11,110,913 B2 | 9/2021 | Krosschell et al. |
| 11,124,036 B2 | 9/2021 | Brady et al. |
| 11,148,748 B2 | 10/2021 | Galasso |
| 11,152,555 B2 | 10/2021 | Hiller |
| 11,162,555 B2 | 11/2021 | Haugen |
| 11,192,424 B2 | 12/2021 | Tabata |
| 11,235,634 B2 | 2/2022 | Lavallee |
| 11,279,198 B2 | 3/2022 | Marking |
| 11,285,964 B2 | 3/2022 | Norstad et al. |
| 11,306,798 B2 | 4/2022 | Cox |
| 11,351,834 B2 | 6/2022 | Cox |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox |
| 11,448,283 B2 | 9/2022 | Strickland |
| 11,472,252 B2 | 10/2022 | Tong |
| 11,479,075 B2 | 10/2022 | Graus et al. |
| 11,975,584 B2 | 5/2024 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0045977 A1 | 4/2002 | Uchiyama et al. |
| 2002/0082752 A1 | 6/2002 | Obradovich |
| 2002/0113185 A1 | 8/2002 | Ziegler |
| 2002/0115357 A1 | 8/2002 | Hiki et al. |
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |
| 2005/0027428 A1 | 2/2005 | Glora et al. |
| 2005/0045148 A1 | 3/2005 | Katsuragawa et al. |
| 2005/0077696 A1 | 4/2005 | Ogawa |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0178628 A1 | 8/2005 | Uchino et al. |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2005/0284446 A1 | 12/2005 | Okuyama |

(56) References Cited

U.S. PATENT DOCUMENTS

| | | |
|---|---|---|
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1 | 12/2006 | Takamatsu et al. |
| 2006/0284387 A1 | 12/2006 | Klees |
| 2007/0007742 A1 | 1/2007 | Allen |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0227796 A1 | 10/2007 | Simmons et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1 | 11/2007 | Langer |
| 2007/0271026 A1 | 11/2007 | Hijikata |
| 2007/0294008 A1 | 12/2007 | Yasui et al. |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1 | 5/2008 | Hrovat et al. |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1 | 1/2009 | Germain |
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |
| 2009/0095254 A1 | 4/2009 | Yamada |
| 2009/0096598 A1 | 4/2009 | Tengler et al. |
| 2009/0108546 A1 | 4/2009 | Ohletz et al. |
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | McIntyre |
| 2009/0287392 A1 | 11/2009 | Thomas |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | MacKenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |

(56) References Cited

U.S. PATENT DOCUMENTS

| | | |
|---|---|---|
| 2012/0191302 A1 | 7/2012 | Sternecker et al. |
| 2012/0222908 A1 | 9/2012 | Mangum |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1 | 8/2014 | Oshita |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0353934 A1 | 12/2014 | Yabumoto |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0084290 A1 | 3/2015 | Norton et al. |
| 2015/0217778 A1 | 8/2015 | Fairgrieve et al. |
| 2015/0329141 A1 | 11/2015 | Preijert |
| 2015/0352920 A1 | 12/2015 | Lakehal-Ayat et al. |
| 2016/0059660 A1 | 3/2016 | Brady et al. |
| 2016/0107498 A1 | 4/2016 | Yamazaki |
| 2016/0121689 A1 | 5/2016 | Park et al. |
| 2016/0121905 A1 | 5/2016 | Gillingham et al. |
| 2016/0121924 A1 | 5/2016 | Norstad |
| 2016/0153516 A1 | 6/2016 | Marking |
| 2016/0200164 A1 | 7/2016 | Tabata |
| 2016/0214455 A1 | 7/2016 | Reul et al. |
| 2016/0280331 A1 | 9/2016 | Mangum |
| 2016/0347142 A1 | 12/2016 | Seong et al. |
| 2017/0008363 A1 | 1/2017 | Ericksen et al. |
| 2017/0043778 A1 | 2/2017 | Kelly |
| 2017/0087950 A1 | 3/2017 | Brady et al. |
| 2017/0129298 A1 | 5/2017 | Lu et al. |
| 2017/0129390 A1 | 5/2017 | Akaza et al. |
| 2017/0321729 A1 | 11/2017 | Melcher |
| 2018/0001729 A1 | 1/2018 | Goffer et al. |
| 2018/0009443 A1 | 1/2018 | Norstad |
| 2018/0126817 A1 | 5/2018 | Russell et al. |
| 2018/0141543 A1* | 5/2018 | Krosschell ............ B60W 30/02 |
| 2018/0264902 A1 | 9/2018 | Schroeder |
| 2018/0297435 A1 | 10/2018 | Brady et al. |
| 2018/0339566 A1 | 11/2018 | Ericksen et al. |
| 2018/0354336 A1 | 12/2018 | Oakden-Graus |
| 2018/0361853 A1 | 12/2018 | Grajkowski et al. |
| 2019/0100071 A1 | 4/2019 | Tsiaras et al. |
| 2019/0118898 A1 | 4/2019 | Ericksen et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0156430 A1 | 5/2020 | Oakden-Graus et al. |
| 2020/0223279 A1 | 7/2020 | McKeefery |
| 2020/0269648 A1 | 8/2020 | Halper |
| 2020/0282786 A1 | 9/2020 | Lorenz |
| 2021/0031579 A1 | 2/2021 | Booth |
| 2021/0070124 A1 | 3/2021 | Brady et al. |
| 2021/0070125 A1 | 3/2021 | Brady et al. |
| 2021/0070126 A1 | 3/2021 | Brady et al. |
| 2021/0086578 A1 | 3/2021 | Brady et al. |
| 2021/0088100 A1 | 3/2021 | Woelfel |
| 2021/0102596 A1 | 4/2021 | Malmborg et al. |
| 2021/0108696 A1 | 4/2021 | Randall |
| 2021/0162830 A1 | 6/2021 | Graus et al. |
| 2021/0162833 A1 | 6/2021 | Graus et al. |
| 2021/0206263 A1 | 7/2021 | Grajkowski et al. |
| 2021/0300140 A1 | 9/2021 | Ericksen |
| 2021/0316716 A1 | 10/2021 | Krosschell et al. |
| 2021/0379957 A1 | 12/2021 | Tabata |
| 2022/0016949 A1 | 1/2022 | Graus et al. |
| 2022/0032708 A1 | 2/2022 | Tabata |
| 2022/0041029 A1 | 2/2022 | Randall |
| 2022/0056976 A1 | 2/2022 | Anderson |
| 2022/0088988 A1 | 3/2022 | Menden |
| 2022/0266844 A1 | 8/2022 | Norstad et al. |
| 2022/0324282 A1 | 10/2022 | Brady et al. |
| 2022/0388362 A1 | 12/2022 | Graus et al. |
| 2022/0397194 A1 | 12/2022 | Kohler |
| 2023/0013665 A1* | 1/2023 | Gagnon ................. B62D 55/07 |
| 2023/0079941 A1 | 3/2023 | Graus et al. |
| 2024/0123972 A1 | 4/2024 | Krosschell et al. |
| 2024/0190448 A1 | 6/2024 | Norstad et al. |
| 2024/0262151 A1 | 8/2024 | Graus et al. |

FOREIGN PATENT DOCUMENTS

| | | |
|---|---|---|
| CA | 2260292 A1 | 7/2000 |
| CA | 2851626 A1 | 4/2013 |
| CA | 2963790 A1 | 4/2016 |
| CA | 2965309 A1 | 5/2016 |
| CA | 3018906 A1 | 4/2019 |
| CN | 1129646 A | 8/1996 |
| CN | 2255379 Y | 6/1997 |
| CN | 2544987 Y | 4/2003 |
| CN | 1660615 A | 8/2005 |
| CN | 1664337 A | 9/2005 |
| CN | 1746803 A | 3/2006 |
| CN | 1749048 A | 3/2006 |
| CN | 1810530 A | 8/2006 |
| CN | 101088829 A | 12/2007 |
| CN | 101417596 A | 4/2009 |
| CN | 101522444 A | 9/2009 |
| CN | 101549626 A | 10/2009 |
| CN | 101868363 A | 10/2010 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |

(56) References Cited

FOREIGN PATENT DOCUMENTS

| | | |
|---|---|---|
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 103079934 A | 5/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 A | 7/2015 |
| CN | 105564437 A | 5/2016 |
| CN | 106183688 A | 12/2016 |
| CN | 106218343 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| CN | 109203900 A | 1/2019 |
| CN | 110121438 A | 8/2019 |
| CN | 110691705 A | 1/2020 |
| DE | 3811541 A1 | 10/1988 |
| DE | 4017255 A1 | 12/1990 |
| DE | 4323589 A1 | 1/1994 |
| DE | 4328551 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0473766 | 2/1994 |
| EP | 0691226 A1 | 1/1996 |
| EP | 0745965 A1 | 12/1996 |
| EP | 0829383 A2 | 3/1998 |
| EP | 0953470 A2 | 11/1999 |
| EP | 1005006 A2 | 5/2000 |
| EP | 1022169 A2 | 7/2000 |
| EP | 1172239 A2 | 1/2002 |
| EP | 1219475 A1 | 7/2002 |
| EP | 1238833 A1 | 9/2002 |
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 A | 1/2003 |
| GB | 2412448 A | 9/2005 |
| GB | 2441348 A | 3/2008 |
| GB | 2445291 A | 7/2008 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2001-278089 A | 10/2001 |
| JP | 2002-219921 A | 8/2002 |
| JP | 2003-328806 A | 11/2003 |
| JP | 2008-273246 A | 11/2008 |
| JP | 2009-035220 A | 2/2009 |
| JP | 2009-160964 A | 7/2009 |
| JP | 4584510 B2 | 11/2010 |
| JP | 2011-126405 A | 6/2011 |
| JP | 5149443 B2 | 2/2013 |
| JP | 2013-173490 A | 9/2013 |
| JP | 2013-189109 A | 9/2013 |
| KR | 10-2008-0090833 A | 10/2008 |
| TW | M299089 U | 10/2006 |
| WO | 92/10693 A1 | 6/1992 |
| WO | 96/05975 A1 | 2/1996 |
| WO | 97/27388 A1 | 7/1997 |
| WO | 99/59860 A1 | 11/1999 |
| WO | 00/53057 A1 | 9/2000 |
| WO | 02/20318 A1 | 3/2002 |
| WO | 2004/009433 A1 | 1/2004 |
| WO | 2004/098941 A1 | 11/2004 |
| WO | 2009/008816 A1 | 1/2009 |
| WO | 2009/133000 A1 | 11/2009 |
| WO | 2012/028923 A1 | 3/2012 |
| WO | 2015/004676 A1 | 1/2015 |
| WO | 2016/057555 A1 | 4/2016 |
| WO | 2016/069405 A2 | 5/2016 |
| WO | 2020/089837 A1 | 5/2020 |

OTHER PUBLICATIONS

Bhattacharyya et al., "An Approach to Rollover Stability in Vehicles Using Suspension Relative Position Sensors and Lateral Acceleration Sensors", Dec. 2005, 100 pages.

Hac et al., "Improvements in vehicle handling through integrated control of chassis systems", Int. J. of Vehicle Autonomous Systems(IJVAS), vol. 1, No. 1, 2002, pp. 83-110.

Huang et al., "Nonlinear Active Suspension Control Design Applied to a Half-Car Model", Proceedings of the 2004 IEEE International Conference on Networking, Mar. 21-23, 2004, pp. 719-724.

Article 34 Amendment, issued by the European Patent Office, dated Aug. 29, 2016, for related International patent application No. PCT/US2015/057132; 34 pages.

English translation of Examination Report issued by the State Intellectual Property Office of People's Republic of China, dated Jun. 1, 2015, for Chinese Patent Application No. 201180037804.3; 13 pages.

European Search Report issued by the European Patent Office, dated Feb. 10, 2017, for corresponding European patent application No. 16193006; 7 pages.

Examination Report issued by the European Patent Office, dated Aug. 1, 2016, for European Patent Application No. 11724931.8; 5 pages.

Examination Report issued by the State Intellectual Property Office of People's Republic of China, dated Feb. 3, 2016, for Chinese Patent Application No. 201180037804.3; 14 pages.

Examination Report No. 1 issued by the Australian Government IP Australia, dated Apr. 15, 2014, for Australian Patent Application No. 2011261248; 5 pages.

Examination Report No. 1 issued by the Australian Government IP Australia, dated Jan. 12, 2017, for corresponding Australian patent application No. 2015271880; 6 pages.

(56) References Cited

OTHER PUBLICATIONS

Examination Report No. 2 issued by the Australian Government IP Australia, dated Jun. 29, 2017, for Australian Patent Application No. 2015271880; 8 pages.
Examination Report No. 2 issued by the Australian Government IP Australia, dated May 29, 2015, for Australian Patent Application No. 2011261248; 8 pages.
Examination Report No. 3 issued by the Australian Government IP Australia, dated Dec. 1, 2017, for Australian Patent Application No. 2015271880; 7 pages.
Extended European Search Report issued by the European Patent Office, dated Sep. 7, 2018, for European Patent Application No. 18183050.6; 7 pages.
International Preliminary Report on Patentability in PCT Application Serial No. PCT/US15/57132, issued Jan. 30, 2017 (6 pages).
International Preliminary Report on Patentability issued by the International Bureau of WIPO, Dec. 4, 2012, for International Application No. PCT/US2011/039165; 9 pages.
International Search Report and Written Opinion of the International Searching Authority for International Application No. PCT/US2011/39165, dated Jan. 3, 2012; 15 pages.
International Search Report and Written Opinion received for PCT Patent Application No. PCT/US2015/057132, mailed on May 13, 2016, 17 pages.
Office Action issued by the Canadian Intellectual Property Office, dated Apr. 21, 2017, for corresponding Canadian patent application No. 2,801,334; 3 pages.
Office Action issued by the Canadian Intellectual Property Office, dated Oct. 1, 2019, for Canadian Patent Application No. 2,965,309; 8 pages.
Office Action issued by the Mexican Patent Office, dated Jun. 25, 2014, for corresponding Mexican patent application No. MX/a/2012/014069; 2 pages.
3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.
Compare: Three Selectable Terrain Management Systems, Independent Land Rover News Blog, retrieved from https://web.archive.org/web/20120611082023/ . . . ; archive date Jun. 11, 2012; 4 pages.
EDFC Active Adjust Damping Force Instantly according to G-Force & Speed, TEIN, retrieved from https://web.archive.org/web/20140528221849/ . . . ; archive date May 28, 2014; 18 pages.
EDFC Active Adjust Damping Force Instantly according to G-Force & Speed, TEIN, retrieved from https://web.archive.org/web/20160515190809/ . . . ; archive date May 15, 2016; 22 pages.
Examination Report No. 1 issued by the Australian Government IP Australia, dated Aug. 10, 2018, for Australian Patent Application No. 2015328248; 2 pages.
First drive: Ferrari's easy-drive supercar, GoAuto.com.au, Feb. 16, 2010; 4 pages.
Gangadurai et al.; Development of control strategy for optimal control of a continuously variable transmission operating in combination with a throttle controlled engine; SAE International; Oct. 12, 2005.
Ingalls, Jake; Facebook post https://www.facebook.com/groups/877984048905836/permalink/110447996625624-2; Sep. 11, 2016; 1 page.
International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability received for PCT Patent Application No. PCT/IB2019/060089, mailed on Jun. 3, 2021, 22 pages.
International Preliminary Report on Patentability received for PCT Patent Application No. PCT/US2013/068937, mailed on May 21, 2015, 8 pages.
International Preliminary Report on Patentability received for PCT Patent Application No. PCT/US2017/062303, mailed on May 31, 2019, 23 pages.
International Search Report and Written Opinion received for PCT Patent Application No. PCT/IB2019/060089, mailed on May 29, 2020, 24 pages.
International Search Report and Written Opinion received for PCT Patent Application No. PCT/US2013/068937, mailed on Feb. 26, 2014, 10 pages.
International Search Report and Written Opinion received for PCT Patent Application No. PCT/US2015/054296, mailed on Dec. 18, 2015, 9 pages.
International Search Report and Written Opinion received for PCT Patent Application No. PCT/US2021/033199, mailed on Aug. 23, 2021, 14 pages.
International Search Report issued by the International Searching Authority, dated Jun. 7, 2018, for related International Patent Application No. PCT/US2017/062303; 7 pages.
International Search Report of the International Searching Authority, dated Aug. 31, 2018, for International Patent Application No. PCT/US2018/036383; 7 pages.
Mckay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.
Office Action issued by the Canadian Intellectual Property Office, dated Jul. 26, 2019, for Canadian Patent Application No. 2,963,790; 3 pages.
Office Action issued by the Canadian Intellectual Property Office, dated Jun. 22, 2021, for Canadian Patent Application No. 3,043,481; 3 pages.
Office Action issued by the Canadian Intellectual Property Office, dated May 10, 2021, for Canadian Patent Application No. 2,890,996; 3 pages.
Scott Tsuneishi, "2005 Subaru WRX Sti-Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.
Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.
Trebi-Ollennu et al., Adaptive Fuzzy Throttle Control of an All Terrain Vehicle, 2001, Abstract.
Unno et al.; Development of Electronically Controlled DVT Focusing on Rider's Intention of Acceleration and Deceleration; SAE International; Oct. 30, 2007.
Written Opinion issued by the International Searching Authority, dated Jun. 7, 2018, for related International Patent Application No. PCT/US2017/062303; 22 pages.
Written Opinion of the International Searching Authority, dated Aug. 31, 2018, for International Patent Application No. PCT/US2018/036383; 8 pages.
International Preliminary Report on Patentability received for PCT Patent Application No. PCT/US2021/033199, mailed on Dec. 1, 2022, 11 pages.
New 2022! Lightweight iQS Intelligent Quick Switch, Fox Factory, Inc., available at https://www.ridefox.com/content.php?c=iqs, 2022; 10 pages.
TracTive, The Art of Suspension, available at https://web.archive.org/web/20200322131710/https://tractivesuspension.com/snowmobile/; 2020; 2 pages.

(56) References Cited

OTHER PUBLICATIONS

Vincent Bourque-Veilleux, "iACT: Arctic Cat redefines trail suspension standards", sledmagazine.com; Feb. 27, 2018, https://sledmagazine.com/iact-arctic-cat-redefines-trail-suspension-standards/; 4 pages.

* cited by examiner

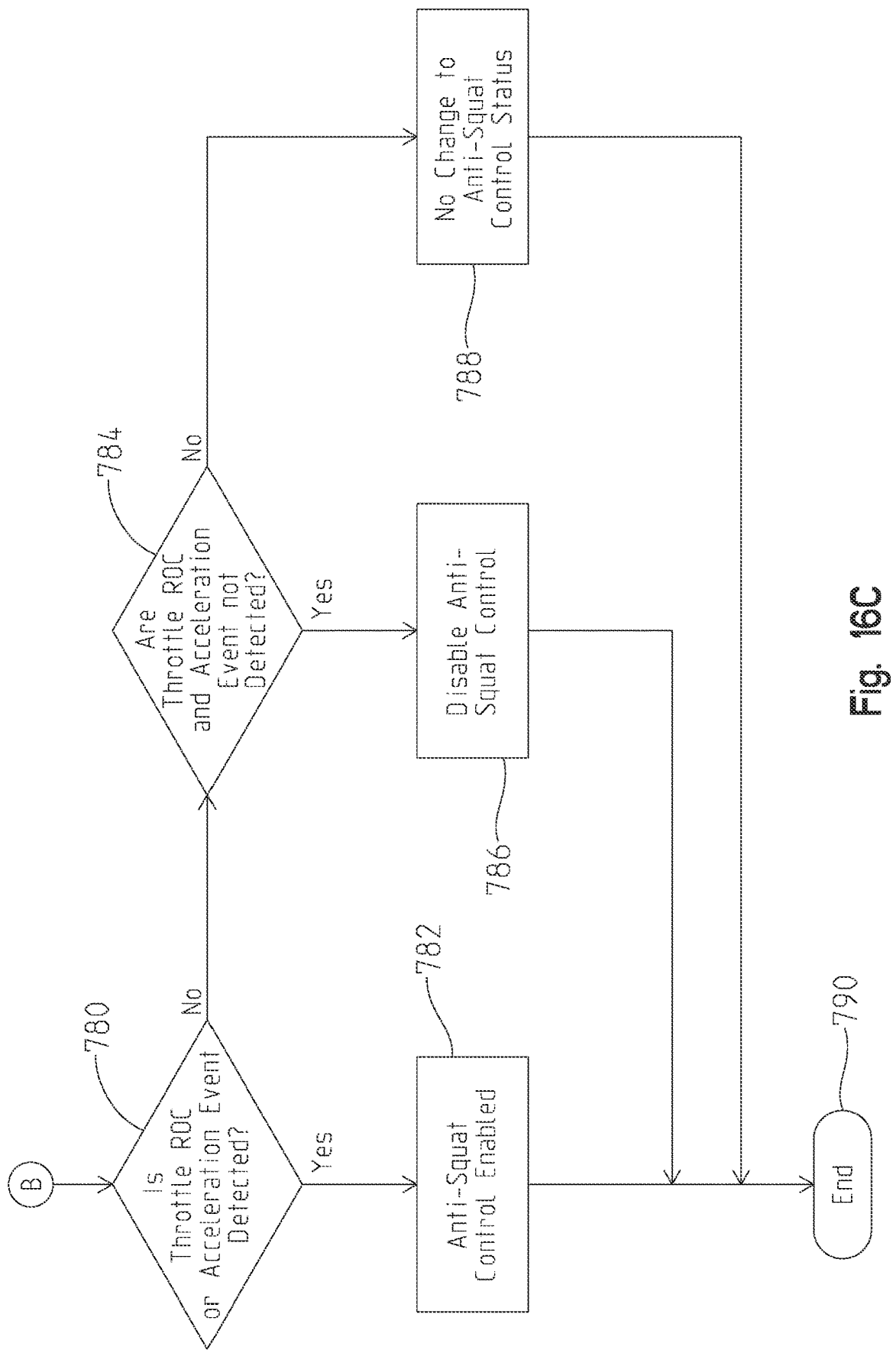

SYSTEMS AND METHODS OF ADJUSTABLE SUSPENSIONS FOR OFF-ROAD RECREATIONAL VEHICLES

RELATED APPLICATION

The present application is related to U.S. Provisional Application No. 63/027,833, filed May 20, 2021, titled SYSTEMS AND METHODS OF ADJUSTABLE SUSPENSIONS FOR OFF-ROAD RECREATIONAL VEHICLES, the entire disclosure of which is expressly incorporated by reference herein.

BACKGROUND AND SUMMARY OF THE DISCLOSURE

The present disclosure relates to improved suspension for off-road recreational vehicles and, in particular, to systems and methods of damping control for shock absorbers of off-road recreational vehicles.

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some off-road vehicles also include adjustable electric shocks along with sensors for active ride control systems. Exemplary systems are disclosed in U.S. Pat. No. 9,010,768 and US Published Patent Application No. 2016/0059660, both assigned to the present assignee and the entire disclosures of each expressly incorporated by reference herein.

In an exemplary embodiment of the present disclosure, a snowmobile for propelled movement relative to the ground is provided. The snowmobile comprising a plurality of ground engaging members including an endless track positioned along a centerline vertical longitudinal plane of the snowmobile have having a lateral width, a left front ski positioned on a left side of the centerline vertical longitudinal plane of the snowmobile, and a right front ski positioned on a right side of the centerline vertical longitudinal plane of the snowmobile; a frame supported by the plurality of ground engaging members; a steering system supported by the frame and operatively coupled to the left front ski and the right front ski to control a direction of travel of the snowmobile; a left ski suspension operatively coupling the left front ski to the frame; a right ski suspension operatively coupling the right front ski to the frame; a track suspension operatively coupling the endless track to the frame, the track suspension including a first adjustable shock absorber, the first adjustable shock absorber having at least one adjustable damping characteristic, the first adjustable shock absorber being laterally positioned within the lateral width of the endless track; a plurality of sensors supported by the ground engaging members; and at least one electronic controller operatively coupled to the first adjustable shock absorber, the at least one electronic controller based on inputs from the plurality of sensors alters at least one damping characteristic of the first adjustable shock absorber.

In an example thereof, the first adjustable shock absorber of the first suspension is positioned within an interior bounded by the endless track.

In another example thereof, the track suspension further comprises a second adjustable shock absorber having at least one adjustable damping characteristic, the second adjustable shock absorber being laterally positioned within the lateral width of the endless track, the first adjustable shock absorber is a front track adjustable shock absorber and the second adjustable shock absorber is a rear track adjustable shock absorber. In a variation thereof, the second adjustable shock absorber of the track suspension is positioned within the interior bounded by the endless track. In another variation thereof, the second adjustable shock absorber of the track suspension is positioned outside of the interior bounded by the endless track. In a further variation thereof, the second adjustable shock absorber of the track suspension is positioned above the endless track. In a refinement thereof, the front track adjustable shock absorber is positioned forward of the rear track adjustable shock absorber.

In a further example thereof, the at least one electronic controller alters the at least one damping characteristic of the first adjustable shock absorber while the snowmobile is moving relative to the ground. In a variation thereof, the at least one electronic controller alters a compression damping characteristic of the first adjustable shock absorber. In another variation thereof, the at least one electronic controller alters a rebound damping characteristic of the first adjustable shock absorber. In a further variation thereof, the at least one electronic controller alters both a compression damping characteristic of the first adjustable shock absorber and a rebound damping characteristic of the first adjustable shock absorber.

In still another example thereof, the snowmobile further comprises a third adjustable shock absorber and a fourth adjustable shock absorber, the third adjustable shock absorber is part of the left ski suspension operatively coupling the left front ski to the frame and the fourth adjustable shock absorber is part of the right ski suspension operatively coupling the right front ski to the frame.

In still a further example, a first damping characteristic of the first adjustable shock absorber is adjusted by the at least one electronic controller based on a longitudinal acceleration of the snowmobile. In a variation thereof, a first damping characteristic of the first adjustable shock absorber and a first damping characteristic of the second adjustable shock absorber are adjusted by the at least one electronic controller based on a longitudinal acceleration of the snowmobile. In another variation thereof, a first damping characteristic of the first adjustable shock absorber, a first damping characteristic of the second adjustable shock absorber, a first damping characteristic of the third adjustable shock absorber, and a first damping characteristic of the fourth adjustable shock absorber are adjusted by the at least one electronic controller based on a longitudinal acceleration of the snowmobile. In a further variation thereof, the longitudinal acceleration of the snowmobile is measured by the plurality of sensors. In still a further variation thereof, the longitudinal acceleration of the snowmobile is estimated by the at least one electronic controller. In yet another variation thereof, the longitudinal acceleration of the snowmobile is predicted by the at least one electronic controller.

In yet another example thereof, a first damping characteristic of the first adjustable shock absorber is adjusted by the at least one electronic controller based on a vehicle pitch motion of the snowmobile. In a variation thereof, a first damping characteristic of the first adjustable shock absorber and a first damping characteristic of the second adjustable shock absorber are adjusted by the at least one electronic controller based on a vehicle pitch motion of the snowmobile. In another variation thereof, a first damping characteristic of the first adjustable shock absorber, a first damping characteristic of the second adjustable shock absorber, a first damping characteristic of the third adjustable shock absorber, and a first damping characteristic of the fourth adjustable shock absorber are adjusted by the at least one electronic controller based on a predicted vehicle pitch motion of the snowmobile. In still another variation thereof, the at least one electronic controller determines the snowmobile is predicted to travel at a generally constant longitudinal acceleration, the at least one electronic controller alters a rebound damping characteristic for the third adjustable shock absorber and alters a rebound damping characteristic for the fourth adjustable shock absorber. In yet another variation thereof, the at least one electronic controller determines the snowmobile is predicted to travel at a generally constant longitudinal acceleration, the at least one electronic controller increases a rebound damping characteristic for the third adjustable shock absorber and increases a rebound damping characteristic for the fourth adjustable shock absorber. In yet still another variation thereof, the at least one electronic controller determines the snowmobile is predicted to travel at a generally constant longitudinal acceleration, the at least one electronic controller alters a compression damping characteristic for the third adjustable shock absorber and alters a compression damping for the fourth adjustable shock absorber. In still yet a further variation thereof, the at least one electronic controller determines the snowmobile is predicted to travel at a generally constant longitudinal acceleration, the at least one electronic controller decreases a compression damping characteristic for the third adjustable shock absorber and decreases a compression damping for the fourth adjustable shock absorber. In still another variation thereof, the at least one electronic controller determines the predicted vehicle pitch motion indicates a rearward pitch of the snowmobile and alters a compression damping characteristic of the first adjustable shock absorber. In yet another variation, the at least one electronic controller determines the predicted vehicle pitch motion indicates a rearward pitch of the snowmobile and increases a compression damping characteristic of the first adjustable shock absorber. In still yet another variation, the at least one electronic controller determines the predicted vehicle pitch motion indicates a rearward pitch of the snowmobile and alters a compression damping characteristic of the second adjustable shock absorber. In a further still variation thereof, the at least one electronic controller determines the predicted vehicle pitch motion indicates a rearward pitch of the snowmobile and increases a compression damping characteristic of the second adjustable shock absorber. In a yet further still variation thereof, the at least one electronic controller determines the predicted vehicle pitch motion indicates a rearward pitch of the snowmobile and alters a rebound damping characteristic of the second adjustable shock absorber. In another still variation thereof, the at least one electronic controller determines the predicted vehicle pitch motion indicates a rearward pitch of the snowmobile and increases a rebound damping characteristic of the second adjustable shock absorber. In a further variation thereof, the at least one electronic controller determines the predicted vehicle pitch motion indicates a rearward pitch of the snowmobile, the at least one electronic controller increases a rebound damping characteristic for the third adjustable shock absorber, increases a rebound damping characteristic for the fourth adjustable shock absorber, alters the compression damping characteristic of the first adjustable shock absorber, and increases the compression damping characteristic of the second adjustable shock absorber. In still another variation, the at least one electronic controller determines the predicted vehicle pitch motion indicates a rearward pitch of the snowmobile based on an indication of a throttle increase. In yet still another variation, the at least one electronic controller determines the predicted vehicle pitch motion indicates a rearward pitch of the snowmobile based on an indication of an engine torque increase. In a further still variation, the at least one electronic controller determines the predicted vehicle pitch motion indicates a rearward pitch of the snowmobile based on an indication of an increased vehicle acceleration. In a further yet still variation thereof, the at least one electronic controller determines the snowmobile is predicted to travel at a generally constant longitudinal deceleration, the at least one electronic controller increases a compression damping characteristic for the third adjustable shock absorber and increases a compression damping characteristic for the fourth adjustable shock absorber.

In yet a further example, thereof, the at least one electronic controller determines the snowmobile is predicted to travel at a generally constant longitudinal deceleration, the at least one electronic controller increases a rebound damping characteristic for the first adjustable shock absorber.

In still another example thereof, the at least one electronic controller determines the snowmobile is predicted to travel at a generally constant longitudinal deceleration, the at least one electronic controller alters a compression damping for the first adjustable shock absorber. In a variation thereof, the at least one electronic controller determines the snowmobile is predicted to travel at a generally constant longitudinal deceleration, the at least one electronic controller increases a rebound damping characteristic of the second adjustable shock absorber.

In another variation thereof, the at least one electronic controller determines the snowmobile is predicted to travel at a generally constant longitudinal deceleration, the at least one electronic controller alters a compression damping of the second adjustable shock absorber. In still a further variation thereof, the at least one electronic controller determines the predicted vehicle pitch motion indicates a forward pitch of the snowmobile and alters a rebound damping characteristic of the first adjustable shock absorber. In yet still a further variation thereof, the at least one electronic controller determines the predicted vehicle pitch motion indicates a forward pitch of the snowmobile and increases a damping characteristic of the first adjustable shock absorber. In a further yet variation thereof, the at least one electronic controller determines the predicted vehicle pitch motion indicates a forward pitch of the snowmobile and alters a rebound damping characteristic of the second adjustable shock absorber. In a still further variation thereof, the at least one electronic controller determines the predicted vehicle pitch motion indicates a forward pitch of the snowmobile and increases a rebound damping characteristic of the second adjustable shock absorber. In a yet still further variation thereof, the at least one electronic controller determines the predicted vehicle pitch motion indicates a forward pitch of the snowmobile and alters a compression damping characteristic of the second adjustable shock absorber. In a further still variation thereof, the at least one electronic controller determines the predicted vehicle pitch motion indicates a forward pitch of the snowmobile, the at least one electronic controller increases a compression damping characteristic for the third adjustable shock absorber, increases a compression damping characteristic for the fourth adjustable shock absorber, alters a rebound damping characteristic of the first adjustable shock absorber, and alters a rebound damping characteristic of the second adjustable shock absorber. In yet a further still variation thereof, the at least one electronic controller determines the predicted vehicle pitch motion indicates a forward pitch of the snowmobile, the at least one electronic controller increases a compression damping characteristic for the third adjustable shock absorber, increases a compression damping characteristic for the fourth adjustable shock absorber, increases a rebound damping characteristic of the first adjustable shock absorber, and increases a rebound damping characteristic of the second adjustable shock absorber. In another variation thereof, the at least one electronic controller determines the predicted vehicle pitch motion indicates a forward pitch of the snowmobile based on an indication of a throttle decrease. In a further variation thereof, the at least one electronic controller determines the predicted vehicle pitch motion indicates a forward pitch of the snowmobile based on an indication of an application of the brake. In yet another variation thereof, the at least one electronic controller determines the predicted vehicle pitch motion indicates a forward pitch of the snowmobile based on an indication of a decreased vehicle acceleration.

In still another example thereof, at least one of a first damping characteristic of the first adjustable shock absorber, a first damping characteristic of the second adjustable shock absorber, a first damping characteristic of the third adjustable shock absorber, and a first damping characteristic of the fourth adjustable shock absorber are adjusted by the at least one electronic controller based on a turning of the snowmobile. In yet a further variation thereof, the at least one of the first damping characteristic of the first adjustable shock, the first damping characteristic of the second adjustable shock, the first damping characteristic of the third adjustable shock, and the first damping characteristic of the fourth adjustable shock are adjusted by the at least one electronic controller based on the turning of the snowmobile corresponding to a corner entry. In still another variation thereof, the at least one of the first damping characteristic of the first adjustable shock, the first damping characteristic of the second adjustable shock, the first damping characteristic of the third adjustable shock, and the first damping characteristic of the fourth adjustable shock are adjusted by the at least one electronic controller based on the turning of the snowmobile corresponding to a time subsequent to a corner entry. In a further still variation, the at least one electronic controller determines the snowmobile is making a left turn, the at least one electronic controller increases a compression damping characteristic for the fourth adjustable shock absorber. In another variation thereof, the at least one electronic controller determines the snowmobile is making the left turn, the at least one electronic controller decreases a compression damping characteristic of the fourth adjustable shock absorber. In a further variation thereof, the at least one electronic controller determines the snowmobile is making the left turn, the at least one electronic controller increases a rebound damping characteristic of the fourth adjustable shock absorber. In still another variation thereof, the at least one electronic controller determines the snowmobile is making the left turn, the at least one electronic controller decreases a compression damping characteristic of the first adjustable shock absorber. In yet still another variation thereof, the at least one electronic controller determines the snowmobile is making the left turn, the at least one electronic controller increases a rebound damping characteristic of the first adjustable shock absorber. In another variation thereof, the at least one electronic controller determines the snowmobile is making a right turn, the at least one electronic controller increases a compression damping characteristic for the third adjustable shock absorber. In a further variation thereof, the at least one electronic controller determines the snowmobile is making the right turn, the at least one electronic controller decreases a compression damping characteristic of the fourth adjustable shock absorber. In another variation thereof, the at least one electronic controller determines the snowmobile is making the right turn, the at least one electronic controller increases a rebound damping characteristic of the fourth adjustable shock absorber. In a yet still further variation thereof, the at least one electronic controller determines the snowmobile is making the right turn, the at least one electronic controller decreases a compression damping characteristic of the first adjustable shock absorber. In a further variation thereof, the at least one electronic controller determines the snowmobile is making the right turn, the at least one electronic controller increases a rebound damping characteristic of the first adjustable shock absorber.

In still a further example thereof, the at least one electronic controller adjusts a first damping characteristic of the first adjustable shock absorber to promote a lifting of the skis of the snowmobile. In a variation thereof, a compression damping characteristic of the first adjustable shock absorber is altered to promote a lifting of the skies of the snowmobile. In another variation thereof, the compression damping characteristic of the first adjustable shock absorber is decreased to promote a lifting of the skies of the snowmobile. In a further variation thereof, the compression damping characteristic of the first adjustable shock absorber is increased to promote a lifting of the skies of the snowmobile. In still another variation thereof, the at least one electronic controller adjusts a first damping characteristic of the first adjustable shock absorber and a first damping characteristic of the second adjustable shock absorber to promote a lifting of the skis of the snowmobile. In a further variation thereof, a compression damping characteristic of the second adjustable shock absorber is altered to promote the lifting of the skies of the snowmobile and to cause a wheelie. In a further still variation thereof, the compression damping characteristic of the second adjustable shock absorber is decreased to promote the lifting of the skies of the snowmobile and to cause the wheelie. In another variation thereof, a rebound damping characteristic of the second adjustable shock absorber is altered to promote the lifting of the skies of the snowmobile and to prevent a wheelie. In yet another variation thereof, the rebound damping characteristic of the second adjustable shock absorber is increased to promote the lifting of the skies of the snowmobile and to prevent the wheelie. In a further variation thereof, the at least one electronic controller adjusts a first damping characteristic of the first adjustable shock absorber, a first damping characteristic of the second adjustable shock absorber, a first damping characteristic of the third adjustable shock absorber, and a first damping characteristic of the fourth adjustable shock absorber to promote a lifting of the skis of the snowmobile. In a yet a further variation, a compression damping characteristic of the second adjustable shock absorber is altered to promote the lifting of the skies of the snowmobile and to cause a wheelie. In a further yet variation, the compression damping characteristic of the second adjustable shock absorber is decreased to promote the lifting of the skies of the snowmobile and to cause the wheelie. In a further still variation, a rebound damping characteristic of the third adjustable shock absorber is altered and a rebound damping characteristic of the fourth adjustable shock absorber is altered to promote the lifting of the skies of the snowmobile and to cause the wheelie. In another variation, the rebound damping characteristic of the third adjustable shock absorber is decreased and the rebound damping characteristic of the fourth adjustable shock absorber is decreased to promote the lifting of the skies of the snowmobile and to cause the wheelie. In yet a further variation, a rebound damping characteristic of the second adjustable shock absorber is altered to promote the lifting of the skies of the snowmobile and to prevent a wheelie. In still a variation, the rebound damping characteristic of the second adjustable shock absorber is increased to promote the lifting of the skies of the snowmobile and to prevent the wheelie. In yet still a further variation, a rebound damping characteristic of the third adjustable shock absorber is altered and a rebound damping characteristic of the fourth adjustable shock absorber is altered to promote the lifting of the skies of the snowmobile and to prevent the wheelie. In further still variation, the rebound damping characteristic of the third adjustable shock absorber is increased and the rebound damping characteristic of the fourth adjustable shock absorber is increased to promote the lifting of the skies of the snowmobile and to prevent the wheelie. In yet another variation, the damping characteristic of the first adjustable shock absorber is adjusted for a first condition and thereafter allowed to further adjust based on the plurality of sensors. In yet a further variation, the damping characteristic of the first adjustable shock absorber and the damping characteristic of the second adjustable shock absorber are adjusted for a first condition and thereafter allowed to further adjust based on the plurality of sensors. In a further still variation, the damping characteristic of the first adjustable shock absorber, the damping characteristic of the second adjustable shock absorber, the damping characteristic of the third adjustable shock absorber, and the damping characteristic of the fourth adjustable shock absorber are adjusted for a first condition and thereafter allowed to further adjust based on the plurality of sensors. In a still further variation, the damping characteristic of the first adjustable shock absorber and the damping characteristic of the second adjustable shock absorber are adjusted for a first condition and thereafter allowed to further adjust based on the plurality of sensors and the damping characteristic of the third adjustable shock absorber and the damping characteristic of the fourth adjustable shock absorber are adjusted for a second condition and thereafter allowed to further adjust based on the plurality of sensors. In a further variation, the first condition is a duration of a timer. In a still further variation, the second condition is a duration of a second timer.

In yet another example, the at least one electronic controller adjusts a first damping characteristic of the first adjustable shock absorber in response to the snowmobile being airborne. In a variation thereof, the adjustment of the first damping characteristic of the first adjustable shock absorber is dependent on a length of time that the snowmobile has been airborne. In another variation thereof, the at least one electronic controller increases a compression damping characteristic of the first adjustable shock absorber in response to the snowmobile being airborne. In still a further variation, the at least one electronic controller continues to hold the increased compression damping characteristic of the first adjustable shock absorber for a first period of time after the snowmobile has landed. In a further still variation, the at least one electronic controller alters a rebound damping characteristic of the first adjustable shock absorber in response to the snowmobile being airborne. In yet another variation, the adjustment of the rebound damping characteristic of the first adjustable shock absorber is dependent on a length of time that the snowmobile has been airborne. In yet a further variation, the at least one electronic controller increases the rebound damping characteristic of the first adjustable shock absorber for a first post landing period of time after the snowmobile has landed. In a further variation, the at least one electronic controller adjusts a first damping characteristic of the first adjustable shock absorber and a first damping characteristic of the second adjustable shock absorber in response to the snowmobile being airborne. In another variation, the adjustment of the first damping characteristic of the first adjustable shock absorber and the first damping characteristic of the second adjustable shock absorber is dependent on a length of time that the snowmobile has been airborne. In a further variation, the at least one electronic controller increases a compression damping characteristic of the first adjustable shock absorber and increases a compression damping characteristic of the second adjustable shock absorber in response to the snowmobile being airborne. In yet a further variation, the at least one electronic controller continues to hold the increased compression damping characteristic of the first adjustable shock absorber and the increased compression damping characteristic of the second adjustable shock absorber for a first period of time after the snowmobile has landed. In yet a further variation, the at least one electronic controller alters a rebound damping characteristic of the first adjustable shock absorber and alters a rebound damping characteristic of the second adjustable shock absorber in response to the snowmobile being airborne. In another variation, the adjustment of the rebound damping characteristic of the first adjustable shock absorber and the adjustment of the rebound damping characteristic of the second adjustable shock absorber is dependent on a length of time that the snowmobile has been airborne. In a further variation, the at least one electronic controller increases the rebound damping characteristic of the first adjustable shock absorber and increases the rebound damping characteristic of the second adjustable shock absorber for a first post landing period of time after the snowmobile has landed. In yet another variation, the at least one electronic controller adjusts a first damping characteristic of the third adjustable shock absorber, a first damping characteristic of the fourth adjustable shock absorber, a first damping characteristic of the first adjustable shock absorber, and a first damping characteristic of the second adjustable shock absorber in response to the snowmobile being airborne. In yet another variation, the adjustment of at least one of the first damping characteristic of the third adjustable shock absorber, the first damping characteristic of the fourth adjustable shock absorber, the first damping characteristic of the first adjustable shock absorber, and the first damping characteristic of the second adjustable shock absorber is dependent on a length of time that the snowmobile has been airborne. In still another variation, the at least one electronic controller increases a compression damping characteristic of the third adjustable shock absorber, increases a compression damping characteristic of the fourth adjustable shock absorber, increases a compression damping characteristic of the first adjustable shock absorber, and increases a compression damping characteristic of the second adjustable shock absorber in response to the snowmobile being airborne. In yet still another embodiment, the at least one electronic controller continues to hold the increased compression damping characteristic of the third adjustable shock absorber, the increased compression damping characteristic of the fourth adjustable shock absorber, the increased compression damping characteristic of the first adjustable shock absorber, and the increased compression damping characteristic of the second adjustable shock absorber for a first period of time after the snowmobile has landed. In a further variation, the at least one electronic controller alters a rebound damping characteristic of the third adjustable shock absorber, alters a rebound damping characteristic of the fourth adjustable shock absorber, alters a rebound damping characteristic of the first adjustable shock absorber, and alters a rebound damping characteristic of the second adjustable shock absorber in response to the snowmobile being airborne. In a further still variation, the adjustment of the rebound damping characteristic of the third adjustable shock absorber and the adjustment of the rebound damping of the fourth adjustable shock absorber is adjusted in a first configuration in response to the snowmobile being airborne for less than a first time duration and in a second configuration in response to the snowmobile being airborne for longer than the first time duration. In a further still variation, the at least one electronic controller increases the rebound damping characteristic of the third adjustable shock absorber and increases the rebound damping characteristic of the fourth adjustable shock for a first post landing period of time after the snowmobile has landed in the second configuration. In yet another variation, the at least one electronic controller one of maintains or alters the rebound damping characteristic of the third adjustable shock absorber and one of maintains or alters the rebound damping characteristic of the fourth adjustable shock absorber for a first post landing period of time after the snowmobile has landed in the first configuration. In another variation, the adjustment of the rebound damping characteristic of the first adjustable shock absorber and the adjustment of the rebound damping characteristic of the second adjustable shock absorber is dependent on a length of time that the snowmobile has been airborne. In yet another variation, the at least one electronic controller increases the rebound damping characteristic of the third adjustable shock absorber, increases the rebound damping characteristic of the fourth adjustable shock absorber, increases the rebound damping characteristic of the first adjustable shock absorber, and increases the rebound damping characteristic of the second adjustable shock absorber for a first post landing period of time after the snowmobile has landed.

In still another example, the snowmobile further comprises a driver actuatable suspension adjust input, wherein the at least one electronic controller adjusts a damping characteristic of the first adjustable shock absorber in response to a first actuation of the driver actuatable suspension input. In a variation thereof, the at least one electronic controller increases the compression damping of the first adjustable shock absorber in response to the first actuation of the driver actuatable suspension input. In another variation thereof, the driver actuatable suspension adjust input is supported by the steering system. In a further variation thereof, the driver actuatable suspension adjust input is positioned on a left hand portion of a handlebar of the steering system. In a further still variation thereof, the driver actuatable suspension adjust input is moveable along a longitudinal axis of the left hand portion of the handlebar of the steering system. In still another variation thereof, a first actuation characteristic of the driver actuatable suspension adjust input results in a first type of damping characteristic of the first adjustable shock absorber and a second actuation characteristic of the driver actuatable suspension adjust input results in a second type of damping characteristic of the first adjustable shock absorber. In a further still variation thereof, the first actuation characteristic is a single depress of a first time duration. In yet a further variation thereof, the second actuation characteristic is a single depress of a second time duration longer than the first time duration. In still another variation thereof, the second actuation characteristic is a plurality of depresses within a first time period.

In a further example thereof, the snowmobile further comprises at least one mode input supported by the snowmobile, the at least one electronic controller selecting at least one damping characteristic of the first adjustable shock absorber based on a mode selected with the at least one mode input. In a variation thereof, an operator may select a first mode from a plurality of available modes with the at least one mode input.

In still a further example thereof, the plurality of sensors include an internal measurement unit. In a variation thereof, the internal measurement unit is located between a spindle of the left ski and a rear end of a fuel tank supported by the plurality of ground engaging members. In another variation thereof, the internal measurement unit is located laterally within the lateral width of the endless track. In still another variation, the internal measurement unit is located laterally within the lateral width of an engine of the snowmobile. In yet another variation, the internal measurement unit is located between an engine and a rear end of a fuel tank both supported by the plurality of ground engaging members. In a further variation, the internal measurement unit is supported by a tunnel covering the endless track. In yet another variation, the internal measurement unit is located vertically in line with a steering post of the steering system. In yet a further variation thereof, the frame includes an over-structure positioned above an engine of the snowmobile and supporting a steering post of the steering system, wherein the internal measurement unit is located within an interior of the over-structure. In still a further variation, the internal measurement unit is mounted to a first portion of the snowmobile and is vibration isolated from the first portion of the snowmobile to reduce engine vibration. In yet still another variation thereof, the internal measurement unit is integrated into the at least one electronic controller. In a further still variation thereof, the internal measurement unit is spaced apart from the at least one electronic controller.

In another exemplary embodiment of the present disclosure, a method of controlling ride characteristics of a snowmobile is provided. The method comprising the steps of monitoring with at least one electronic controller a plurality of sensors supported by the snowmobile while the snowmobile is moving; and adjusting with the at least one electronic controller at least one damping characteristic of an adjustable shock absorber while the vehicle is moving, the adjustable shock absorber being apart of a suspension of an endless track of the snowmobile.

In an example thereof, the method further comprises the step of maintaining the at least one damping characteristic of the adjustable shock absorber when the vehicle is stationary.

In another example thereof, the method further comprises the step of discontinuing adjusting with the at least one electronic controller the at least one damping characteristic of the adjustable shock absorber when the vehicle is stationary.

In still another example thereof, the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a longitudinal acceleration of the snowmobile. In a variation thereof, the longitudinal acceleration of the snowmobile is measured by at least one sensor. In another variation thereof, the longitudinal acceleration of the snowmobile is estimated by the at least one electronic controller. In still another variation thereof, the longitudinal acceleration of the snowmobile is predicted by the at least one electronic controller.

In still another example thereof, the method further comprising the steps of determining the longitudinal acceleration of the snowmobile indicates an acceleration of the snowmobile; and changing a rebound damping characteristic of the adjustable shock absorber. In yet still another variation, the method further comprises the steps of determining the longitudinal acceleration of the snowmobile indicates an acceleration of the snowmobile; and changing a compression damping characteristic of the adjustable shock absorber.

In another example, the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a predicted pitch motion of the snowmobile. In a variation thereof, the method further comprising the steps of determining the predicted longitudinal pitch motion of the snowmobile indicates a rearward pitch of the snowmobile; and increasing a compression damping characteristic of the adjustable shock absorber. In another variation thereof, the method further comprising the steps of determining the predicted longitudinal pitch motion of the snowmobile indicates a forward pitch of the snowmobile; and changing a rebound damping characteristic of the adjustable shock absorber. In still another variation thereof, the method further comprising the steps of: determining the predicted pitch motion of the snowmobile indicates a forward pitch of the snowmobile; and changing a compression damping characteristic of the adjustable shock absorber.

In a further example thereof, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a turning of the snowmobile. In a variation thereof, the step of adjusting the at least one damping characteristic based on the turning of the snowmobile includes the step of altering a compression damping characteristic of the adjustable shock absorber. In another variation thereof, the step of adjusting the at least one damping characteristic based on the turning of the snowmobile includes the step of decreasing a compression damping characteristic of the adjustable shock absorber. In a further variation thereof, the step of adjusting the at least one damping characteristic based on the turning of the snowmobile includes the step of altering a rebound damping characteristic of the adjustable shock absorber. In yet another variation thereof, the step of adjusting the at least one damping characteristic based on the turning of the snowmobile includes the step of increasing a rebound damping characteristic of the adjustable shock absorber. In yet a further variation thereof, the step of adjusting the at least one damping characteristic based on the turning of the snowmobile includes the steps of decreasing a compression damping characteristic of the adjustable shock absorber and increasing a rebound damping characteristic of the adjustable shock absorber.

In still another example thereof, the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a braking of the snowmobile. In a variation thereof, the step of adjusting the at least one damping characteristic based on the braking of the snowmobile includes the step of altering a compression damping characteristic of the adjustable shock absorber. In another variation thereof, the step of adjusting the at least one damping characteristic based on the braking of the snowmobile includes the step of decreasing a compression damping characteristic of the adjustable shock absorber. In a further variation thereof, the step of adjusting the at least one damping characteristic based on the braking of the snowmobile includes the step of altering a rebound damping characteristic of the adjustable shock absorber. In still a further variation thereof, the step of adjusting the at least one damping characteristic based on the braking of the snowmobile includes the step of increasing a rebound damping characteristic of the adjustable shock absorber. In yet still a further variation, the step of adjusting the at least one damping characteristic based on the braking of the snowmobile includes the steps of decreasing a compression damping characteristic of the adjustable shock absorber and increasing a rebound damping characteristic of the adjustable shock absorber.

In a still further example, the step of adjusting with the at least one electronic controller the at least one damping characteristic of the adjustable shock absorber which is apart of the suspension of the endless track of the snowmobile while the vehicle is moving, includes the step of adjusting the at least one damping characteristic to promote a lifting of the skis of the snowmobile. In a variation thereof, the step of adjusting the at least one damping characteristic to promote the lifting of the skis of the snowmobile includes the steps of decreasing a compression damping characteristic of the adjustable shock absorber. In another variation thereof, the step of adjusting the at least one damping characteristic to promote the lifting of the skis of the snowmobile includes the steps of increasing a rebound damping characteristic of a second adjustable shock absorber associated with the suspension of the endless track.

In a further example thereof, the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on the snowmobile being airborne. In a variation thereof, the step of adjusting the at least one damping characteristic based on the snowmobile being airborne includes the steps of increasing a compression damping characteristic of the adjustable shock absorber. In another variation thereof, a magnitude of the increase of the compression damping characteristic of the adjustable shock absorber is dependent on a length of time that the snowmobile has been airborne. In a further variation thereof, the method further comprises the step of continuing to hold the increased compression damping characteristic of the adjustable shock absorber for a first period of time after the snowmobile has landed. In still a further variation thereof, the step of adjusting the at least one damping characteristic based on the snowmobile being airborne further includes the step of decreasing a rebound damping characteristic of the adjustable shock absorber. In still another variation thereof, the method further comprising the step of increasing the rebound damping characteristic of the adjustable shock absorber for a second period of time after the snowmobile has landed. In a further still variation, the step of adjusting the at least one damping characteristic based on the snowmobile being airborne includes the step of decreasing a rebound damping characteristic of the adjustable shock absorber. In yet a further still variation, the method further comprising the step of increasing the rebound damping characteristic of the adjustable shock absorber for a second period of time after the snowmobile has landed.

In a still further exemplary embodiment of the present disclosure, a method of controlling a damping characteristic of at least one adjustable shock absorber of a vehicle being operated by a driver is provided. The method comprising receiving with an electronic controller a plurality of inputs from a plurality of sensors supported by the vehicle; predictively determining a longitudinal acceleration of the vehicle; and adjusting the damping characteristic of the at least one adjustable shock absorber of the vehicle based on the predicted longitudinal acceleration of the vehicle.

In an example thereof, the method further comprising the steps of predictively determining a longitudinal pitch motion of the vehicle; and adjusting the damping characteristic of the at least one adjustable shock absorber of the vehicle based on the predicted longitudinal pitch motion of the vehicle.

In another example thereof, the predicted longitudinal acceleration is determined by the steps of: determining a predicted power for a prime mover of the snowmobile; determining an output power of the drivetrain based on the determined predicted power, the drivetrain including a CVT; determining a forward moving force of the snowmobile based on the determined output power of the drivetrain; determining a resultant forward moving force by subtracting at least one of a coast down force and an applied braking force from the determined forward moving force; and dividing the resultant forward moving force by a mass of the snowmobile to determine the predicted vehicle longitudinal acceleration.

In a further still exemplary embodiment of the present disclosure, a method of controlling a damping characteristic of at least one adjustable shock absorber of a vehicle being operated by a driver is provided. The method comprising receiving with an electronic controller a plurality of inputs from a plurality of sensors supported by the vehicle; predictively determining a longitudinal pitch motion of the vehicle; and adjusting the damping characteristic of the at least one adjustable shock absorber of the vehicle based on the predicted longitudinal pitch motion of the vehicle.

In yet still a further exemplary embodiment of the present disclosure, a snowmobile for propelled movement relative to the ground is provided. The snowmobile comprising a plurality of ground engaging members including an endless track positioned along a centerline vertical longitudinal plane of the snowmobile having a lateral width, a left front ski positioned on a left side of the centerline vertical longitudinal plane of the snowmobile, and a right front ski positioned on a right side of the centerline vertical longitudinal plane of the snowmobile; a frame supported by the plurality of ground engaging members; a steering system supported by the frame and operatively coupled to the left front ski and the right front ski to control a direction of travel of the snowmobile; a left ski suspension operatively coupling the left front ski to the frame; a right ski suspension operatively coupling the right front ski to the frame; a track suspension operatively coupling the endless track to the frame, the track suspension including a plurality of shock absorbers, the plurality of shock absorbers including a first adjustable shock absorber, the first adjustable shock absorber having at least one adjustable damping characteristic, the first adjustable shock absorber being laterally positioned within the lateral width of the endless track and being the forwardmost of the plurality of shock absorbers of the track suspension; a plurality of sensors supported by the ground engaging members; and at least one electronic controller operatively coupled to the first adjustable shock absorber, the at least one electronic controller based on inputs from the plurality of sensors alters at least one damping characteristic of the first adjustable shock absorber.

In an example thereof, the plurality of shock absorbers of the track suspension includes a second shock absorber positioned within the lateral width of the endless track. In a variation thereof, the second shock absorber is an adjustable shock absorber and the electronic controller is operatively coupled to the second shock absorber.

In another example thereof, the left ski suspension includes a third adjustable shock absorber and the right ski suspension includes a fourth adjustable shock absorber, the electronic controller is operatively coupled to the third adjustable shock absorber and the fourth adjustable shock absorber.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

FIGS. 16A-C illustrates an exemplary processing sequence of the shock damping logic of the electronic controller of FIG. 6 for detecting an exemplary anti-squat event;

Figure 1:
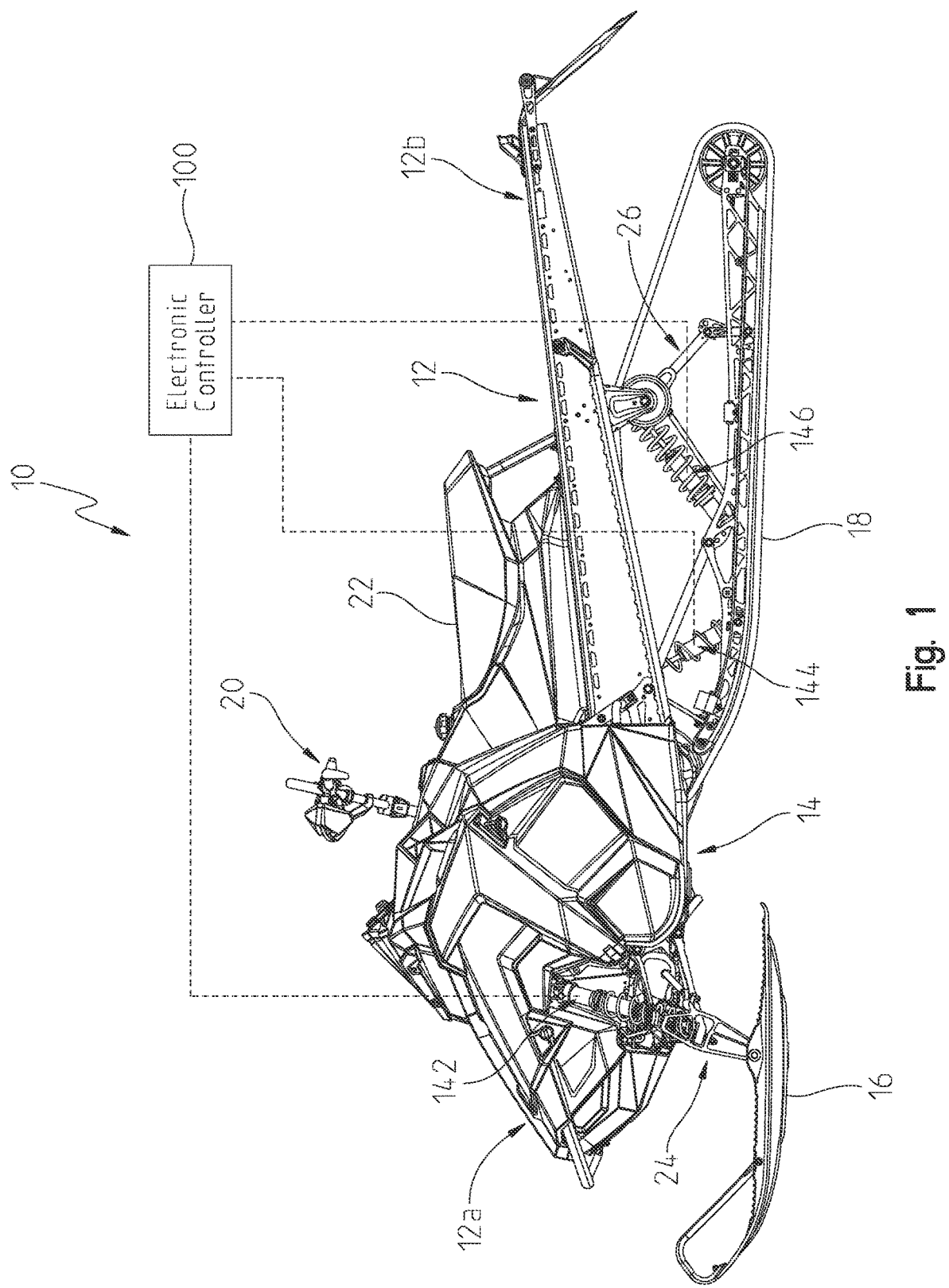
FIG. 1 illustrates a left side view of an exemplary snowmobile.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limited to the precise form disclosed in the following detailed description. Rather, the embodiments are chosen and described so that others skilled in the art may utilize their teachings.

Referring now to FIGS. 1, 1A, 2-4, and 7, an illustrative embodiment of a snowmobile 10 is shown. Snowmobile 10 includes a chassis or frame 12 having a front frame portion 12a and a rear frame portion 12b. A body assembly 14 generally surrounds at least front frame portion 12a of frame 12. Front frame portion 12a is supported by front ground-engaging members, illustratively skis 16, and rear frame portion 12b is supported by a rear ground-engaging member, illustratively an endless track 18. The rider uses a steering assembly 20, which is operably coupled to at least skis 16 through a steering linkage 17 (see FIG. 7), when operating snowmobile 10. A seat assembly 22 is provided generally rearward of steering assembly 20 and is configured to support the rider.

Front skis 16 are operably coupled to a front left suspension assembly 24 and a right front suspension assembly 24, and endless track 18 cooperates with a rear suspension assembly 26. A powertrain assembly is positioned generally intermediate front suspension assembly 24 and rear suspension assembly 26, and provides power to endless track 18 to move snowmobile 10. More particularly, the powertrain assembly 30 includes an engine (see prime mover 110, see FIG. 1C), a transmission, and a drive shaft. In one embodiment, the transmission includes a shiftable transmission and a continuously variable transmission ("CVT") 111 (see FIG. 1C). In embodiments, the shiftable transmission includes a forward low gear, a forward high gear, a reverse gear, a neutral setting, and a park setting.

Figure 3:
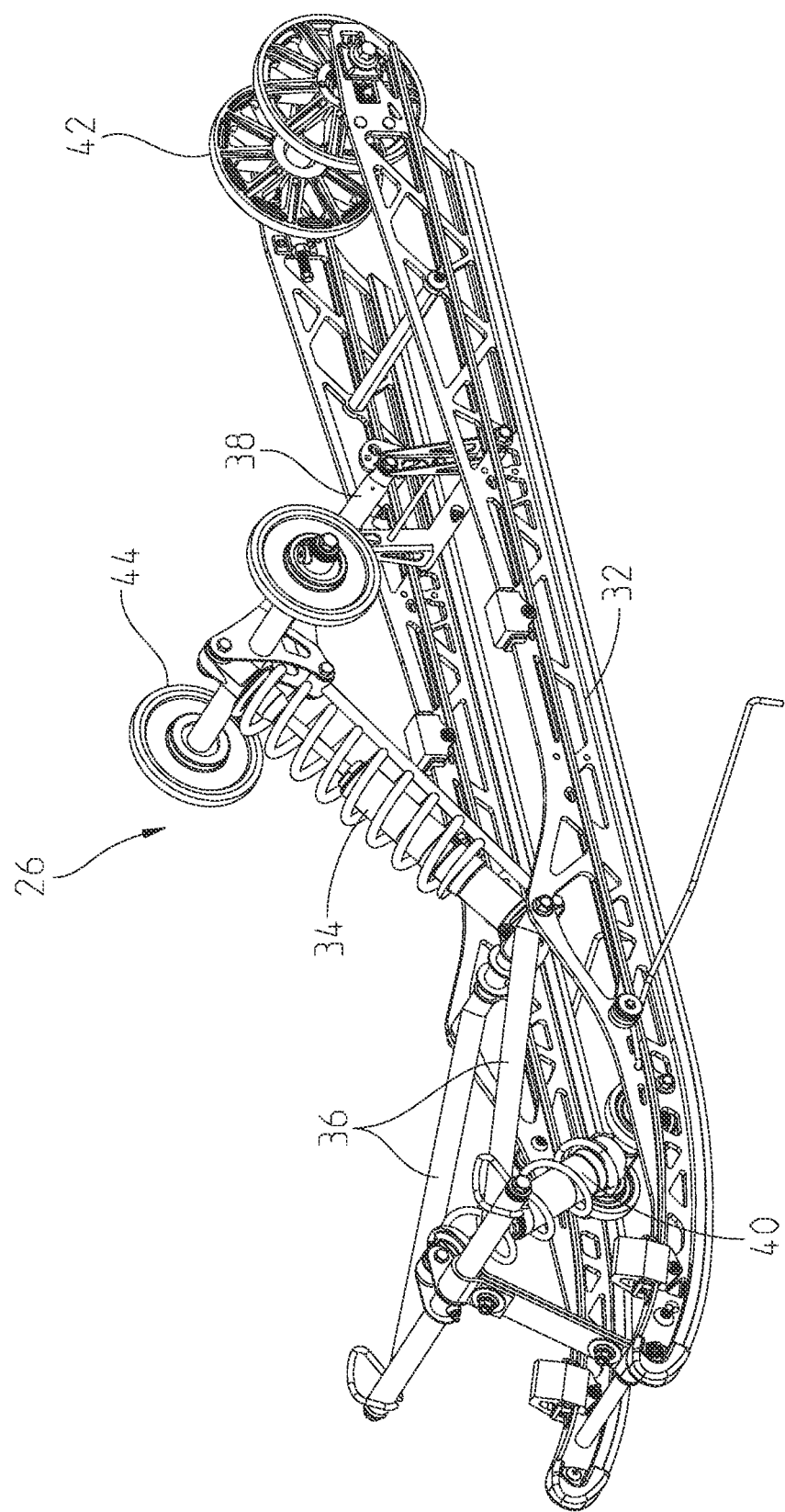
FIG. 3 illustrates the track suspension of the exemplary snowmobile of FIG. 1.
Figure 4:
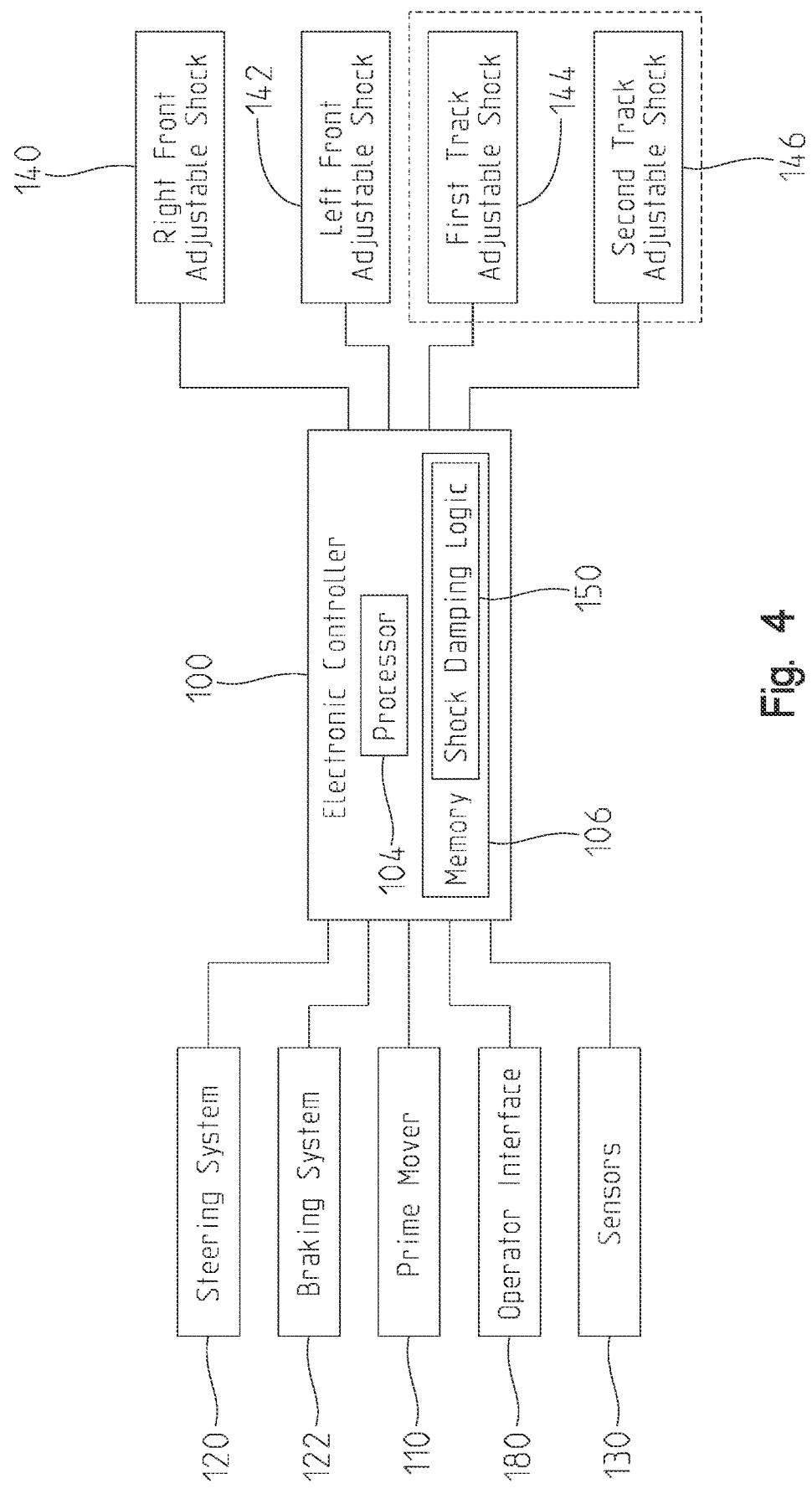
FIG. 4 illustrates a representative view of components of the exemplary snowmobile of FIG. 1 including a suspension with a plurality of continuous damping control shock absorbers, an operator interface, and a plurality of sensors integrated with a controller of the snowmobile.

As shown in FIG. 3, rear suspension assembly 26 includes a plurality of slide rails 32, a front track adjustable shock absorber 144 positioned inside of an interior of endless track 18, a rear track adjustable shock absorber 146 positioned inside of the interior of endless track 18, a plurality of torque arms 36 operably coupled to a forward, lower end of rear track adjustable shock absorber 146, and a link assembly 38 operably coupled to a rear, upper end of rear track adjustable shock absorber 146. In one embodiment, torque arms 36 may be comprised of forged aluminum, which may reduce the overall weight of snowmobile 10. Additionally, rear suspension assembly 26 may include front track adjustable shock absorber 144 positioned forward of rear track adjustable shock absorber 146 and operably coupled to torque arms 36 and slide rails 32.

Figure 2:
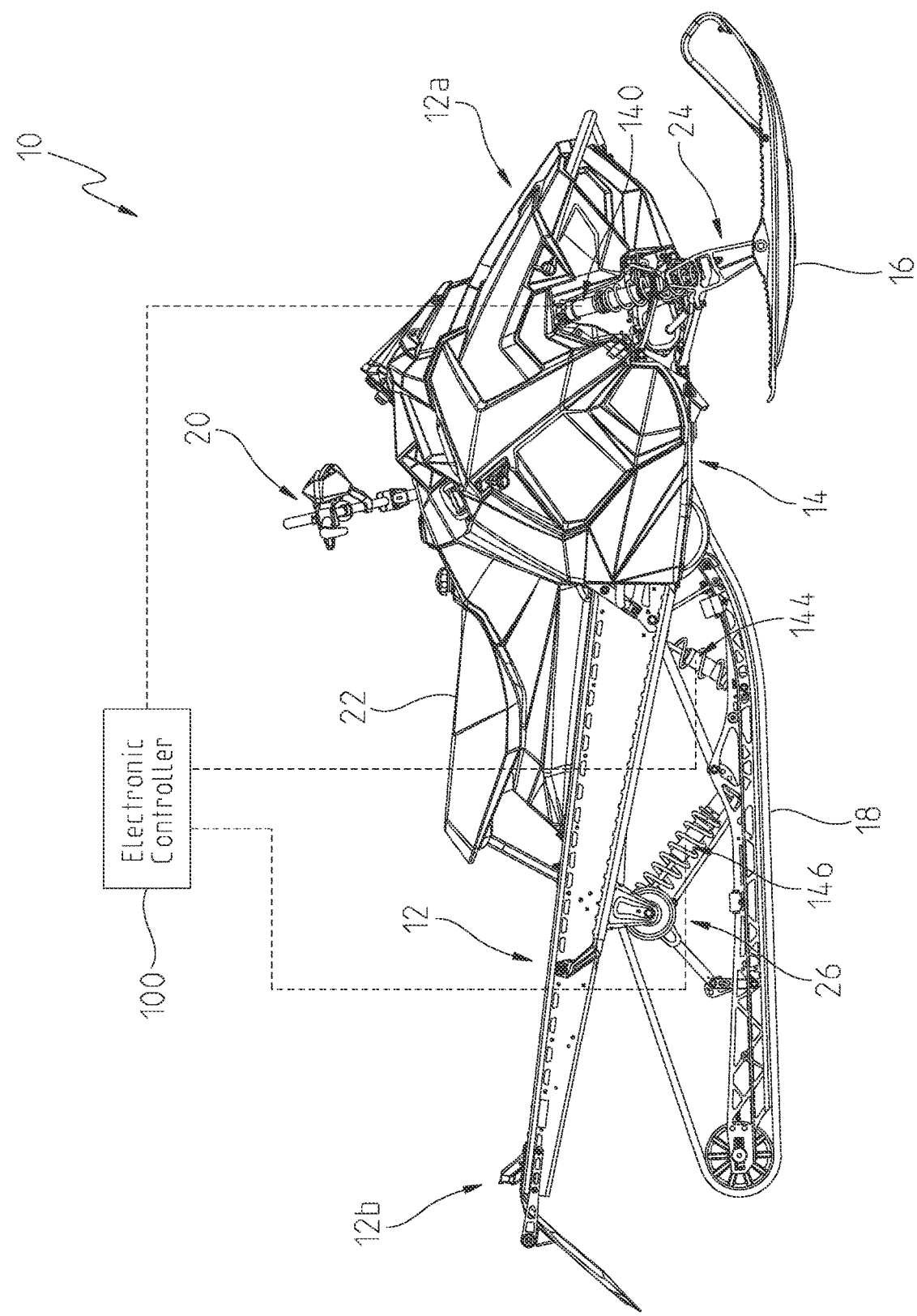
FIG. 2 illustrates a right side view of the exemplary snowmobile of FIG. 1.

Rear suspension assembly 26 also includes a plurality of rear idler wheels 42 rotatably coupled to the rear end of slide rails 32 and a plurality of carrier wheels 44 laterally adjacent the rear, upper end of rear track adjustable shock absorber 146. Rear idler wheels 42 and carrier wheels 44 are configured to maintain tension in endless track 18. Additionally, the position of rear idler wheels 42 on slide rails 32 may be adjusted to adjust the tension in endless track 18. As shown in FIGS. 1 and 2, endless track 18 generally surrounds rear suspension assembly 26 and is supported on at least slide rails 32, rear idler wheels 42, and carrier wheels 44. Rear suspension assembly 26 is configured to cooperate with endless track 18 when snowmobile 10 is operating. In particular, rear suspension assembly 26 is configured to move longitudinally and vertically during operation of snowmobile 10, and the tension in endless track 18 is maintained throughout the movement of rear suspension assembly 26 by at least rear idler wheels 42.

Figure 1A:
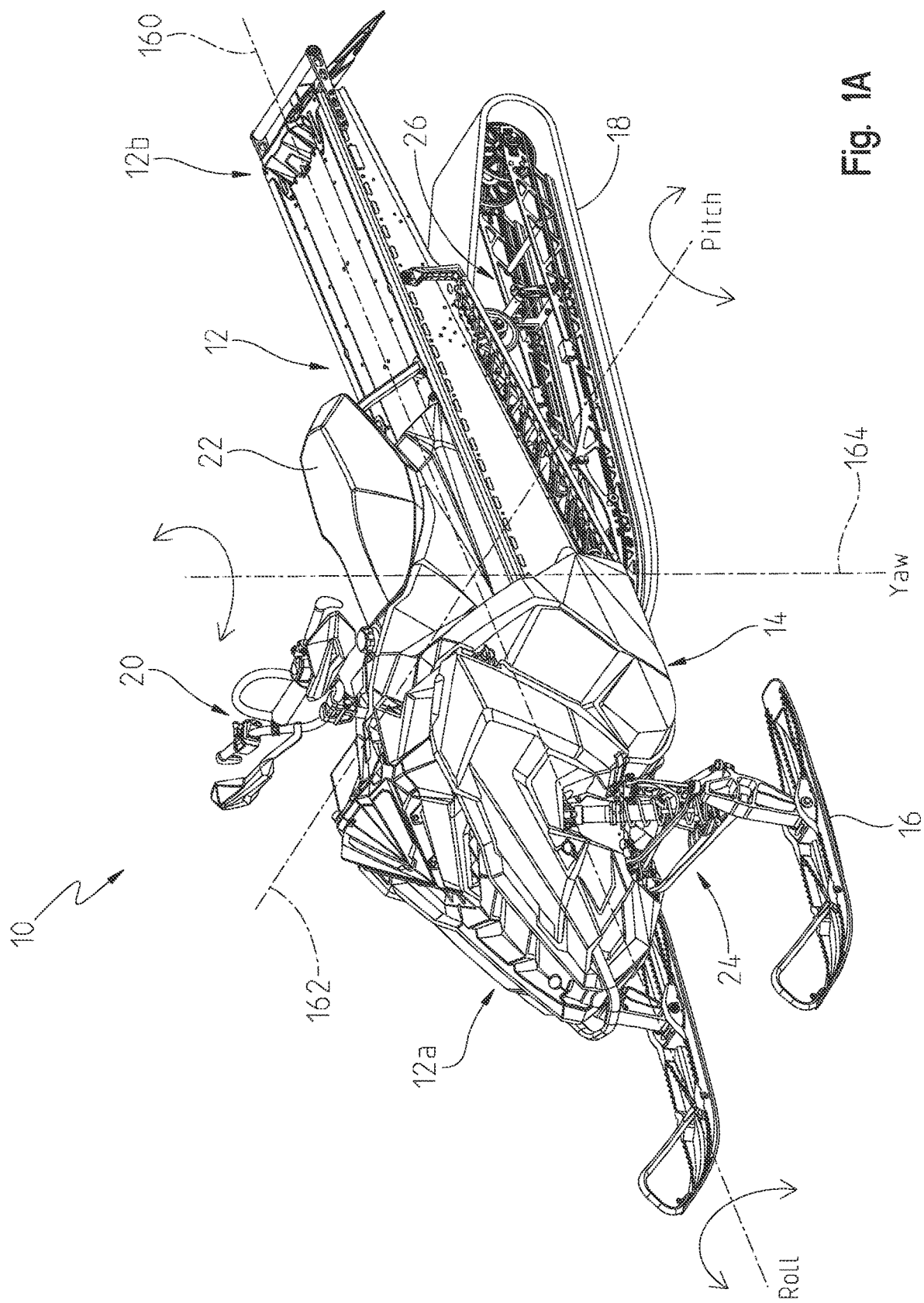
FIG. 1A illustrates a left front perspective view of the exemplary snowmobile of FIG. 1 illustrating a yaw-axis, a pitch-axis, and a roll-axis for the snowmobile.
Figure 1B:
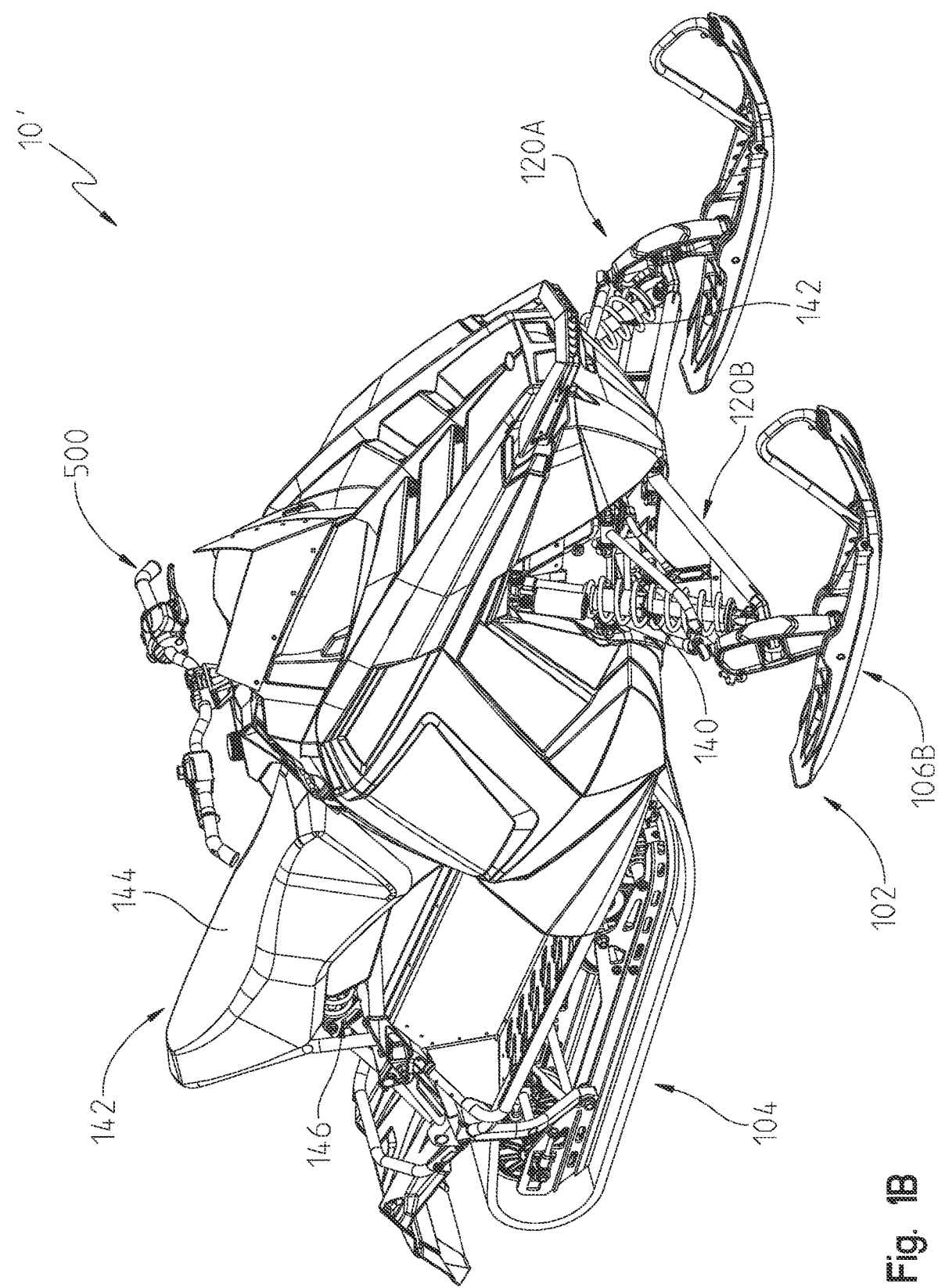
FIG. 1B illustrates a right front perspective view of another exemplary snowmobile having another exemplary shock setup relative to the endless track of the snowmobile.
Figure 1C:
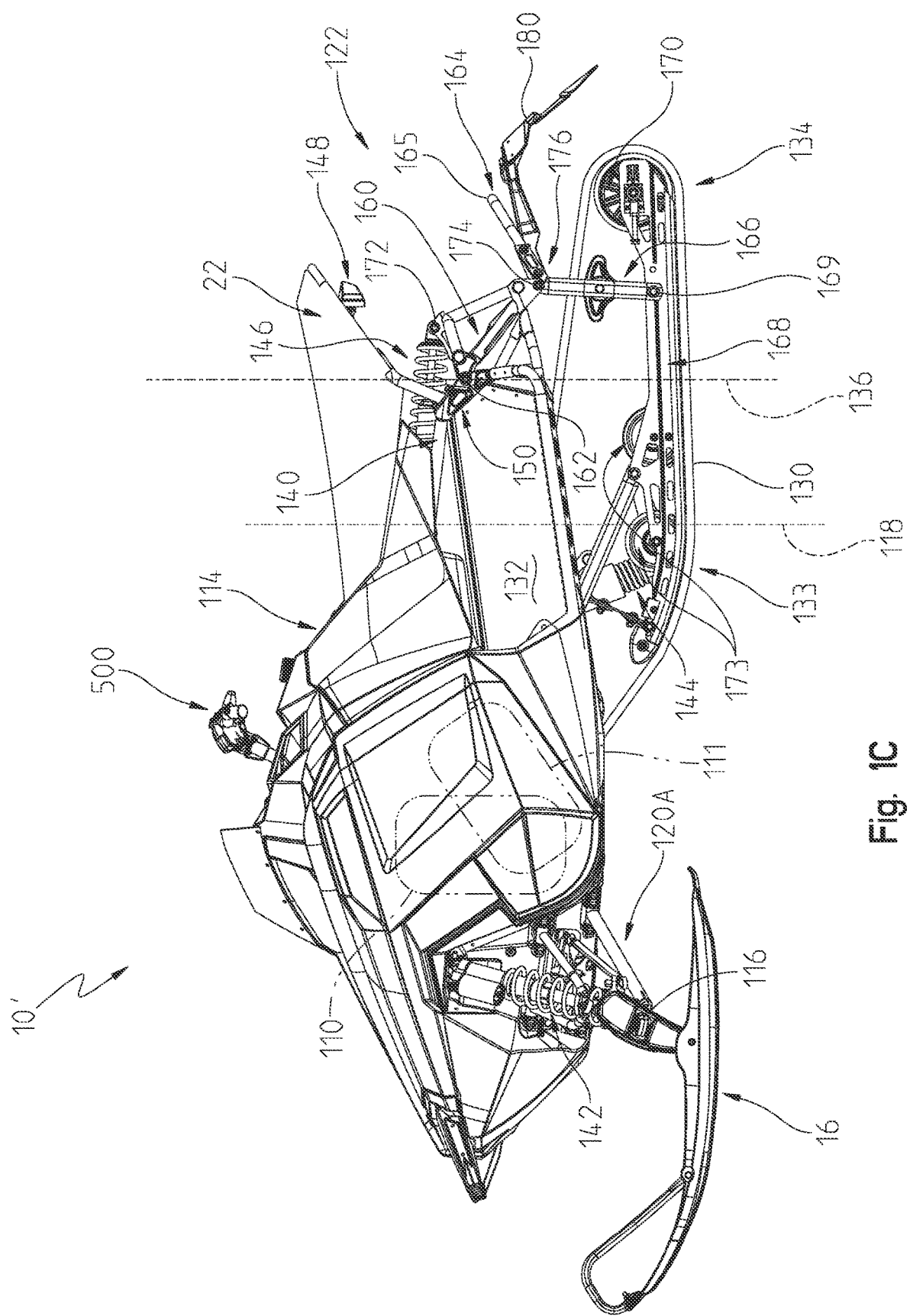
FIG. 1C illustrates a left side view of the exemplary snowmobile of FIG. 1B.

Referring to FIGS. 1B and 1C, a snowmobile 10' is shown having a different rear suspension 24' than snowmobile 10. Rear suspension 24' positions front track adjustable shock absorber 144 inside the interior of the endless track 18 and rear track adjustable shock absorber 146 outside of the interior of endless track 18 and, in particular, above endless track 18. As shown in FIG. 1A, endless track 18 has a lateral width W. For each of snowmobile 10 and snowmobile 10', front track adjustable shock absorber 144 and rear track adjustable shock absorber 146 are laterally positioned within the later width W of endless track 18. Throughout the disclosure, snowmobile 10 should be interpreted to read snowmobile 10, 10' in discussing the damping characteristics of right front adjustable shock absorber 140, left front adjustable shock absorber 142, front track adjustable shock absorber 144, and rear track adjustable shock absorber 146.

Right front adjustable shock absorber 140, left front adjustable shock absorber 142, front track adjustable shock absorber 144, and rear track adjustable shock absorber 146 are adjustable shock absorbers, the damping characteristics of which are continuously controlled by an electronic controller 100. In embodiments, endless track 18 includes one adjustable shock absorbers and a standard shock absorber, such as a manually adjustable shock absorber. In embodiments, electronic controller 100 updates the damping characteristics of right front adjustable shock absorber 140, left front adjustable shock absorber 142, front track adjustable shock absorber 144, and rear track adjustable shock absorber 146 during movement of snowmobile 10, 10'. Electronic controller 100 continuously controls right front adjustable shock absorber 140, left front adjustable shock absorber 142, front track adjustable shock absorber 144, and rear track adjustable shock absorber 146 by updating the desired damping characteristics of right front adjustable shock absorber 140, left front adjustable shock absorber 142, front track adjustable shock absorber 144, and rear track adjustable shock absorber 146 based on monitored sensor values, received operator inputs, and/or other inputs at discrete instances of time. An exemplary time interval is about 1 milli-seconds to about 5 milliseconds. For example, electronic controller 100 updates targets for each of right front adjustable shock absorber 140, f142, front track adjustable shock absorber 144, rear track adjustable shock absorber 146 about every 5 milliseconds and updates the current control loop about every milli-second.

In embodiments, the damping characteristics of front track adjustable shock absorber 144 are controlled by electronic controller 100 while rear track adjustable shock absorber 146 is manually adjustable independent of electronic controller 100. In embodiments, the damping characteristics of rear track adjustable shock absorber 146 are controlled by electronic controller 100 while front track adjustable shock absorber 144 is manually adjustable independent of electronic controller 100. In embodiments, the arrangement and control of one or both of front track adjustable shock absorber 144 and rear track adjustable shock absorber 146 of rear suspension 26 is applicable to single front ski vehicles, such as snowbikes. A snowbike may have one or more shocks associated with the front ski. These one or more shocks may be adjustable shock absorbers controlled by controller 100 is a similar manner as right front adjustable shock absorber 140 and left front adjustable shock absorber 142.

In embodiments, right front adjustable shock absorber 140, left front adjustable shock absorber 142, front track adjustable shock absorber 144, and rear track adjustable shock absorber 146 include solenoid valves mounted at the base of the shock body or internal to a damper piston of the respective right front adjustable shock absorber 140, left front adjustable shock absorber 142, front track adjustable shock absorber 144, and rear track adjustable shock absorber 146. The stiffness of the shock absorber is increased or decreased by introducing additional fluid to the interior of the shock absorber, removing fluid from the interior of the shock absorber, and/or increasing or decreasing the ease with which fluid can pass from a first side of a damping piston of the shock absorber to a second side of the damping piston of the shock absorber. In another embodiments, right front adjustable shock absorber 140, left front adjustable shock absorber 142, front track adjustable shock absorber 144, and rear track adjustable shock absorber 146 include a magnetorheological fluid internal to the respective right front adjustable shock absorber 140, left front adjustable shock absorber 142, front track adjustable shock absorber 144, and rear track adjustable shock absorber 146. The stiffness of the shock is increased or decreased by altering a magnetic field experienced by the magnetorheological fluid. Additional details on exemplary adjustable shocks are provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein. In one embodiment, right front adjustable shock absorber 140, left front adjustable shock absorber 142, front track adjustable shock absorber 144, and rear track adjustable shock absorber 146 each include a first controllable proportional valve to adjust compression damping and a second controllable proportional valve to adjust rebound damping. In another embodiment, right front adjustable shock absorber 140, left front adjustable shock absorber 142, front track adjustable shock absorber 144, and rear track adjustable shock absorber 146 each include a combination proportional valve which controls both compression damping and rebound damping.

Additional details of frame 12, body assembly 14, endless track 18, front suspension assembly 24, rear suspension assembly 26, and the powertrain assembly for snowmobile 10, 10' and other exemplary snowmobiles are disclosed in U.S. Pat. Nos. 7,891,454, 8,590,654, 8,820,458, 8,944,204, 9,428,232, 9,540,072, 9,809,195, and 10,358,187, the complete disclosures of which are expressly incorporated by reference herein Referring to FIG. 4, electronic controller 100 includes at least one processor 104 and at least one non-transitory computer readable medium, memory 106. In embodiments, electronic controller 100 is a single unit that controls the operation of various systems of snowmobile 10. In embodiments, electronic controller 100 is a distributed system comprised of multiple controllers each of which control one or more systems of snowmobile 10 and may communicate with each other over one or more wired and/or wireless networks. For example, electronic controller 100 may include a suspension controller 200 (see FIG. 6) which controls the damping characteristics of each of right front adjustable shock absorber 140, left front adjustable shock absorber 142, front track adjustable shock absorber 144, and rear track adjustable shock absorber 146 and an engine controller 204 which controls the operator of a prime mover 110 (see FIG. 4) of snowmobile 10.

Electronic controller 100 includes shock damping logic 150 which controls the damping characteristics of right front adjustable shock absorber 140, left front adjustable shock absorber 142, front track adjustable shock absorber 144, and rear track adjustable shock absorber 146. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 100 is not microprocessor-based, but rather is configured to control operation of right front adjustable shock absorber 140, left Front adjustable shock absorber 142, front track adjustable shock absorber 144, and rear track adjustable shock absorber 146 based on one or more sets of hardwired instructions.

Figure 7:
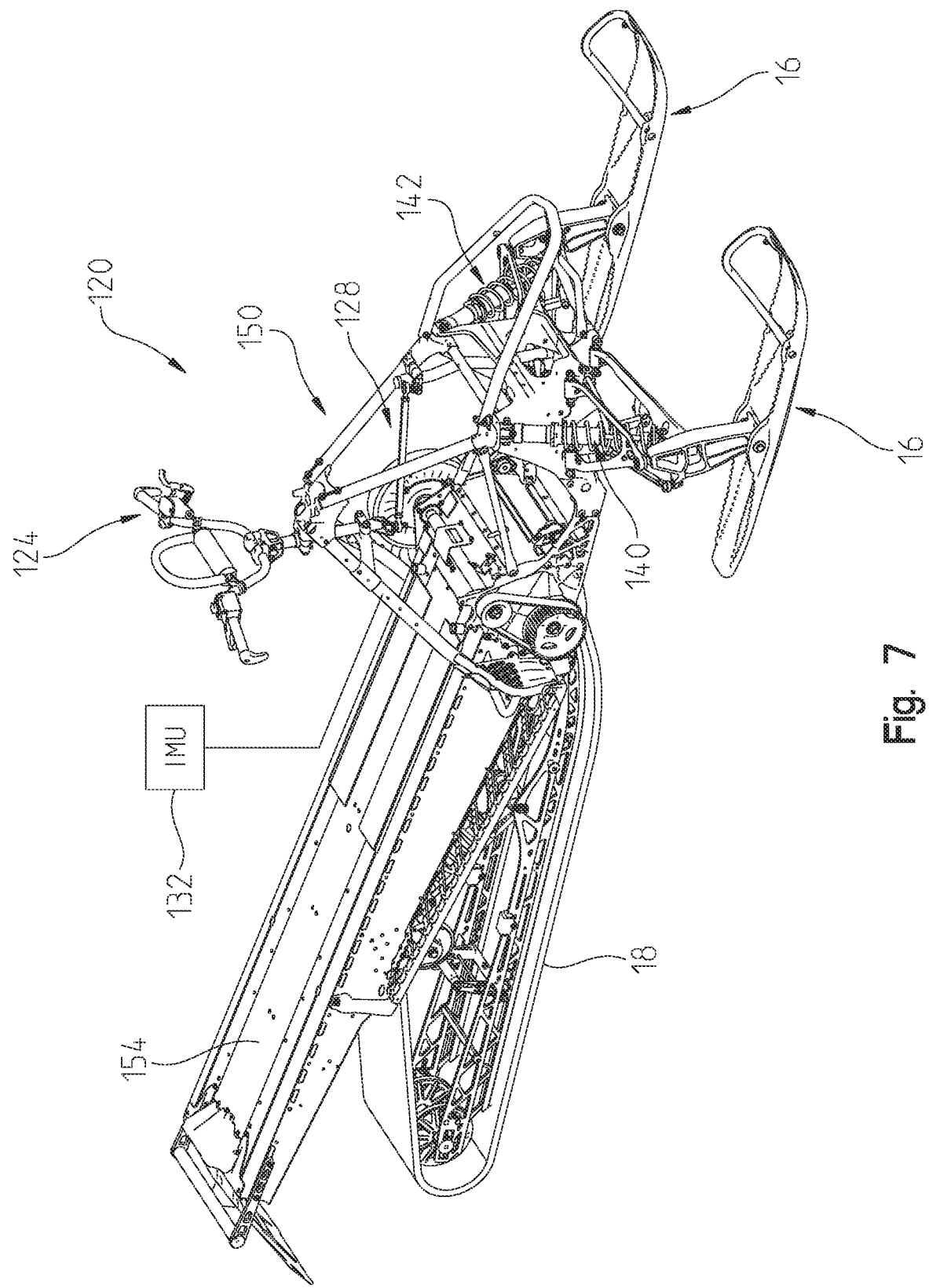
FIG. 7 illustrates a right front perspective view of the exemplary snowmobile of FIG. 1 illustrating a tunnel covering an endless track ground engaging member and a pyramidal frame.

Returning to FIG. 4, electronic controller 100 provides the electronic control of and/or monitors the various components of snowmobile 10, illustratively prime mover 110, a steering system 120, and a braking system 122. Exemplary prime movers include two-cycle combustion engines, four-cycle combustion engines, electric motors, and other suitable motive devices. Prime mover 110 is operatively coupled to endless track 18 through a transmission. Exemplary transmissions include shiftable transmissions, continuously variable transmissions, and combinations thereof. An exemplary steering system 120 is shown in FIG. 7 including handlebars 124 attached to a steering post 126 which in turn is coupled to a steering linkage 128. The steering linkage 128 is coupled to skis 16 to adjust an orientation of skis 16 relative to the ground.

Further, electronic controller 100 is operatively coupled to a plurality of sensors 130 (see FIG. 4) which monitor various parameters of snowmobile 10 or the environment surrounding snowmobile 10. Exemplary sensors 130 include a global positioning sensor (GPS) 131, an inertial measurement unit ("IMU") 132, an engine speed sensor 133, a brake switch 134, a brake pressure sensor 135, a steering angle sensor 136, a transmission gear selection sensor 137, a throttle position sensor 138, a vehicle speed sensor 139, an air pressure sensor 141.

GPS sensor 131 provides a location of snowmobile 10 on the surface of the earth. IMU 132 includes a three-axis accelerometer and a three-axis gyroscope. Referring to FIG. 1A, the three-axis accelerometer provides acceleration data of snowmobile 10 along axes 160, 162, and 164 and the three-axis gyroscope provides angular information regarding rotation about each of axes 160, 162, and 164. IMU 132 is illustratively supported (see FIG. 7) on the chassis 150 of snowmobile 10 to provide an indication of acceleration forces of the vehicle during operation. In embodiments, IMU 132 is attached to a tunnel 154 of chassis 150 which covers track 18. In embodiments, IMU 132 is attached to an over structure frame 156 of chassis 150. In embodiments, IMU 132 is located within an interior of an over structure frame 156 of chassis 150. In embodiments, IMU 132 is located vertically in line with a steering post 126 (see FIG. 7) of snowmobile 10 within an interior of an over structure frame 156 of chassis 150. In embodiments, IMU 132 is mounted proximate to frame 156, such as on a front side of a fuel tank 114 (see FIG. 1C) or integrated into a wall of the fuel tank. In embodiments, IMU 132 is located longitudinally between a fuel tank and a prime mover 110 of snowmobile 10. In embodiments, IMU 132 is located between a spindle 116 (see FIG. 1C) of the left ski 16 and a rear end 118 of a fuel tank 114 supported by the plurality of ground engaging members. In embodiments, IMU 132 is located along a longitudinal centerline plane snowmobile 10. In embodiments, IMU 132 is located at a center of gravity of snowmobile 10. In embodiments, IMU 132 is offset from the center of gravity of snowmobile 10 and the readings of the three-axis gyroscope are used by electronic controller 100 to determine the acceleration values of snowmobile 10 at the center of gravity of snowmobile 10. In one embodiment, IMU is integrated into electronic controller 100, such as integrated into suspension controller 200. In one embodiment, IMU is spaced apart from electronic controller 100. In embodiments, IMU 132 is isolated from chassis 150 with isolation mounts, such as rubber mounts, to reduce the amount of engine vibration experienced by the IMU 132.

Engine speed sensor 133 monitors a crankshaft speed of the engine. In embodiments, the crankshaft speed is provided to controller 100 by the engine control module ("ECU").

Brake switch 134 monitors an actuation of an operator brake input, such as a foot actuated input or a hand actuated input. Steering angle sensor 136 monitors a rotation angle of steering post 126 (see FIG. 7). In embodiments, steering system 120 includes an electronic power steering unit. In embodiments, steering system does not include an electronic power steering unit. In the embodiments without an electronic power steering unit, steering angle sensor 136 is supported either in front of the engine below the exhaust ports of the engine or rearward of the engine and above the throttle bodies of the engine.

Throttle position sensor 138 monitors an actuation of a throttle input, such as a foot actuated input or a hand actuated input. Vehicle speed sensor 139 monitors a ground speed of snowmobile 10. In one example, a speed of endless track 18 is monitored by vehicle speed sensor 139 and used as an indication of the speed of snowmobile 10 relative to the ground. In embodiments, snowmobile 10 has a single vehicle speed sensor 139 which monitors a movement of endless track 18.

Brake pressure sensor 135 is a transducer that measures the pressure in applied by the operator in the brake lines of the braking system.

Steering angle sensor 136 monitors a rotational movement of the steering column or monitors other movements of portions of the steering system.

Transmission gear selection sensor 137 monitors an input from the engine control module of the gear selection for a shiftable transmission and/or a rotational direction of the crankshaft for forward and reverse directions.

Vehicle speed sensor 139 measures ground speed by monitoring a rotational speed of the track drive shaft or other measurements of rotational members of the drive line which are indicative of ground speed.

Air pressure sensor 141 monitors one of ambient barometric pressure and/or the manifold air pressure in the engine intake system.

Electronic controller 100 also interacts with an operator interface 180 (see FIGS. 4 and 5) which includes at least one input device 182 and at least one output device 184. Exemplary input devices 182 include levers, buttons, switches, soft keys, and other suitable input devices. Exemplary output devices 184 include lights, displays, audio devices, tactile devices, and other suitable output devices. In embodiments, operator interface 180 includes a display 190, such as a touch screen display, and electronic controller 100 interprets various types of touches to the touch screen display as inputs and controls the content displayed on touch screen display.

Figure 5:
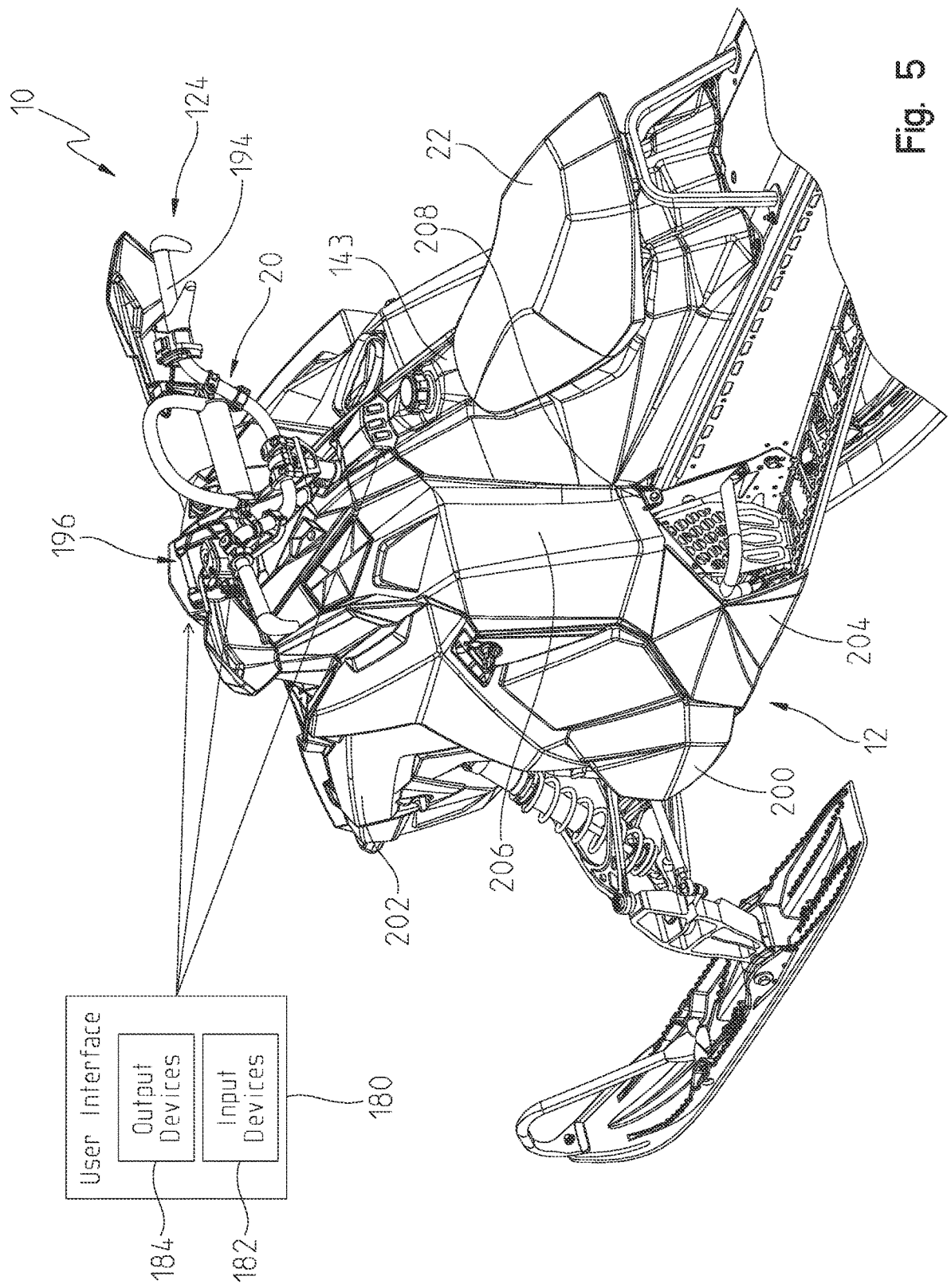
FIG. 5 illustrates a partial left rear perspective view of the exemplary snowmobile of FIG. 1.

Referring to FIG. 5, operator interface 180 may include one or more switches 192, one or more inputs 194 supported by handlebars 124, and one or more parts of an instrument cluster 196 which may include display 190. In embodiments, referring to FIG. 6, operator interface 180 includes a mode select input 170, a driver actuatable suspension adjust input 172, and a launch mode input 174. The mode select input permits an operator to select between at least three setups of snowmobile 10, each having predefined base damping characteristics for right front adjustable shock absorber 140, left front adjustable shock absorber 142, front track adjustable shock absorber 144, and rear track adjustable shock absorber 146.

Exemplary modes selectable with mode select input 170 include a comfort mode, a handling mode, and a rough trail mode. In the comfort mode both compression and rebound damping of each of right front adjustable shock absorber 140, left front adjustable shock absorber 142, front track adjustable shock absorber 144, and rear track adjustable shock absorber 146 are lower than the rough trail mode. In one example, the compression and rebound damping are generally constant for vehicle speed and longitudinal acceleration. In the rough trail mode, the compression damping of each of right front adjustable shock absorber 140, left front adjustable shock absorber 142, front track adjustable shock absorber 144, and rear track adjustable shock absorber 146 are generally higher than the comfort mode and the handling mode based on vehicle speed and longitudinal acceleration. The rebound damping in the rough trail mode will be maintained or lowered the respective shock absorbers will be more prone to extend and therefore have more shock length to absorb compression events. In the handling mode, the compression damping of each of right front adjustable shock absorber 140, left front adjustable shock absorber 142, front track adjustable shock absorber 144, and rear track adjustable shock absorber 146 is lower than the comfort mode and the rough handling mode based on vehicle speed and longitudinal acceleration and the rebound damping is higher than the comfort mode based on vehicle speed and longitudinal acceleration. The dynamic ride height for snowmobile 10 is lowest for the handling mode and highest for the rough trail mode. In embodiments, the selected mode provides base damping characteristics for each of right front adjustable shock absorber 140, left front adjustable shock absorber 142, front track adjustable shock absorber 144, and rear track adjustable shock absorber 146. These base damping characteristics are updated by controller 200 based on the movement or predicted movement of snowmobile 10. Exemplary updates for the damping characteristics are provided herein. In embodiments, for the predicted longitudinal acceleration of the snowmobile 10, controller 200 actively reviews the engine torque and/or throttle position and adjusting the compression and rebound damping to counter predicted motion of snowmobile 10, such as diving or squatting. In an example, snowmobile 10 is traveling 80 MPH and the operator drops the throttle to 0%. In response, controller 200 increases the compression damping in right front adjustable shock absorber 140 and left front adjustable shock absorber 142 to counter a front end dive of snowmobile 10 and increases the rebound damping in front track adjustable shock absorber 144 and rear track adjustable shock absorber 146 to counter the lifting of the rear end.

In embodiments, a longitudinal acceleration of snowmobile 10 is measured based on one or more inputs, such as IMU 132, estimated based on one or more inputs, such as a monitored throttle position and/or a monitored engine rpm, or predicted based on one or more inputs as described herein.

Figure 30:
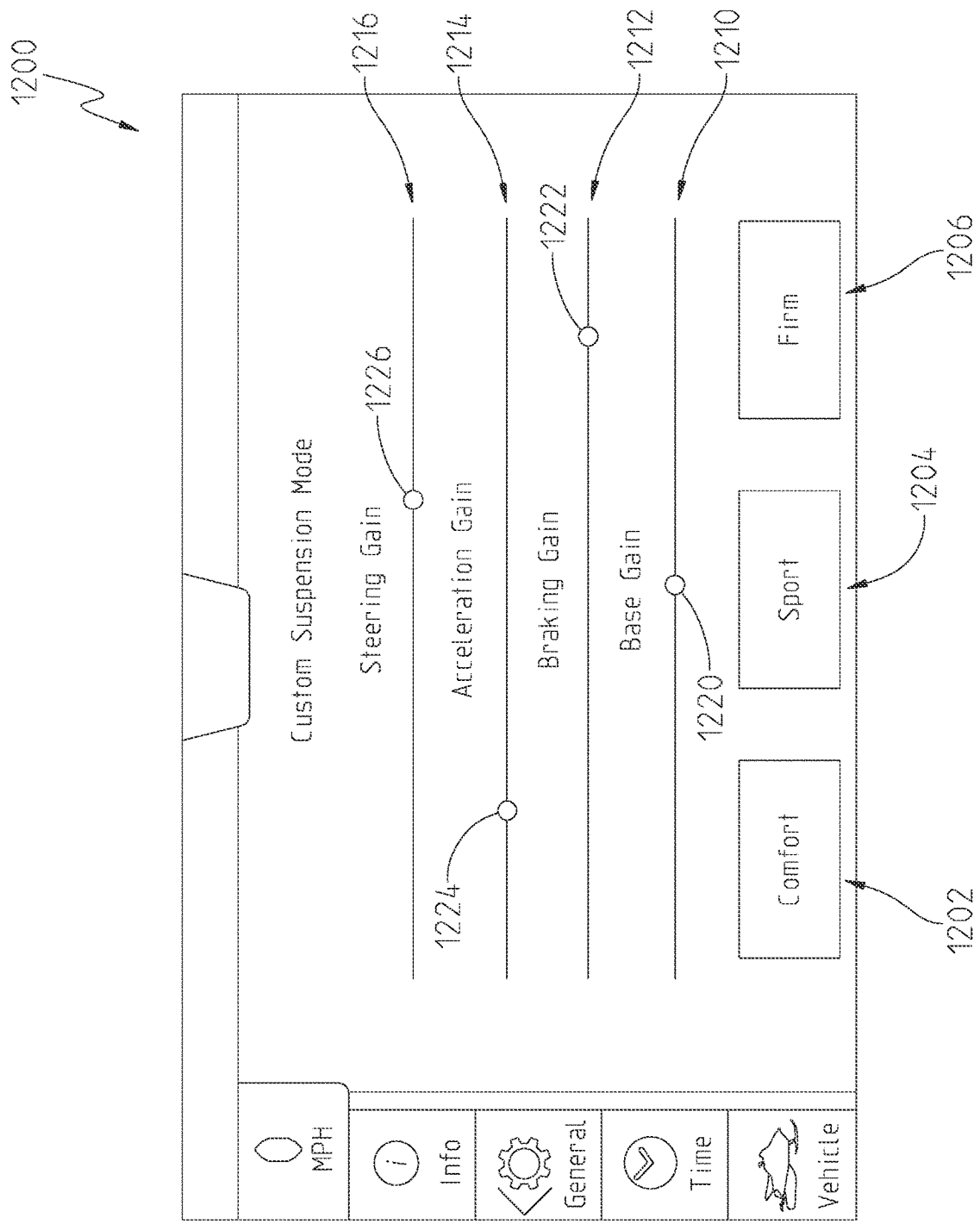
FIG. 30 illustrates an exemplary input screen for adjusting a gain for various damping profiles.

In embodiments, an operator may provide a gain coefficient to one or more damping profiles. Referring to FIG. 30, an exemplary input screen 1200 for display 190 is shown. Input screen 1200 is a custom suspension mode screen. An operator selects which mode to modify, by selecting one of comfort mode input 1202, sport mode input 1204, and firm mode input 1206. Also shown in FIG. 30 are slider inputs, illustratively base gain input 1210, braking gain input 1212, acceleration gain input 1214, and steering or cornering gain input 1216. Each of base gain input 1210, braking gain input 1212, acceleration gain input 1214, and steering post 126 have a respective slider 1220, 1222, 1224, and 1226. When a slider is centered, such as base gain slider 1220 of base gain input 1210, no change is made to the standard base damping profile for the selected mode. Moving a respective slider to the left on input screen 1200 reduces the standard base damping profile for the selected mode while moving a respective slider to the right on steering system 120 increases the standard base damping profile for the selected mode. In embodiments, a first screen is provided for right front adjustable shock absorber 140 and left front adjustable shock absorber 142 and a second screen is provided for front track adjustable shock absorber 144 and rear track adjustable shock absorber 146.

In embodiments, input screen 1200 further includes inputs for selecting one passenger (driver only) or two passengers and for indicating cargo weight. In embodiments, one or more of the damping profiles are adjusted automatically based on an input of the operator, such as the recognition of the operator and their rider profile settings in a rider profile. The rider profile may be stored in the electronic controller of the snowmobile 10, in a personal computing device (such as a mobile phone), a key fob, or retrieval from the cloud or remote computing device.

Figure 29A:
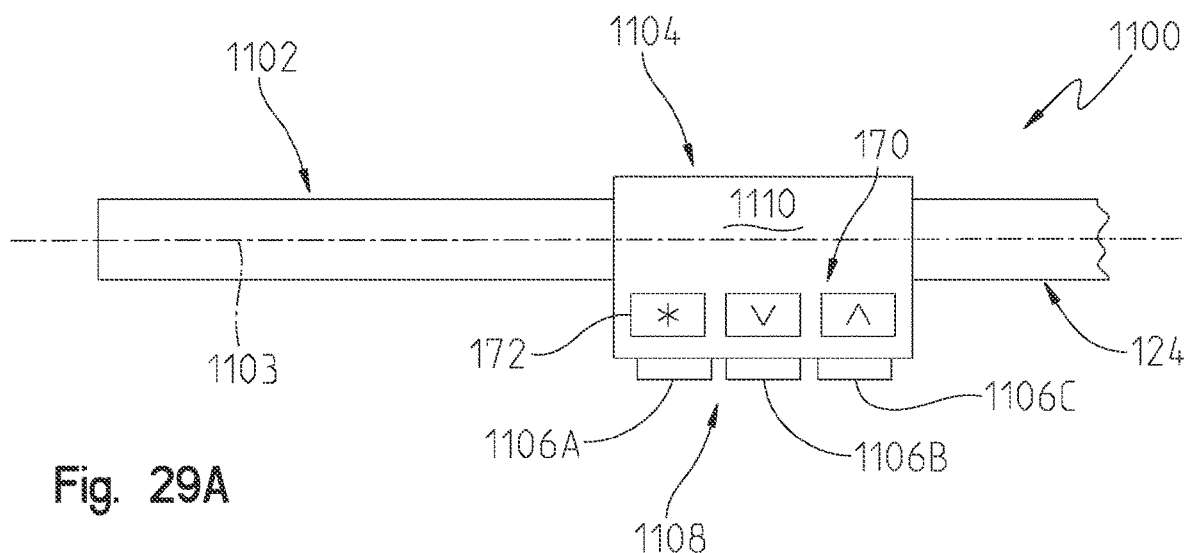
FIGS. 29A-C illustrate exemplary arrangements for inputs of exemplary operator interfaces.

Referring to FIG. 29A, an exemplary embodiment 1100 of operator interface 180 is illustrated. FIG. 29A illustrates a portion of the left handlebar 124 including a hand grip portion 1102 to be grasped by the left hand of the operator and an input housing 1104. Hand grip portion 1102 includes a longitudinal axis 1103. Input housing 1104 includes a plurality of actuatable inputs 1106A-C on a front face 1108 of input housing 1104 facing the seat 22. Exemplary inputs include a light input, heated grips input, and control inputs for display 190. Inputs 1106A-C may be any type of actuatable inputs including buttons, membrane switches, rockers, and other suitable inputs. Additional inputs are provided on a top face 1110 of input housing 1104. In embodiments, mode selection inputs 170 (up and down buttons for cycling through modes) and driver actuatable suspension adjust input 172 are provided on top face 1110 of input housing 1104. Inputs 170 and 172 may be any type of actuatable inputs including buttons, membrane switches, rockers, levers, triggers, and other suitable inputs. In embodiments, input 172 is positioned within a finger's or thumb's touch distance of a hand grip so that it may be actuated without requiring the operator to remove their hand from the grip. In embodiments, one or both of input 170 and input 172 may be positioned on front face 1108 and actuatable therefrom.

Figure 29B:
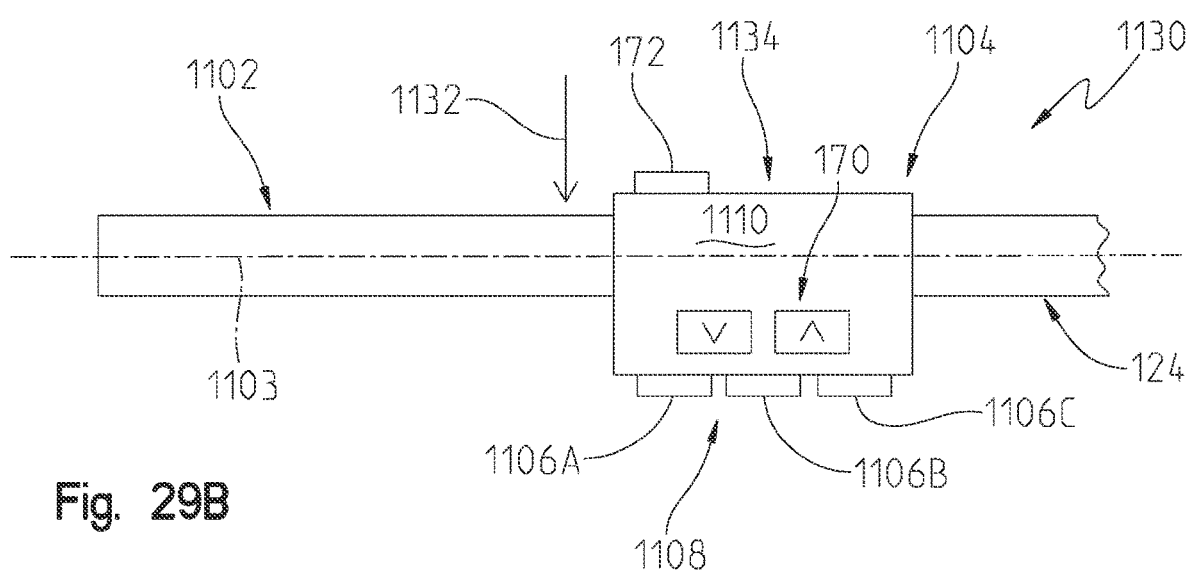

Referring to FIG. 29B, an exemplary embodiment 1130 of operator interface 180 is illustrated. FIG. 29B illustrates a portion of the left handlebar 124 including a hand grip portion 1102 to be grasped by the left hand of the operator and an input housing 1104. Hand grip portion 1102 includes a longitudinal axis 1103. Input housing 1104 includes a plurality of actuatable inputs 1106A-C on a front face 1108 of input housing 1104 facing the seat 22. Exemplary inputs include a light input, heated grips input, and control inputs for display 190. Inputs 1106A-C may be any type of actuatable inputs including buttons, membrane switches, rockers, and other suitable inputs. Additional inputs are provided on a top face 1110 of input housing 1104. In embodiments, mode selection inputs 170 (up and down buttons for cycling through modes) is provided on top face 1110 of input housing 1104. Additional inputs are provided on a rear face 1134 of input housing 1104, rear face 1134 being opposite of front face 1108. In embodiments, driver actuatable suspension adjust input 172 is provided on rear face 1134 of input housing 1104. Inputs 170 and 172 may be any type of actuatable inputs including buttons, membrane switches, rockers, levers, triggers, and other suitable inputs. Driver actuatable suspension adjust input 172 is depressed in direction 1132 towards front face 1108 to actuate driver actuatable suspension adjust input 172. In embodiments, input 172 is a lever or trigger which is one of pulled toward the operator in actuation or pushed away from the operator in actuation.

Figure 29C:
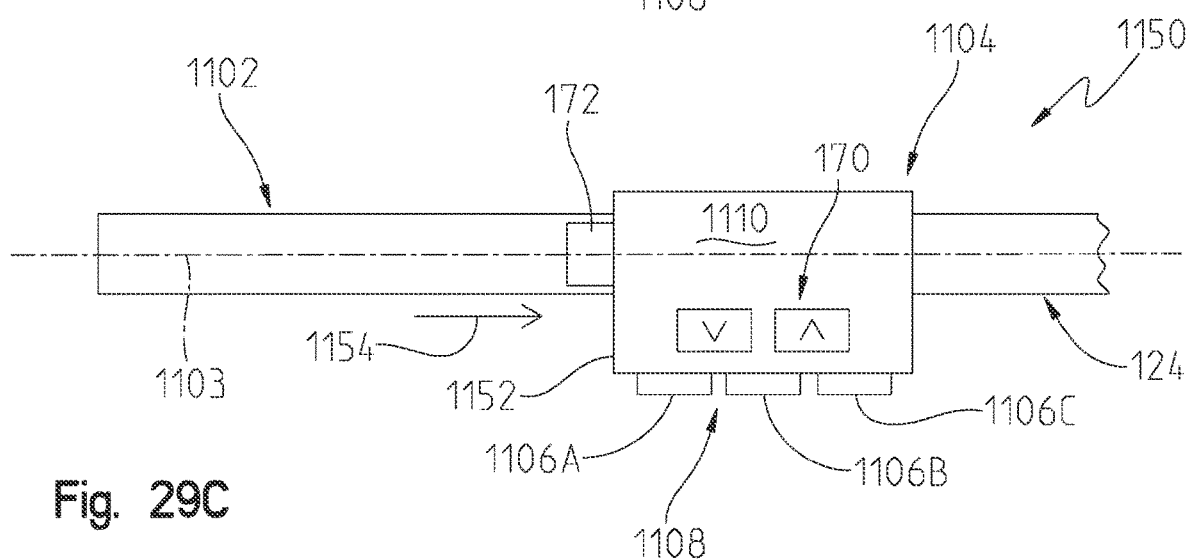

Referring to FIG. 29C, an exemplary embodiment 1150 of operator interface 180 is illustrated. FIG. 29C illustrates a portion of the left handlebar 124 including a hand grip portion 1102 to be grasped by the left hand of the operator and an input housing 1104. Hand grip portion 1102 includes a longitudinal axis 1103. Input housing 1104 includes a plurality of actuatable inputs 1106A-C on a front face 1108 of input housing 1104 facing the seat 22. Exemplary inputs include a light input, heated grips input, and control inputs for display 190. Inputs 1106A-C may be any type of actuatable inputs including buttons, membrane switches, rockers, and other suitable inputs. Additional inputs are provided on a top face 1110 of input housing 1104. In embodiments, mode selection inputs 170 (up and down buttons for cycling through modes) is provided on top face 1110 of input housing 1104. Additional inputs are provided on a hand grip side face 1152 of input housing 1104. In embodiments, driver actuatable suspension adjust input 172 is provided on hand grip side face 1152 of input housing 1104. Inputs 170 and 172 may be any type of actuatable inputs including buttons, membrane switches, rockers, and other suitable inputs. Driver actuatable suspension adjust input 172 is depressed in direction 1154 along 1103 to actuate driver actuatable suspension adjust input 172. In embodiments, the stroke of input 172 in direction 1154 is about 0.25 inches. In embodiments, input 172 includes tactile feedback to the operator of depression. In one example, input 172 and input housing 1104 cooperate to provide a "click" feel at the end of stroke of input 172 in direction 1154. In embodiments an operator interface surface of input 172 is a half-moon shape and can be actuated from hand grip face 1152 or front face 1108.

Although FIGS. 29A-C, illustrate exemplary placements for driver actuatable suspension adjust input 172, other inputs may occupy the respective positions. In embodiments, launch mode input 174 replaces driver actuatable suspension adjust input 172.

In embodiments, input 172 may be provided as one input of a multi-functional input device. For example, the multi-functional input device may provide the functionality of input 172 in response to a first actuation characteristic(s) (such as a sequence) and another functionality, such as mode change, in response to a second actuation characteristic(s) (such as a sequence).

Figure 6:
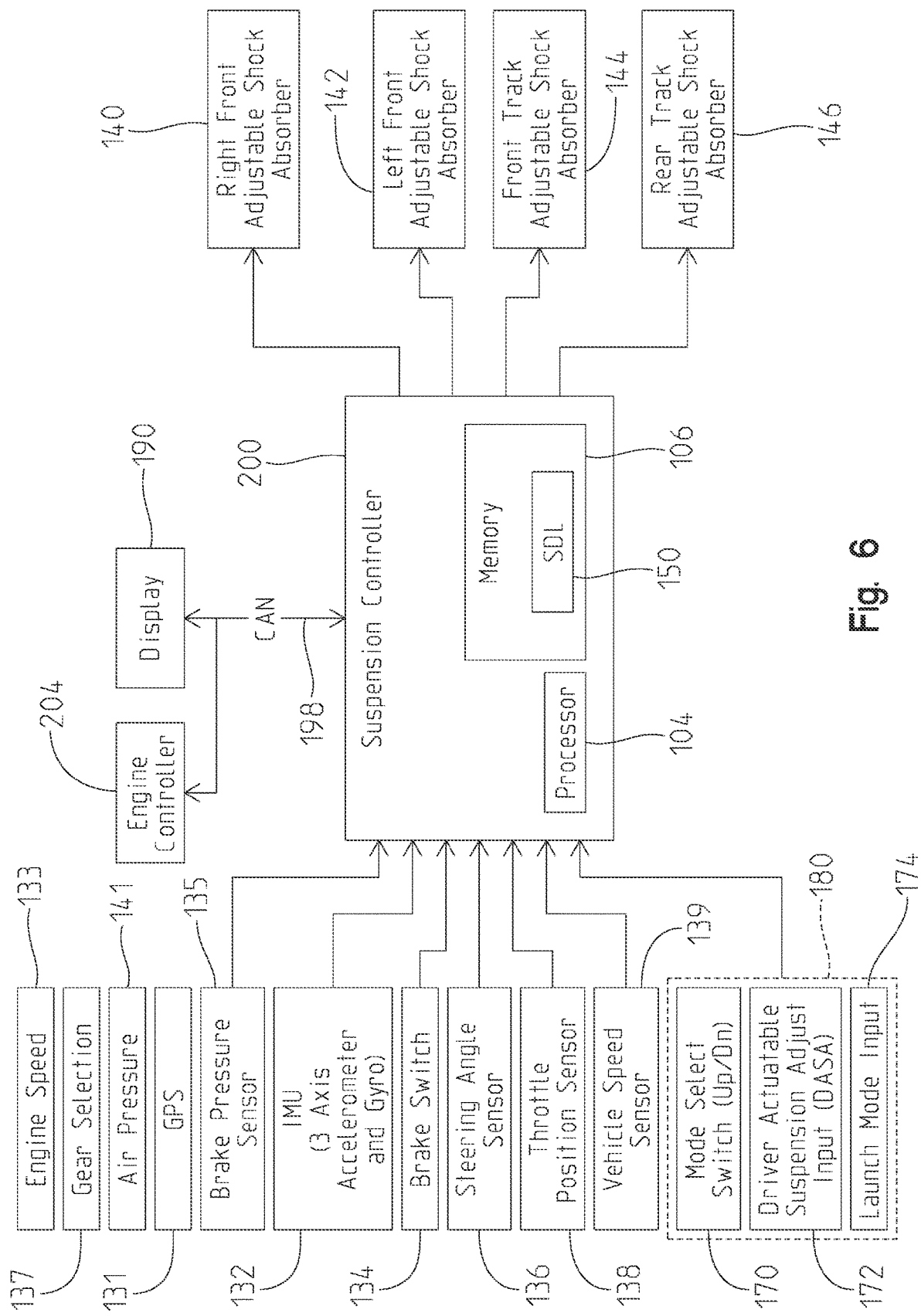
FIG. 6 illustrates a representative view of components of the exemplary snowmobile of FIG. 1 including a suspension with a plurality of continuous damping control shock absorbers, an operator interface, and a plurality of sensors integrated with a controller of the snowmobile.

The driver actuatable suspension adjust input 172 permits an operator to request a maximum stiffness for one or more of right front adjustable shock absorber 140, left front adjustable shock absorber 142, front track adjustable shock absorber 144, and rear track adjustable shock absorber 146. Exemplary operation of a driver actuatable suspension adjust input is discussed in U.S. Pat. No. 10,406,884, assigned to the assignee of the present application, the entire disclosure of which is incorporated by reference herein. Electronic controller 100 controls the operation of output devices 184 and monitors the actuation of input devices 182. Referring to FIG. 6, in embodiments, display 190 is operatively coupled to electronic controller 100 (illustratively suspension controller 200) over a network, illustratively a CAN network.

Figure 8A:
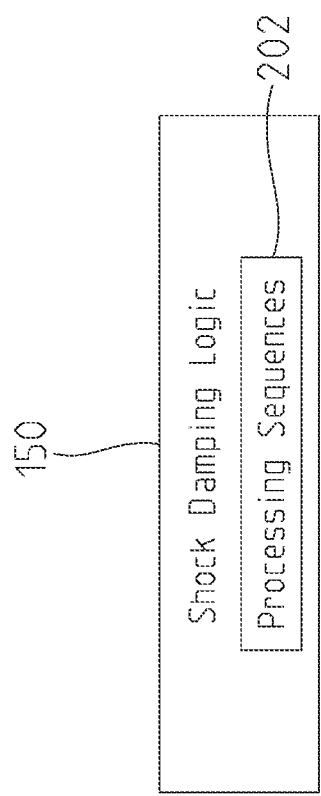
FIG. 8A illustrates a representative view of an exemplary shock damping logic of the electronic controller of FIG. 6.

Referring to FIG. 8A, shock damping logic 150 includes one or more processing sequences 202 which control the damping characteristics of one or more of right front adjustable shock absorber 140, left front adjustable shock absorber 142, front track adjustable shock absorber 144, and rear track adjustable shock absorber 146. In embodiments, shock damping logic 150 includes one or more functions which based on one or more inputs output a desired damping characteristic for each of right front adjustable shock absorber 140, left front adjustable shock absorber 142, front track adjustable shock absorber 144, and rear track adjustable shock absorber 146.

Figure 8B:
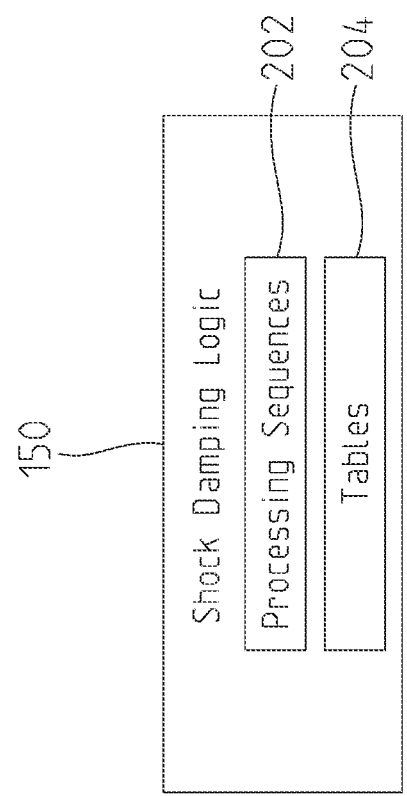
FIG. 8B illustrates a representative view of another exemplary shock damping logic of the electronic controller of FIG. 6.

Referring to FIG. 8B, shock damping logic 150 includes one or more processing sequences 202 which control the damping characteristics of one or more of right front adjustable shock absorber 140, left front adjustable shock absorber 142, front track adjustable shock absorber 144, and rear track adjustable shock absorber 146 and one or more look-up tables 204 which based on one or more inputs provides damping characteristics for each of right front adjustable shock absorber 140, left front adjustable shock absorber 142, front track adjustable shock absorber 144, and rear track adjustable shock absorber 146.

Figure 8C:
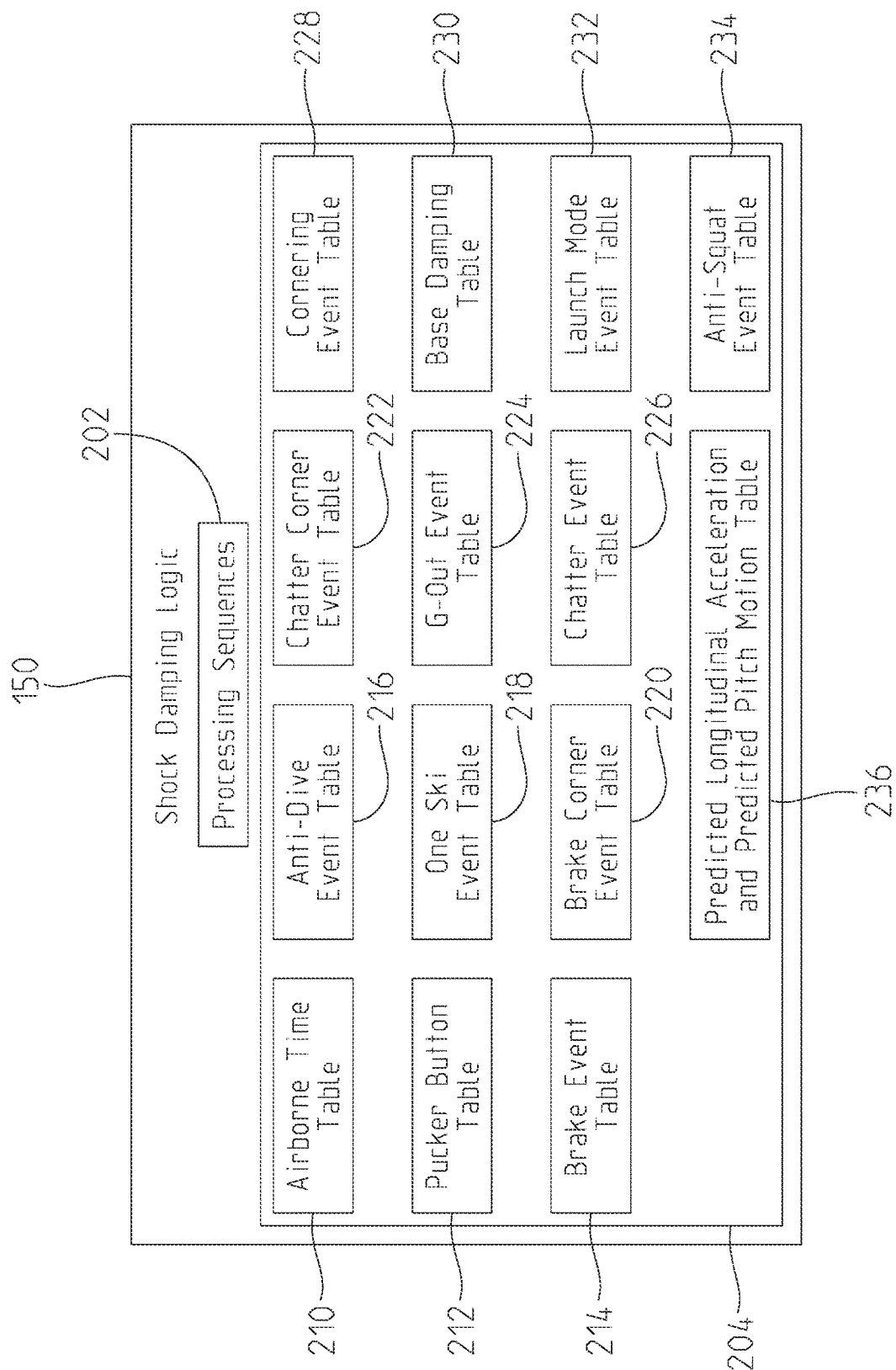
FIG. 8C illustrates a representative view of yet another exemplary shock damping logic of the electronic controller of FIG. 6.

Referring to FIG. 8C, shock damping logic 150 includes one or more processing sequences 202 which control the damping characteristics of one or more of right front adjustable shock absorber 140, left front adjustable shock absorber 142, front track adjustable shock absorber 144, and rear track adjustable shock absorber 146 and one or more look-up tables 204 which based on one or more inputs provides damping characteristics for each of right front adjustable shock absorber 140, left front adjustable shock absorber 142, front track adjustable shock absorber 144, and rear track adjustable shock absorber 146. Exemplary look-up tables include airborne time event table 210, driver actuatable suspension adjust input event table 212, brake event table 214, anti-dive event table 216, one ski event table 218, brake corner event table 220, chatter corner event table 222, g-out event table 224, chatter event table 226, corner event table 228, base damping table 230, launch mode event table 232, anti-squat event table 234, and a predictive longitudinal acceleration and predictive vehicle pitch table 236. The use of look-up tables 204 by processing sequences 202 are illustrated in the exemplary processing sequences of FIGS. 9-20 and 24. In embodiments, electronic controller 200 executes the exemplary processing sequences generally continuously while monitoring for operator inputs and sensor values. In one embodiment, electronic controller 200 updates the damping characteristics for each of right front adjustable shock absorber 140, left front adjustable shock absorber 142, front track adjustable shock absorber 144, and rear track adjustable shock absorber 146 every about 1 to about 5 milliseconds. For example, electronic controller 100 updates targets for each of right front adjustable shock absorber 140, f142, front track adjustable shock absorber 144, rear track adjustable shock absorber 146 about every 5 milliseconds and updates the current control loop about every 1 millisecond.

Electronic controller 200 when executing processing sequences 202 arbitrates which damping characteristics to use for right front adjustable shock absorber 140, left front adjustable shock absorber 142, front track adjustable shock absorber 144, and rear track adjustable shock absorber 146 based on the sensed values from sensors 130 and inputs from operator interface 180. In embodiments, the arbitration of electronic controller 200 for compression damping may be prioritized with airborne detection compression damping having the highest priority, followed by driver actuatable suspension adjust input 172 compression damping having the next highest priority, followed by cornering detection compression damping, followed by braking detection compression damping, followed by the maximum of the base compression damping based on mode selection and acceleration based detection compression damping. In one example, wherein the predictive longitudinal acceleration and predictive vehicle pitch processing sequence is used, the braking detection damping is taken into account with the predictive acceleration and pitch and thus following cornering detection compression damping is the maximum of the base compression damping based on mode selection and the predictive longitudinal acceleration and predictive vehicle pitch based detection compression damping. In embodiments, the arbitration of electronic controller 200 for rebound damping may be prioritized with airborne detection rebound damping having the highest priority including post landing time, followed by cornering detection rebound damping, followed by braking detection rebound damping, followed by the maximum of the base rebound damping based on mode selection and acceleration based detection rebound damping. In one example, wherein the predictive longitudinal acceleration and predictive vehicle pitch processing sequence is used the braking detection rebound damping is taken into account with the predictive acceleration and pitch and thus following cornering detection rebound damping is the maximum of the base rebound damping based on mode selection and the predictive longitudinal acceleration and predictive vehicle pitch based detection rebound damping. The above are exemplary arbitration priorities and different processing sequences may include different arbitration priorities based on the event detection tables provided and the desired performance of the vehicle.

Figure 24:
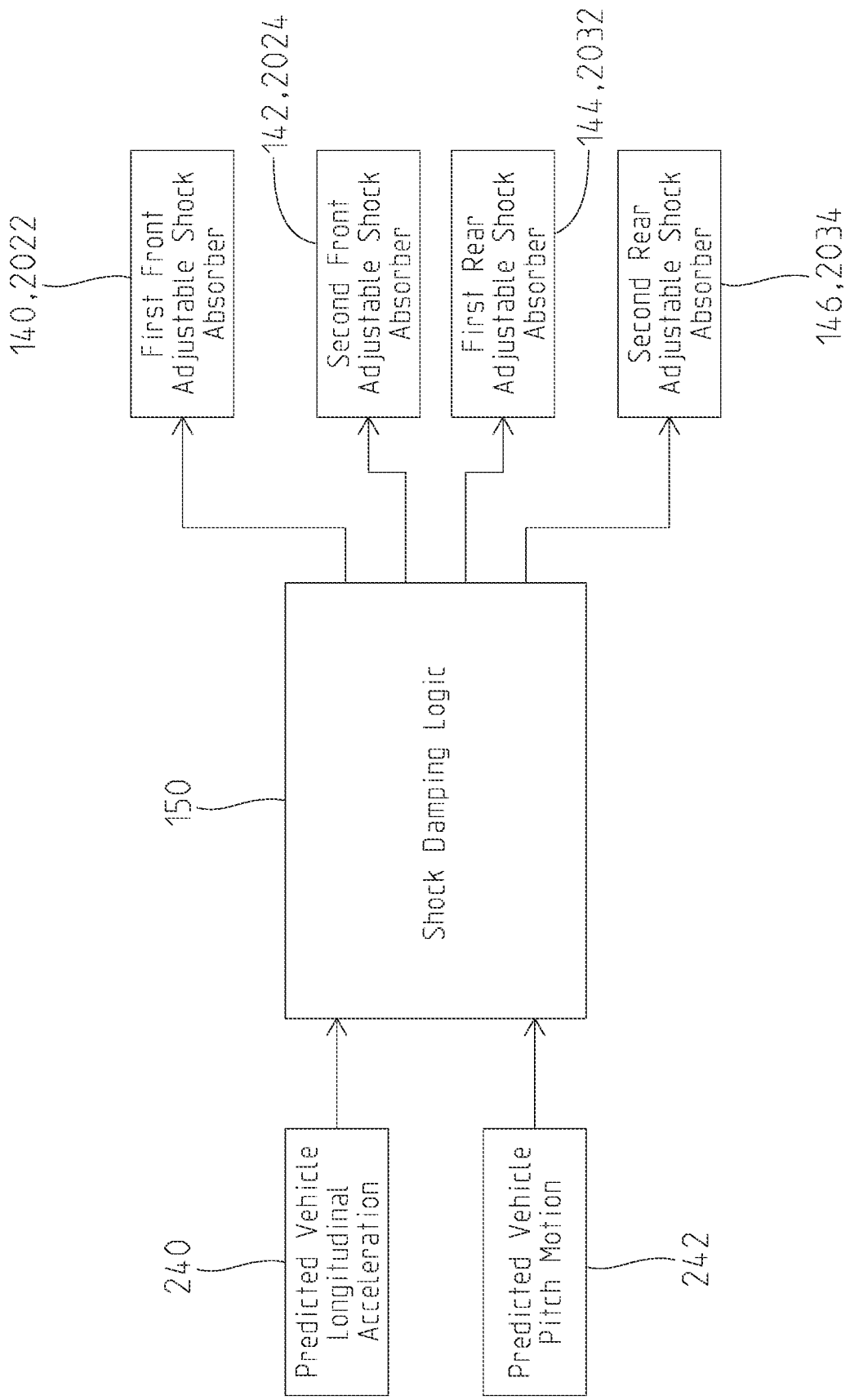
FIG. 24 illustrates a representative view of an exemplary shock damping logic of the electronic controller of FIG. 6.

Referring to FIG. 24, predictive longitudinal acceleration and predictive pitch table 236 includes damping characteristics for each of right front adjustable shock absorber 140, left front adjustable shock absorber 142, front track adjustable shock absorber 144, and rear track adjustable shock absorber 146 based on one or both of a predicted longitudinal acceleration of snowmobile 10 and a predicted pitch of snowmobile 10. Shock damping logic 150 based on a predicted vehicle longitudinal acceleration 240 and/or a predicted vehicle pitch 242 alters the damping characteristics of right front adjustable shock absorber 140, left front adjustable shock absorber 142, front track adjustable shock absorber 144, and rear track adjustable shock absorber 146.

When both the predicted longitudinal acceleration 240 and the predicted vehicle pitch 242 are taken into account, shock damping logic 150 is able to adjust right front adjustable shock absorber 140, left front adjustable shock absorber 142, front track adjustable shock absorber 144, and rear track adjustable shock absorber 146 for acceleration of snowmobile 10 including minimizing vehicle squat during acceleration and minimizing vehicle dive during deceleration. In one example, a predicted increase in the longitudinal acceleration results in shock damping logic 150 altering, such as increasing, the compression damping of front track adjustable shock absorber 144 and rear track adjustable shock absorber 146 to reduce the chance of skis 16 being lifted off of the snow and alters, such as increases the rebound damping of right front adjustable shock absorber 140 and left front adjustable shock absorber 142. Further, the rebound damping may be increased on the front track adjustable shock absorber 144. In another example, when the predicted vehicle pitch indicates the rear of snowmobile 10 is predicted to drop and the predicted longitudinal acceleration is increasing, shock damping logic 150 increases the compression damping of right front adjustable shock absorber 140 and left front adjustable shock absorber 142 and decreases the rebound damping of right front adjustable shock absorber 140 and left front adjustable shock absorber 142 to promote a lifting of skis 16 off of the snow. In a further embodiment, when the predicted longitudinal acceleration is decreasing and the predicted vehicle pitch indicates the front of snowmobile 10 is predicted to drop, shock damping logic 150 increases the compression damping of right front adjustable shock absorber 140 and left front adjustable shock absorber 142 to reduce diving of the front of snowmobile 10 and, alter, such as increases or decreases the compression damping of front track adjustable shock absorber 144 to promote track 18 pressure on the snow and to absorb bumps.

Figure 26:
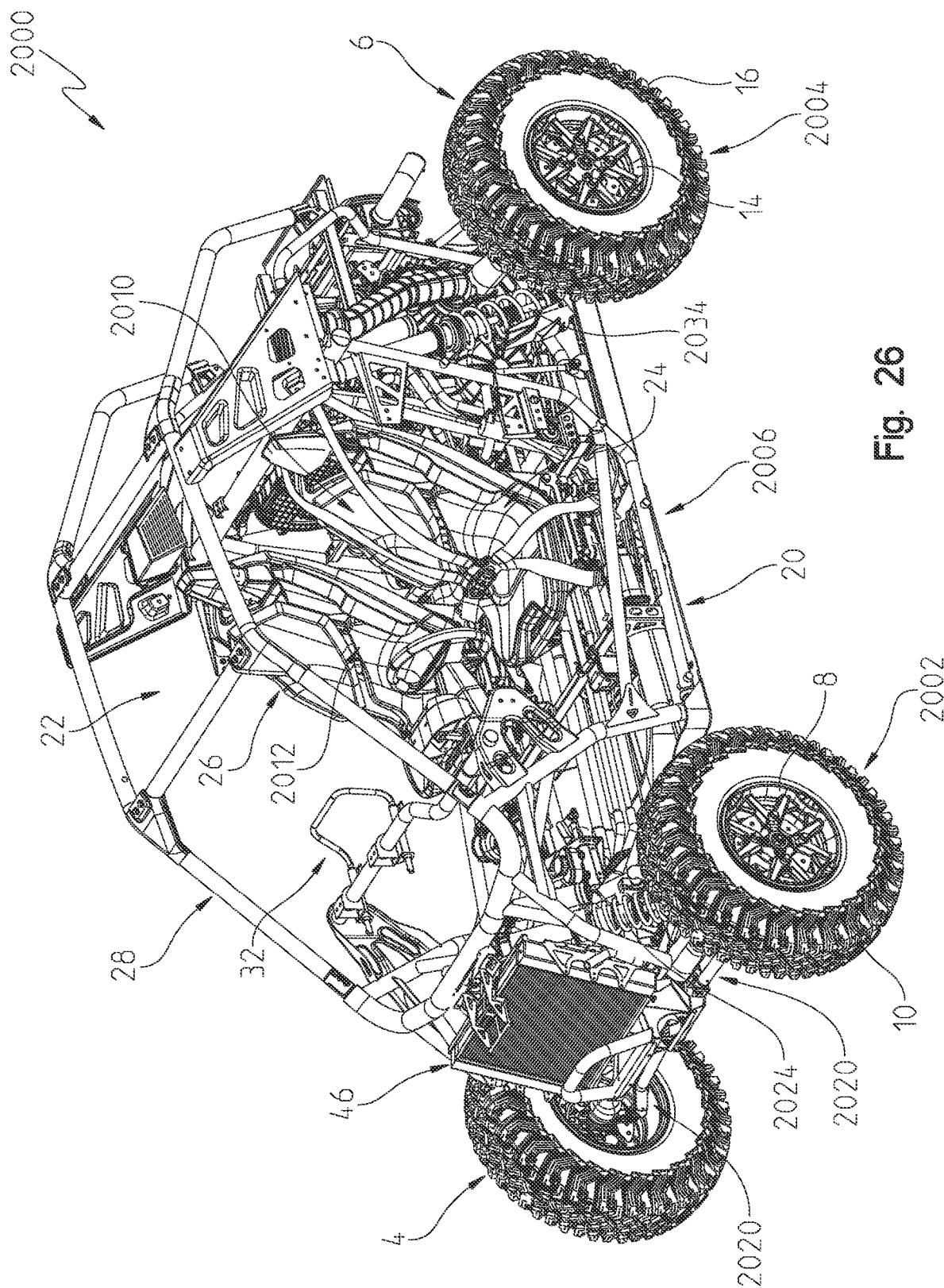
FIG. 26 illustrates a left, front, perspective view of a side-by-side off-road recreational vehicle.
Figure 27:
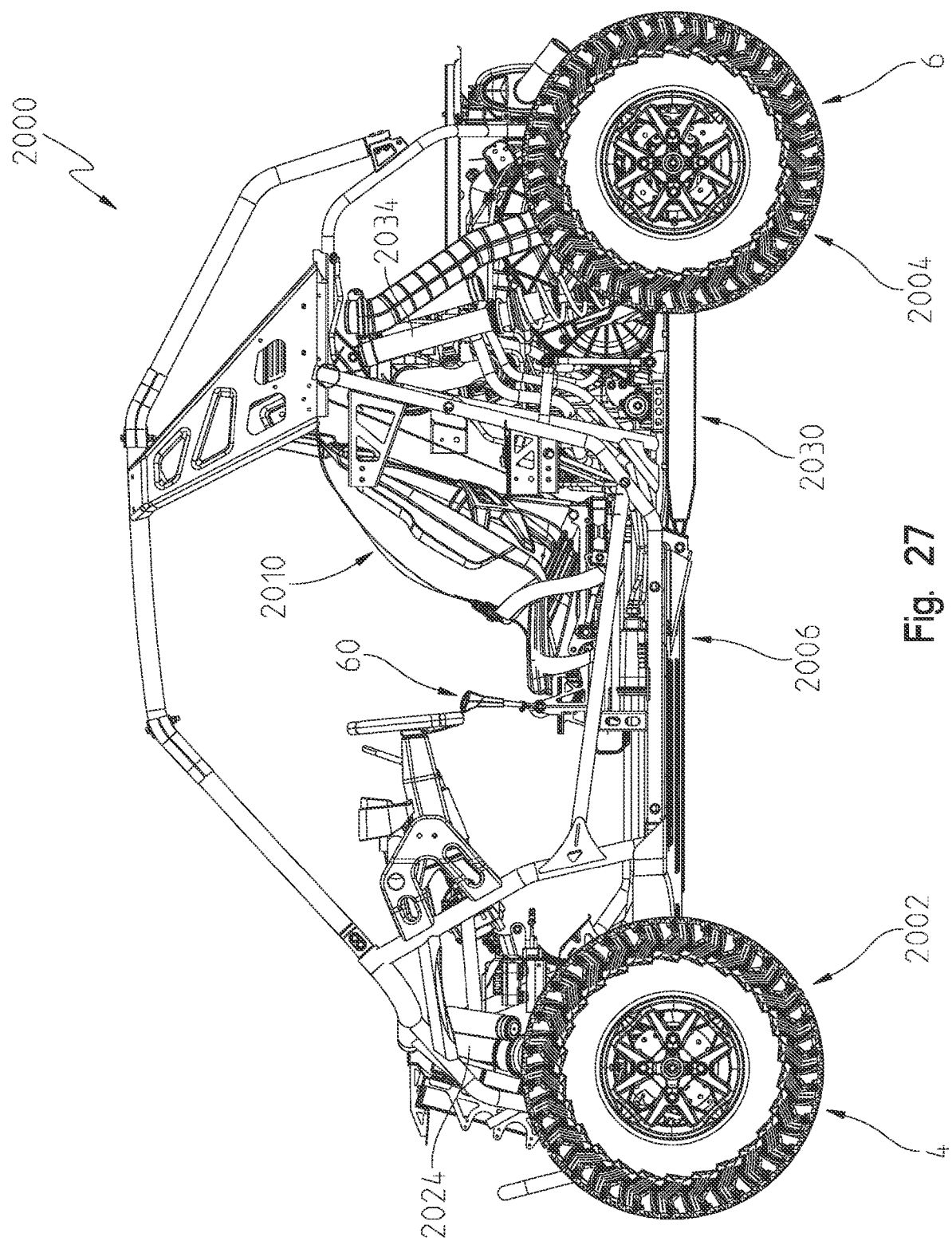
FIG. 27 illustrates a left side view of the side-by-side off-road recreational vehicle of FIG. 26.
Figure 28:
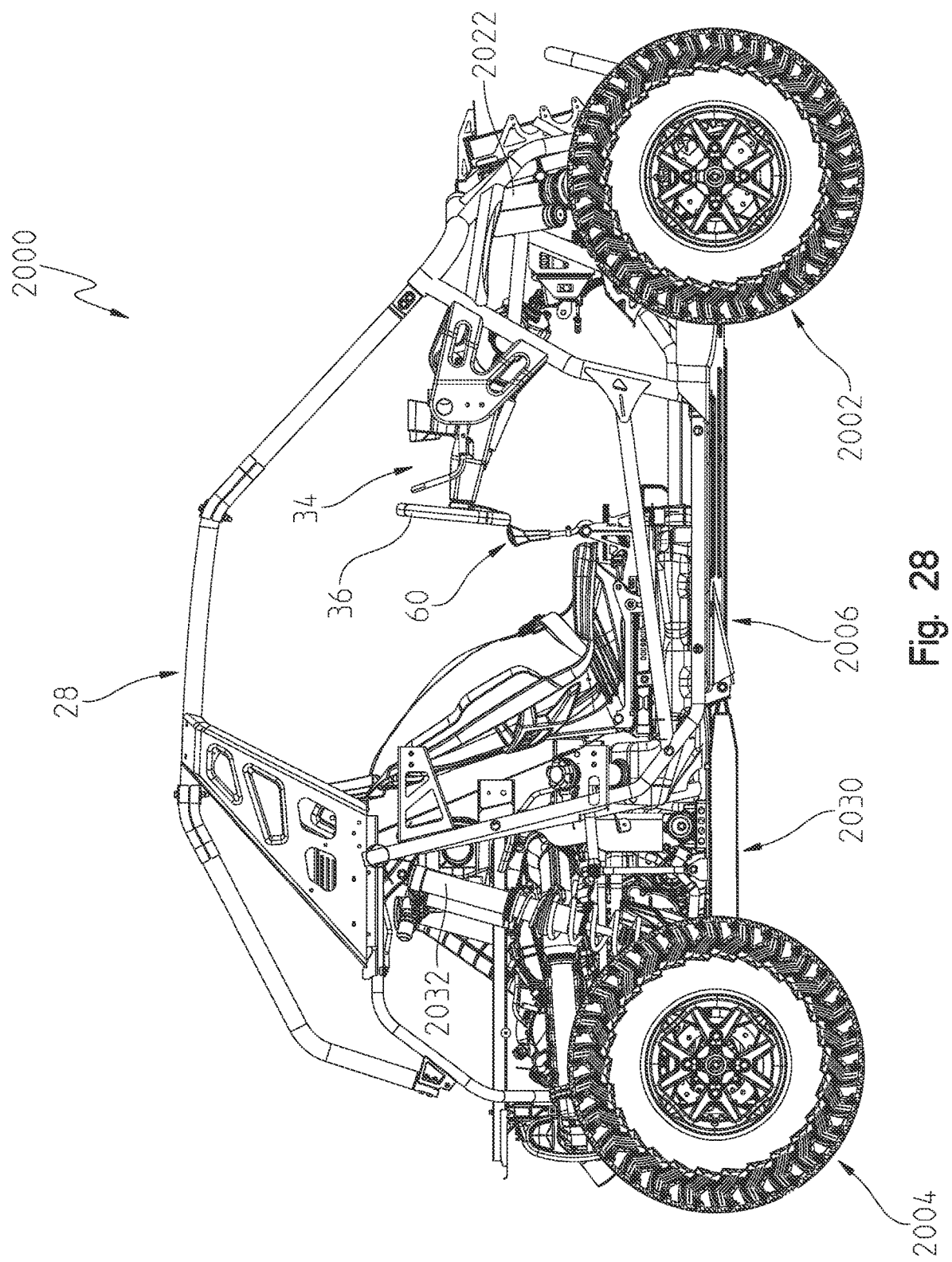
FIG. 28 illustrates a right side view of the side-by-side off-road recreational vehicle of FIG. 26.

The predicted longitudinal acceleration 240 and the predicted vehicle pitch 242 are also applicable to other off-road recreational vehicles including side-by-side vehicles, such as vehicle 2000 shown in FIGS. 26-28. Vehicle 2000 includes a pair of front wheels 2002 and a pair of rear wheels 2004 supporting a frame 2006. Vehicle 2000 includes a driver seat 2010 and a passenger seat 2012 arranged in a side-by-side arrangement. Each of the front wheels 2002 are coupled to frame 2006 through front suspensions 2020 including shock absorbers 2022, 2024 which may be adjustable shock absorbers as described herein. Each of the rear wheels 2004 are coupled to frame 2006 through rear suspensions 2030 including shock absorbers 2032, 2034 which may be adjustable shock absorbers as described herein. Additional details regarding vehicle 2000 are provided in US Published Patent Application US2019/0210668, filed Jan. 10, 2019, titled VEHICLE, the entire disclosure of which is expressly incorporated by reference herein.

Figure 25:
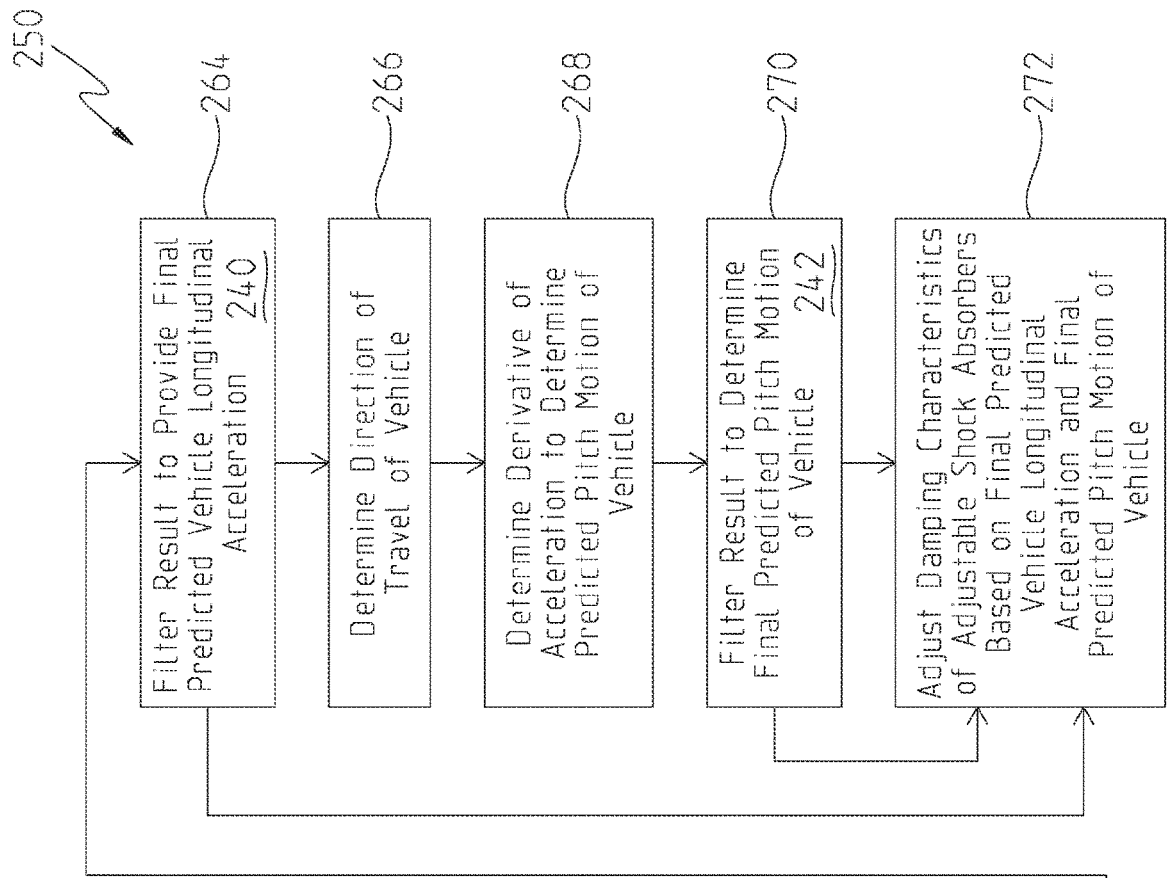
FIG. 25 illustrates an exemplary processing sequence of the shock damping logic of the electronic controller of FIG. 6.

Referring to FIG. 25, an exemplary processing sequence 250 of suspension controller 200 for determining a predicted longitudinal acceleration 240 and a predicted vehicle pitch 242 of snowmobile 10 is illustrated. A predicted power for prime mover 110, for example an internal combustion engine, is determined, as represented by block 252. In one example, an engine torque is provided from an engine controller of the vehicle. The engine torque is multiplied by a measured engine speed measured by engine speed sensor 133 to determine a power output of the engine. In another example, a throttle position is measured and with a look-up table a corresponding engine torque is provided. Again, the engine torque is multiplied by an engine speed to obtain the output power of the engine. In embodiments, a value is measured by air pressure sensor 141 and the look-up table used to determine engine torque is multi-dimensional and includes torque values for different air pressures. In one example, air pressure sensor 141 measures an air pressure associated with an airbox of the snowmobile 10. In another example, air pressure is measured indirectly by GPS sensor 131 which determines a location of snowmobile 10 and based on a look-up table provides an ambient air pressure reading for that elevation either actual from a third party service or typical based on a look-up table.

The determined engine power is then multiplied by an efficiency factor for the transmission of snowmobile 10 to provide an output power for the drivetrain, as represented by block 254. In one example, the efficiency factor accounts for losses associated with the CVT transmission. The output power of the drivetrain is converted to a forward moving force of the vehicle by dividing the output power of the drivetrain by the vehicle speed measured by vehicle speed sensor 139, as represented by block 256.

A resultant or composite forward moving force is determined by subtracting from the determined forward moving force of block 256 a coast down force of the vehicle and a braking force, as represented by block 258. The coast down force of the vehicle is determined through a look-up table as a function of a measured vehicle speed measured by vehicle speed sensor 139. The braking force is determined through a look-up table of braking force as a function of a measured brake pressure measured by brake pressure sensor 135.

A predicted vehicle longitudinal acceleration is determined by dividing the resultant forward moving force by the mass the vehicle, as represented by block 260. In one example, a standard mass of the vehicle is used.

The predicted vehicle longitudinal acceleration is compared to tractive limits and set equal to the respective tractive limit (a negative tractive limit for a deceleration of snowmobile 10 and a positive tractive limit for an acceleration of snowmobile 10) if the predicted longitudinal acceleration exceeds the respective tractive limit, as represented by block 262.

In embodiments, the predicted vehicle acceleration from block 262 is filtered, as represented by block 264, to provide a smoother response. The filtering is helpful to account for the time difference between a determined engine output power and an acceleration of snowmobile 10 and to account for different sampling rates of the various sensors.

The filtered predicted vehicle longitudinal acceleration is used to determine a predicted pitch motion of snowmobile 10. A direction of travel of snowmobile 10 is determined, as represented block 266. Once a direction of travel is known, forward or reverse, the effect of the acceleration or deceleration on the front and rear of the vehicle can be considered. In one example, a gear selection sensor 137 is provided as part of the shiftable transmission of snowmobile 10 and provides an indication of whether the shiftable transmission is in a forward gear or a reverse gear. In another example, the gear selection sensor monitors in an electric reverse input (not shown) has been actuated. Upon actuation of the electric reverse input, the engine of snowmobile 10 is stalled and then fired in a reverse direction to change the rotation of the output shaft of the engine.

The predicted magnitude of the pitch motion is determined by taking the derivative of the filtered predicted vehicle longitudinal acceleration, as represented by block 268. This predicted vehicle pitch motion value is filtered to provide a smother result over time, as represented by block 270. The predicted vehicle pitch motion 242 and/or the predicted vehicle longitudinal acceleration 240 are used by shock damping logic 150 to adjust the damping characteristics of right front adjustable shock absorber 140, left front adjustable shock absorber 142, front track adjustable shock absorber 144, and rear track adjustable shock absorber 146, as represented by block 272.

In embodiments, the predicted vehicle longitudinal acceleration and the predicted vehicle pitch motion are used to alter the base damping of right front adjustable shock absorber 140, left front adjustable shock absorber 142, front track adjustable shock absorber 144, and rear track adjustable shock absorber 146 which may be set by the selected vehicle mode (comfort, handling, and rough trail). The damping characteristic tables for compression of each of right front adjustable shock absorber 140, left front adjustable shock absorber 142, front track adjustable shock absorber 144, and rear track adjustable shock absorber 146 and the damping characteristics tables for rebound of each of right front adjustable shock absorber 140, left front adjustable shock absorber 142, front track adjustable shock absorber 144, and rear track adjustable shock absorber 146 may be two-dimensional (one input, one output damping characteristic), three-dimensional (two inputs, one output damping characteristic), or x dimensional (x−1 inputs, one output damping characteristic).

In embodiments, the base damping tables are two-dimensional map for each of right front adjustable shock absorber 140, left front adjustable shock absorber 142, front track adjustable shock absorber 144, and rear track adjustable shock absorber 146 and each of compression damping characteristic and rebound characteristic (two inputs, one output). The two inputs are vehicle speed and predicted longitudinal vehicle acceleration and the output depending on the table is one of compression damping and rebound damping. In one example, vehicle speed is measured by vehicle speed sensor 139 and the predicted longitudinal vehicle acceleration is determined by processing sequence 250.

Referring to FIG. 8C, predictive longitudinal acceleration and pitch motion table 236 provides damping characteristics for right front adjustable shock absorber 140, left front adjustable shock absorber 142, front track adjustable shock absorber 144, and rear track adjustable shock absorber 146 based on a predicted longitudinal vehicle acceleration and a predicted vehicle pitch motion. Assuming snowmobile 10 is traveling forward, for a predicted constant longitudinal acceleration (no or minimal predicted pitch motion) shock damping logic 150 increases the rebound damping characteristic for right front adjustable shock absorber 140 and left front adjustable shock absorber 142 and, optionally, reduce the compression damping characteristic for right front adjustable shock absorber 140 and left front adjustable shock absorber 142. For a predicted increase in the vehicle pitch motion (a rearward pitch) shock damping logic 150 further increases the rebound damping characteristic of right front adjustable shock absorber 140 and left front adjustable shock absorber 142 and increase the compression damping characteristic for front track adjustable shock absorber 144 and rear track adjustable shock absorber 146 for the duration of the predicted vehicle pitch motion.

Figure 21:
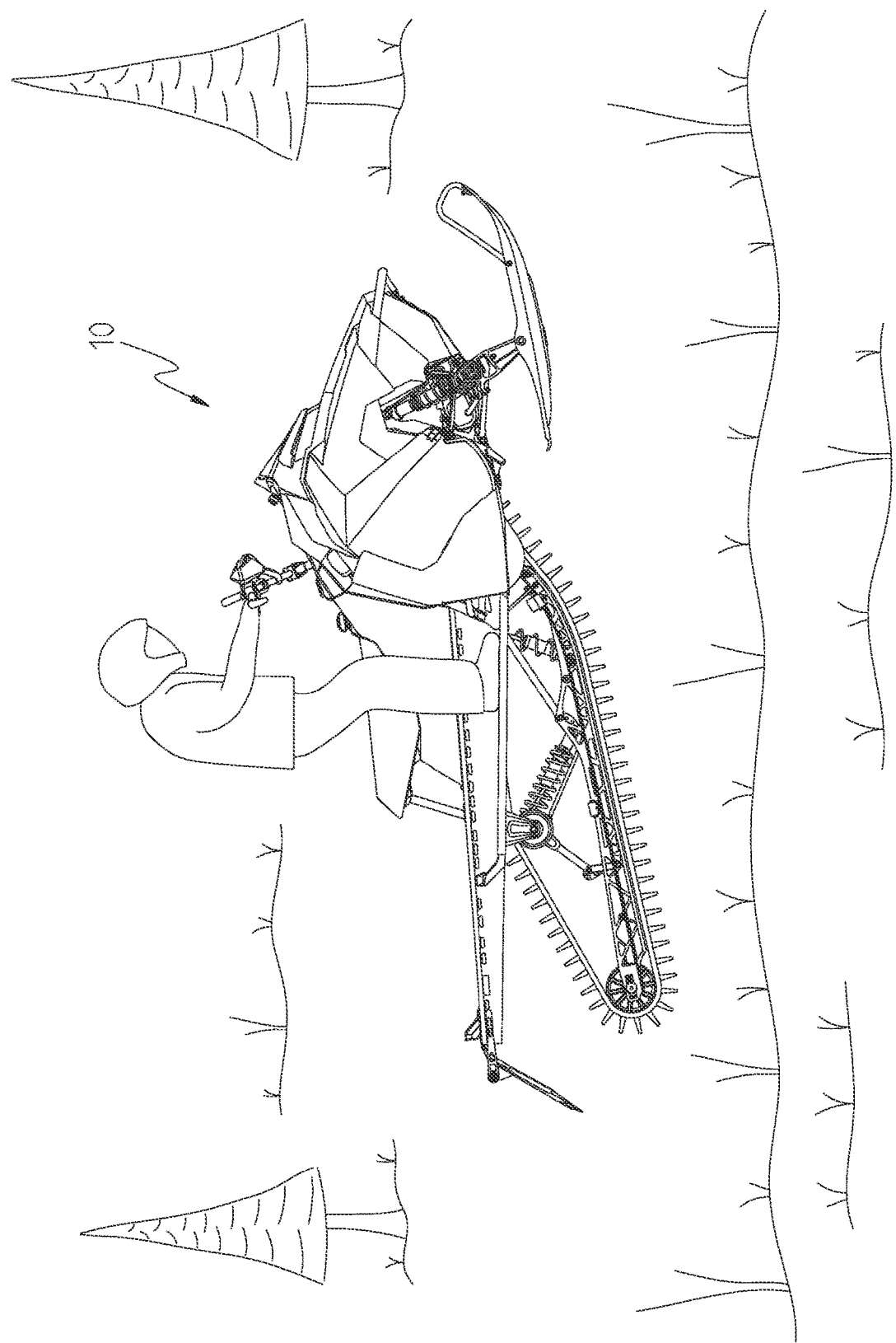
FIG. 21 illustrates the exemplary snowmobile of FIG. 1 airborne.

Assuming snowmobile 10 is traveling forward, for a predicted constant longitudinal deceleration (no or minimal pitch) shock damping logic 150 increases the rebound damping characteristic and decreases the compression damping characteristic for right front adjustable shock absorber 140 and left front adjustable shock absorber 142 and, optionally, increases the rebound damping characteristic for front track adjustable shock absorber 144 and rear track adjustable shock absorber 146. For a predicted decrease in the vehicle longitudinal pitch motion (a forward pitch) shock damping logic 150 further increases the compression damping characteristic of right front adjustable shock absorber 140 and left front adjustable shock absorber 142 and alters, such as increases, the rebound damping characteristic for front track adjustable shock absorber 144 and alters, such as increases, a rebound damping of the rear track adjustable shock absorber 146 for the duration of the predicted vehicle pitch motion. For a predicted increase in the vehicle longitudinal pitch motion (a rearward pitch) shock damping logic 150 alters, such as increases, the compression damping characteristic front track adjustable shock absorber 144 and alters, such as increases, a compression damping of the rear track adjustable shock absorber 146 for the duration of the predicted vehicle pitch motion. Further, for a predicted increase in the vehicle longitudinal pitch motion (a rearward pitch) shock damping logic 150 alters, such as increases, the rebound damping characteristic of the rear track adjustable shock absorber 146 for the duration of the predicted vehicle pitch motion. Additionally, for a predicted increase in the vehicle longitudinal pitch motion (a rearward pitch) shock damping logic 150 alters, such as increases, the rebound damping characteristic of the right front adjustable shock absorber 140 and the left front adjustable shock absorber 142 for the duration of the predicted vehicle pitch motion Returning to FIG. 8C, airborne time table 210 includes damping characteristics for each of right front adjustable shock absorber 140, left front adjustable shock absorber 142, front track adjustable shock absorber 144, and rear track adjustable shock absorber 146 based on the elapsed time that snowmobile 10 has been airborne. An example of snowmobile 10 being airborne is illustrated in FIG. 21. In embodiments, airborne time table 210 specifies a percentage of available damping range for compression damping only, for rebound damping only, or for both compression damping and rebound damping for one or more time period ranges of airborne detection. For example, a first percentage for a first time range of airborne elapsed time detection and a second percentage for a second time range of airborne elapsed time detection.

In embodiments, upon detection of an airborne state, the compression damping characteristics for right front adjustable shock absorber 140, left front adjustable shock absorber 142, front track adjustable shock absorber 144, and rear track adjustable shock absorber 146 provide an increased damping percentage over the base damping tables and continue to increase as the detected airborne time continues to increase. The increased compression damping is held after airborne event has concluded to make sure the added compression damping is used through the entire compression stroke of the respective shocks. In one example, the increased compression damping is held for about 300 milliseconds. The increased compression damping is stepped back down to the base damping level for normal operation of snowmobile 10 or is altered to another level if a different event is detected, such as acceleration, braking or cornering.

In embodiments, upon detection of an airborne state, the rebound damping characteristics for right front adjustable shock absorber 140, left front adjustable shock absorber 142, front track adjustable shock absorber 144, and rear track adjustable shock absorber 146 go to a minimal value, such as zero to promote shock extension. Once snowmobile 10 has landed, the rebound damping characteristic increases to stabilize the landing and reduce the occurrence of vehicle hops. The amount of rebound increase is based on airborne time (higher for longer airborne times). This provides different responses between small airborne events, like whoops, and larger airborne events so it can activate differently in whoops (medium size bumps on trail) versus big jumps which have longer air times. Rebound damping is held at the minimal level while snowmobile 10 is airborne and upon initial landing increased and held for a time period generally equal to the first extension stroke of the respective shock after compression. An advantage among others is that this keeps the track and skis in contact with the snow more for increased traction and stability.

In embodiments, IMU 132 is used to detect when snowmobile 10 is airborne by monitoring acceleration along axis 164 (see FIG. 1A). Exemplary detection of an airborne event is described in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein. Additional exemplary detection methodologies for an airborne event are described in U.S. Pat. No. 9,381,810, filed Jun. 3, 2011, titled ELECTRONIC THROTTLE CONTROL, assigned to the present assignee, the entire disclosure of which is expressly incorporated by reference herein.

Driver actuatable suspension adjust input event table 212 includes damping characteristics for each of right front adjustable shock absorber 140, left front adjustable shock absorber 142, front track adjustable shock absorber 144, and rear track adjustable shock absorber 146 in response to an actuation of driver actuatable suspension adjust input event table 212 of snowmobile 10. In embodiments, driver actuatable suspension adjust input event table 212 specifies a percentage of available damping range for compression damping only, for rebound damping only, or for both compression damping and rebound damping for an actuation of driver actuatable suspension adjust input event table 212. In embodiments, actuation of driver actuatable suspension adjust input event table 212 results in the compression damping for each of right front adjustable shock absorber 140, left front adjustable shock absorber 142, front track adjustable shock absorber 144, and rear track adjustable shock absorber 146 is set at an increased level. In one example, the compression damping for each of right front adjustable shock absorber 140, left front adjustable shock absorber 142, front track adjustable shock absorber 144, and rear track adjustable shock absorber 146 are set at 100 percent. The driver actuatable suspension adjust input 172 is actuatable by an operator to increase the compression damping to absorb rough terrain that the operator views as upcoming.

In embodiments, a second actuation of driver actuatable suspension adjust input 172 within a given time period is interpreted by electronic controller 100 to reduce compression damping for right front adjustable shock absorber 140, left front adjustable shock absorber 142, front track adjustable shock absorber 144, and rear track adjustable shock absorber 146 to absorb chatter bumps (small bumps on trail).

In embodiments, a second actuation of driver actuatable suspension adjust input 172 within a given time period is interpreted by electronic controller 100 to hold compression damping for right front adjustable shock absorber 140, left front adjustable shock absorber 142, front track adjustable shock absorber 144, and rear track adjustable shock absorber 146 until a third actuation of driver actuatable suspension adjust input 172 is received or a driver mode (comfort, handling, rough trail) is changed.

In embodiments, a continued actuation of driver actuatable suspension adjust input 172, such as holding a button down, for a given time period is interpreted by electronic controller 100 to hold compression damping for right front adjustable shock absorber 140, left front adjustable shock absorber 142, front track adjustable shock absorber 144, and rear track adjustable shock absorber 146 until a subsequent actuation of driver actuatable suspension adjust input 172 is received or a driver mode (comfort, handling, rough trail) is changed.

In embodiments, driver actuatable suspension adjust input 172 is not a separate input, but is recognized as a characteristic of another driver input. In one example, a quick partial actuation of a brake lever for a short duration of time that is detected by brake switch 134 is interpreted by controller 100 as an input from driver actuatable suspension adjust input 172 while a longer actuation and/or a more complete actuation of the brake lever is interpreted by controller 100 as an actuation of the brakes of snowmobile 10.

Brake event table 214 includes damping characteristics for each of right front adjustable shock absorber 140, left front adjustable shock absorber 142, front track adjustable shock absorber 144, and rear track adjustable shock absorber 146 based on an actuation of a brake input of snowmobile 10 as monitored by brake switch 134 on the brake lever or based on a pressure value from brake pressure sensor 135 (actual pressure reading or pressure switch).

In embodiments, upon detection of braking while snowmobile 10 is traveling forward, the compression damping characteristics for right front adjustable shock absorber 140 and left front adjustable shock absorber 142 are increased to minimize forward pitch of snowmobile 10 and bottoming out of right front adjustable shock absorber 140 and left front adjustable shock absorber 142. For front track adjustable shock absorber 144, the compression damping characteristic is decreased to increase the ability of snowmobile 10 to absorb trail bumps and to collect snow in front of endless track 18 to assist slowing snowmobile 10. For rear track adjustable shock absorber 146, the compression damping either remains at a current level or is decreased to keep more weight of snowmobile 10 on endless track 18.

In embodiments, upon detection of braking while snowmobile 10 is traveling forward, the rebound damping characteristics for right front adjustable shock absorber 140 and left front adjustable shock absorber 142 either remains the same or is decreased to keep right front adjustable shock absorber 140 and left front adjustable shock absorber 142 extended as much as possible and thereby keep the front of snowmobile 10 higher. For front track adjustable shock absorber 144, the rebound damping characteristic is increased to collect snow in front of endless track 18 to assist slowing snowmobile 10 and keep track weight. For rear track adjustable shock absorber 146, the rebound damping is increased to reduce pitch motion of snowmobile 10 and keep more weight transferred to the rear of snowmobile 10.

In embodiments, a separate brake event table 214 is not provided due to the braking response being accounted for in predictive vehicle pitch table 236 when looking at a predicted deceleration of snowmobile 10.

Anti-dive event table 216 includes damping characteristics for each of right front adjustable shock absorber 140 and left front adjustable shock absorber 142 based on a deceleration rate of the vehicle from the accelerometer input or the vehicle speed input. In embodiments, anti-dive event table 216 specifies a percentage of available damping range for compression damping only, for rebound damping only, or for both compression damping and rebound damping based on an actuation of a brake input of snowmobile 10 as monitored by brake switch 134 or based on a pressure value from brake pressure sensor 135. In embodiments, the compression damping characteristics for right front adjustable shock absorber 140 and left front adjustable shock absorber 142 are increased to minimize forward pitch of snowmobile 10 and bottoming out of right front adjustable shock absorber 140 and left front adjustable shock absorber 142. For front track adjustable shock absorber 144, the compression damping characteristic is decreased to increase the ability of snowmobile 10 to absorb trail bumps and to collect snow in front of endless track 18 to assist slowing snowmobile 10. For rear track adjustable shock absorber 146, the compression damping either remains at a current level or is decreased to keep more weight of snowmobile 10 on endless track 18.

In embodiments, upon detection of braking while snowmobile 10 is traveling forward, the rebound damping characteristics for right front adjustable shock absorber 140 and left front adjustable shock absorber 142 either remains the same or is decreased to keep right front adjustable shock absorber 140 and left front adjustable shock absorber 142 extended as much as possible and thereby keep the front of snowmobile 10 higher. For front track adjustable shock absorber 144, the rebound damping characteristic is increased to collect snow in front of endless track 18 to assist slowing snowmobile 10 and keep track weight. For rear track adjustable shock absorber 146, the rebound damping is increased to reduce pitch motion of snowmobile 10 and keep more weight transferred to the rear of snowmobile 10.

In embodiments, the compression damping characteristics for right front adjustable shock absorber 140 and left front adjustable shock absorber 142 are increased over level for a braking event 214. Based on a level of the brake pressure applied, shock damping logic 150 selects between brake event table 214 and anti-dive event table 216 with anti-dive event table 216 being for higher levels of brake pressure. In one example, anti-dive event table 216 is used for an initial timeframe and then brake event table 214 thereafter because the vehicle speed has slowed.

In embodiments, a separate anti-dive event table 216 is not provided. In embodiments, the braking and anti-dive response are accounted for in the predictive vehicle pitch table 236 when looking at a predicted deceleration of snowmobile 10 and at a predicted pitch forward of snowmobile 10. In embodiments, the braking and anti-dive response is accounted for based on the degree of actuation of the brake level or on the level or monitored brake pressure.

One ski event table 218 includes damping characteristics for each of right front adjustable shock absorber 140, left front adjustable shock absorber 142, front track adjustable shock absorber 144, and rear track adjustable shock absorber 146 based on a steering angle of the steering system and one or more outputs of IMU 132, such as a lateral acceleration, a roll axis angle, and a roll rate. In embodiments, one ski event table 218 specifies a percentage of available damping range for compression damping only, for rebound damping only, or for both compression damping and rebound damping based on a roll angle detected by IMU 132.

In embodiments, if snowmobile 10 is rolling towards the right side the compression damping for left front adjustable shock absorber 142 is increased to counteract the roll and the rebound damping for right front adjustable shock absorber 140 is decreased to extend right front adjustable shock absorber 140 to increase contact with the snow. If snowmobile 10 is rolling towards the left side the compression damping for right front adjustable shock absorber 140 is increased to counteract the roll and the rebound damping for left front adjustable shock absorber 142 is decreased to extend left front adjustable shock absorber 142 to increase contact with the snow. In embodiments, if snowmobile 10 is rolling towards the right then increase compression damping for the right shock and decrease rebound damping for the right shock. In embodiments, if snowmobile 10 is rolling towards left then increase compression damping for left shock and decrease compression damping for left shock.

G-out event table 224 includes damping characteristics for each of right front adjustable shock absorber 140, left front adjustable shock absorber 142, front track adjustable shock absorber 144, and rear track adjustable shock absorber 146 based on a pitch motion of snowmobile 10. In embodiments, G-out event table 224 specifies a percentage of available damping range for compression damping only, for rebound damping only, or for both compression damping and rebound damping. In embodiments, the compression damping characteristic for right front adjustable shock absorber 140, left front adjustable shock absorber 142, and rear track adjustable shock absorber 146 is increased.

Chatter event table 226 includes damping characteristics for each of right front adjustable shock absorber 140, left front adjustable shock absorber 142, front track adjustable shock absorber 144, and rear track adjustable shock absorber 146 based on based on a pitch motion of snowmobile 10. In embodiments, chatter event table 226 specifies a percentage of available damping range for compression damping only, for rebound damping only, or for both compression damping and rebound damping. In embodiments, both the compression and rebound damping are decreased for all shock absorbers. In embodiments, chatter events are distinguished from whoops events based on a frequency analysis of the IMU output.

Cornering event table 228 includes damping characteristics for each of right front adjustable shock absorber 140, left front adjustable shock absorber 142, and front track adjustable shock absorber 144 based longitudinal acceleration of snowmobile 10 and at least one of steering angle sensor 136 or acceleration along axis 162 (lateral acceleration) for cornering. In embodiments, cornering event table 228 specifies a percentage of available damping range for compression damping only, for rebound damping only, or for both compression damping and rebound damping.

In embodiments, upon detection of cornering while snowmobile 10 is traveling forward, the compression damping characteristics for the front outside shock (fp140 if turning to left or left front adjustable shock absorber 142 if turning to the right) is increased minimize roll of snowmobile 10 and for the front inside shock (fp142 if turning to left or right front adjustable shock absorber 140 if turning to the right) is decreased to absorb trail bumps more smoothly. The level of increase and decrease is dependent on the longitudinal acceleration of snowmobile 10 (larger increases and decreases for higher speeds) to control pitch motion for snowmobile 10. Regardless of the direction of the turn, the compression damping characteristic for front track adjustable shock absorber 144 is decreased to add ski traction for improved cornering and for rear track adjustable shock absorber 146 the compression damping characteristic is updated to control longitudinal pitch motion and weight transfer throughout the cornering event. For example, at corner entry, the compression damping characteristic of rear track adjustable shock absorber 146 may remain unchanged or be decreased based on longitudinal acceleration, but at mid corner or at corner exit when the throttle is applied the compression damping characteristic of rear track adjustable shock absorber 146 may be increased to prevent lifting of the skis and losing traction on the front of snowmobile 10.

In embodiments, upon detection of cornering while snowmobile 10 is traveling forward, the rebound damping characteristics for the front inside shock (fp142 if turning to left or right front adjustable shock absorber 140 if turning to the right) is increased to reduce roll of snowmobile 10. The level of increase and decrease is dependent on the longitudinal acceleration of snowmobile 10. In one example, the level of increase and decrease is also dependent on a lateral acceleration of snowmobile 10. Regardless of the direction of the turn, the rebound damping characteristic for front track adjustable shock absorber 144 is increased to add ski traction for improved cornering and for rear track adjustable shock absorber 146 the rebound damping characteristic remains unchanged or is increased to control longitudinal pitch motion, hold the rear end down, and control vehicle body motion throughout the cornering event.

Brake corner event table 220 includes damping characteristics for each of right front adjustable shock absorber 140, left front adjustable shock absorber 142, front track adjustable shock absorber 144, and rear track adjustable shock absorber 146 based on snowmobile 10 both cornering and braking. In embodiments, shock damping logic 150 follows whichever of brake event table 214 and corner event table 228 has a higher priority. In one example, the cornering event has a higher priority than the braking event.

Chatter corner event table 222 includes damping characteristics for each of right front adjustable shock absorber 140, left front adjustable shock absorber 142, front track adjustable shock absorber 144, and rear track adjustable shock absorber 146 based on snowmobile 10 both cornering and airborne detection. In embodiments, airborne events override cornering events. Further, a steering angle could be used to modify the airborne damping value increasing the damping of the outside front and/or rear shock. In embodiments, a separate chatter corner event table 222 is not provided, but rather shock damping logic 150 follows whichever of airborne time event table 210 and corner event table 228 has a higher priority.

Base damping table 230 includes damping characteristics for each of right front adjustable shock absorber 140, left front adjustable shock absorber 142, front track adjustable shock absorber 144, and rear track adjustable shock absorber 146 in the absence of detecting one or more of airborne time event table 210, driver actuatable suspension adjust input event table 212, brake event table 214, anti-dive event table 216, one ski event table 218, brake corner event table 220, chatter corner event table 222, g-out event table 224, chatter event table 226, corner event table 228, launch mode event table 232, anti-squat event table 234, and predictive vehicle pitch table 236. In embodiments, base damping table 230 specifies a percentage of available damping range for compression damping only, for rebound damping only, or for both compression damping and rebound damping for detected vehicle speeds and/or throttle positions. As mentioned herein, each of the selectable modes (comfort, handling, and rough trail) have their own base damping table.

Launch mode event table 232 includes damping characteristics for each of front track adjustable shock absorber 144 and rear track adjustable shock absorber 146 based on an actuation of the launch mode input 174 or based on one or more sensor readings (such as vehicle speed is zero and throttle actuation above a first level). In embodiments, launch mode event table 232 specifies a percentage of available damping range for compression damping only, for rebound damping only, or for both compression damping and rebound damping. In response to an actuation of the launch mode input, different actions are taken based on the selected mode (Comfort, Handling, Rough Trail) of snowmobile 10 for the expected high acceleration of snowmobile 10. For the Comfort and Handling modes, it is desired to keep skis 16 on the snow. To achieve this outcome, the compression damping characteristics for front track adjustable shock absorber 144 is maintained or decreased, the rebound damping characteristic for front track adjustable shock absorber 144 is increased, the compression damping characteristic for rear track adjustable shock absorber 146 is increased, and the rebound damping characteristic for rear track adjustable shock absorber 146 is maintained or decreased. These changes both promotes keeping the skis 16 on the snow and minimizing a rearward pitch motion. For the Rough Trail mode, it may be desirable to raise skis 16 off of the snow. To achieve this outcome, the compression damping characteristics for front track adjustable shock absorber 144 is increased, the rebound damping characteristic for front track adjustable shock absorber 144 is decreased, the compression damping characteristic for rear track adjustable shock absorber 146 is maintained or decreased, and the rebound damping characteristic for rear track adjustable shock absorber 146 is maintained or increased. These changes both promotes lifting the skis 16 and promoting a rearward pitch motion. Further, when starting from a stop or low speed, the changes to front track adjustable shock absorber 144 and rear track adjustable shock absorber 146 may be further modified to promote snowmobile 10 raising the skis further off the ground to perform a wheelie.

Anti-squat event table 234 includes damping characteristics for each of right front adjustable shock absorber 140, left front adjustable shock absorber 142, front track adjustable shock absorber 144, and rear track adjustable shock absorber 146 based longitudinal acceleration of snowmobile 10 measured by IMU 132, a pitch rate, and/or a pitch angle measured by IMU 132. In embodiments, anti-squat event table 234 specifies a percentage of available damping range for compression damping only, for rebound damping only, or for both compression damping and rebound damping for one or more time period ranges of detection. For a measured pitch angle, shock damping logic 150 increases the rebound damping characteristic of right front adjustable shock absorber 140 and left front adjustable shock absorber 142 and increases the compression damping characteristic for front track adjustable shock absorber 144 and rear track adjustable shock absorber 146 for the duration of the predicted vehicle pitch motion.

Figure 22:
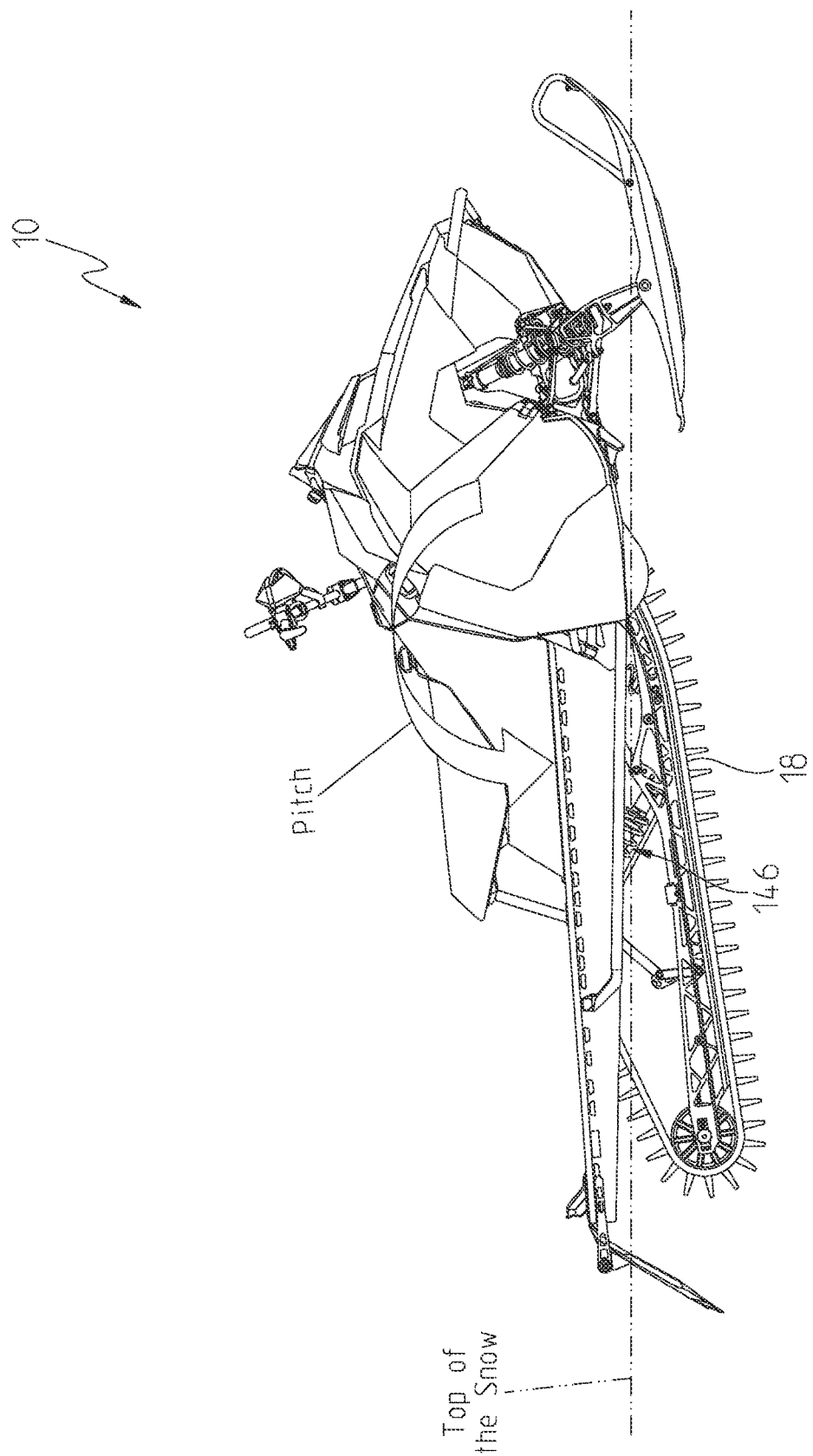
FIG. 22 illustrates a pitch of snowmobile 10 in deep snow without an adjustment of the damping characteristics of the adjustable shock absorbers.
Figure 23:
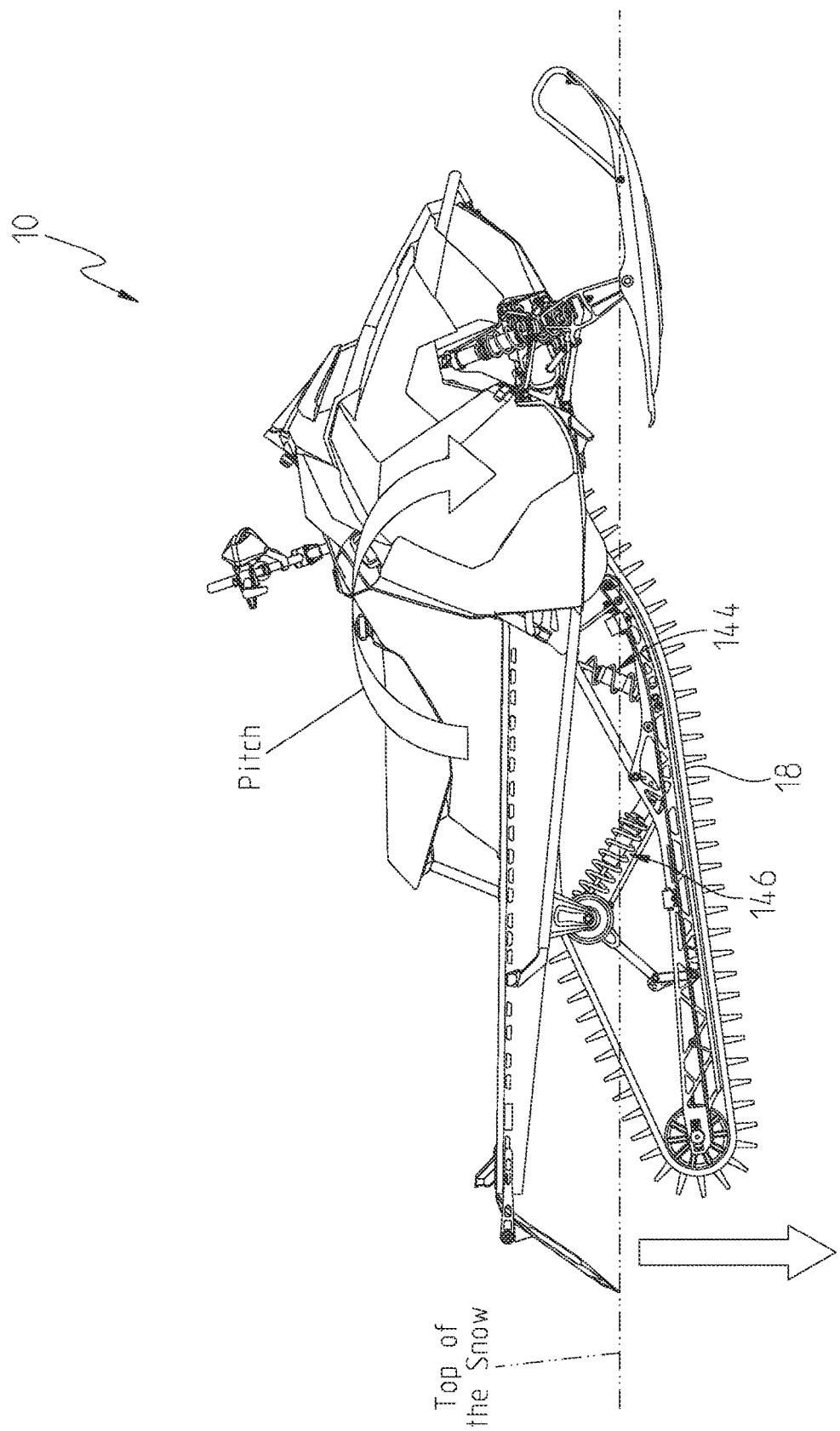
FIG. 23 illustrates a pitch of snowmobile 10 in deep snow with an adjustment of the damping characteristics of the adjustable shock absorbers.

Having right front adjustable shock absorber 140, left front adjustable shock absorber 142, front track adjustable shock absorber 144, and rear track adjustable shock absorber 146 being adjustable is helpful for orienting snowmobile 10 in various environmental situations. Referring to FIG. 22, snowmobile 10 is shown in deep snow. When the shock absorbers 144 and 146 are not adjustable, the rear of snowmobile 10 sinks in the snow up to the running boards of snowmobile 10. By sensing the rearward pitch of snowmobile 10 with IMU 132, the rebound damping characteristic of front track adjustable shock absorber 144 and rear track adjustable shock absorber 146 can be automatically increased to promote extension of front track adjustable shock absorber 144 and rear track adjustable shock absorber 146 and the compression damping characteristic of front track adjustable shock absorber 144 and rear track adjustable shock absorber 146 can be decreased. This results in the rear end of the rear suspension to drop and keeps snowmobile 10 more level in the snow.

Figure 9A:
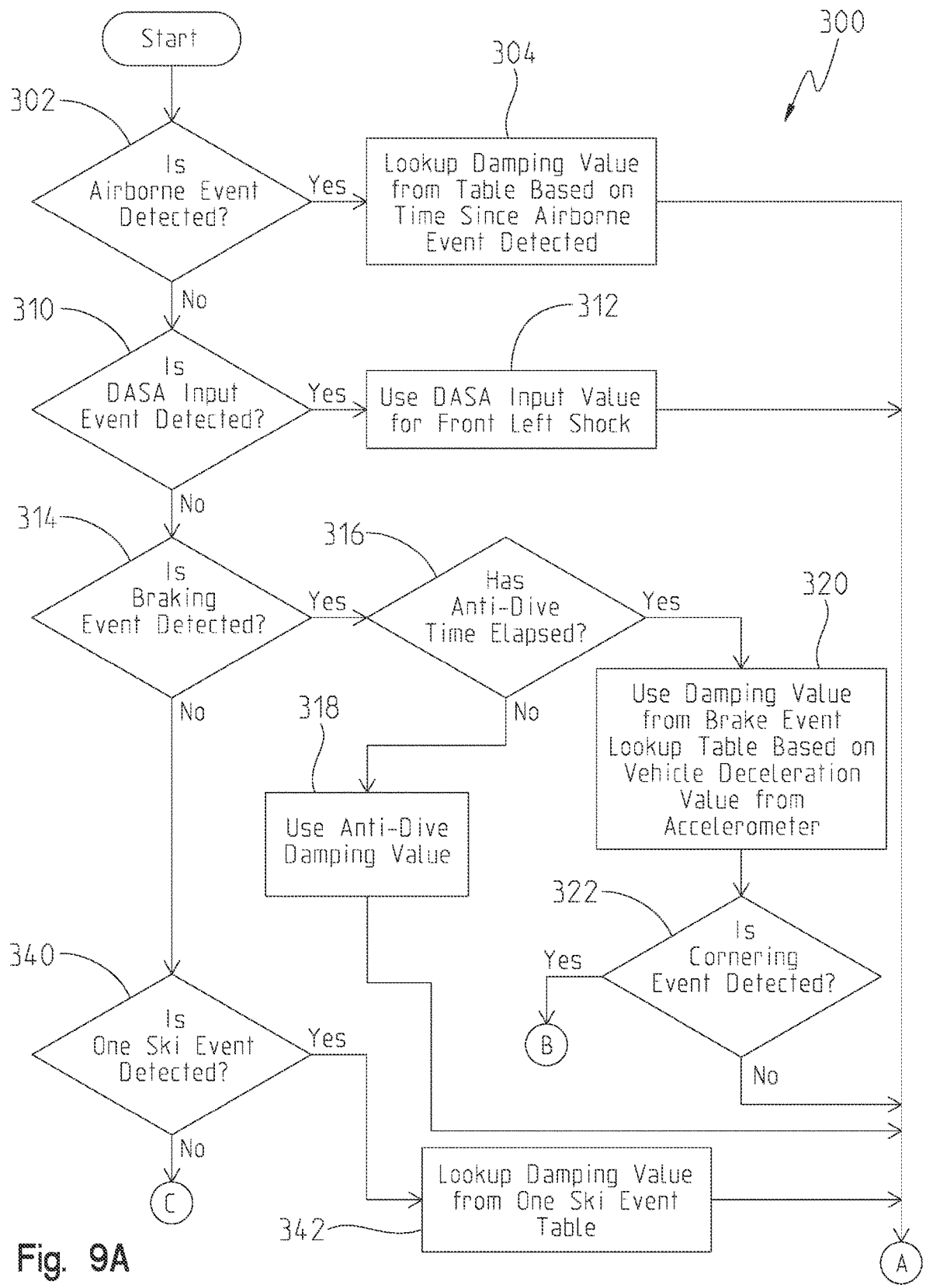
FIGS. 9A-C illustrate an exemplary processing sequence of the shock damping logic of the electronic controller of FIG. 6 for a continuous damping control shock absorber provided as part of the suspension of a left front ski of the exemplary snowmobile of FIG. 1.
Figure 9B:
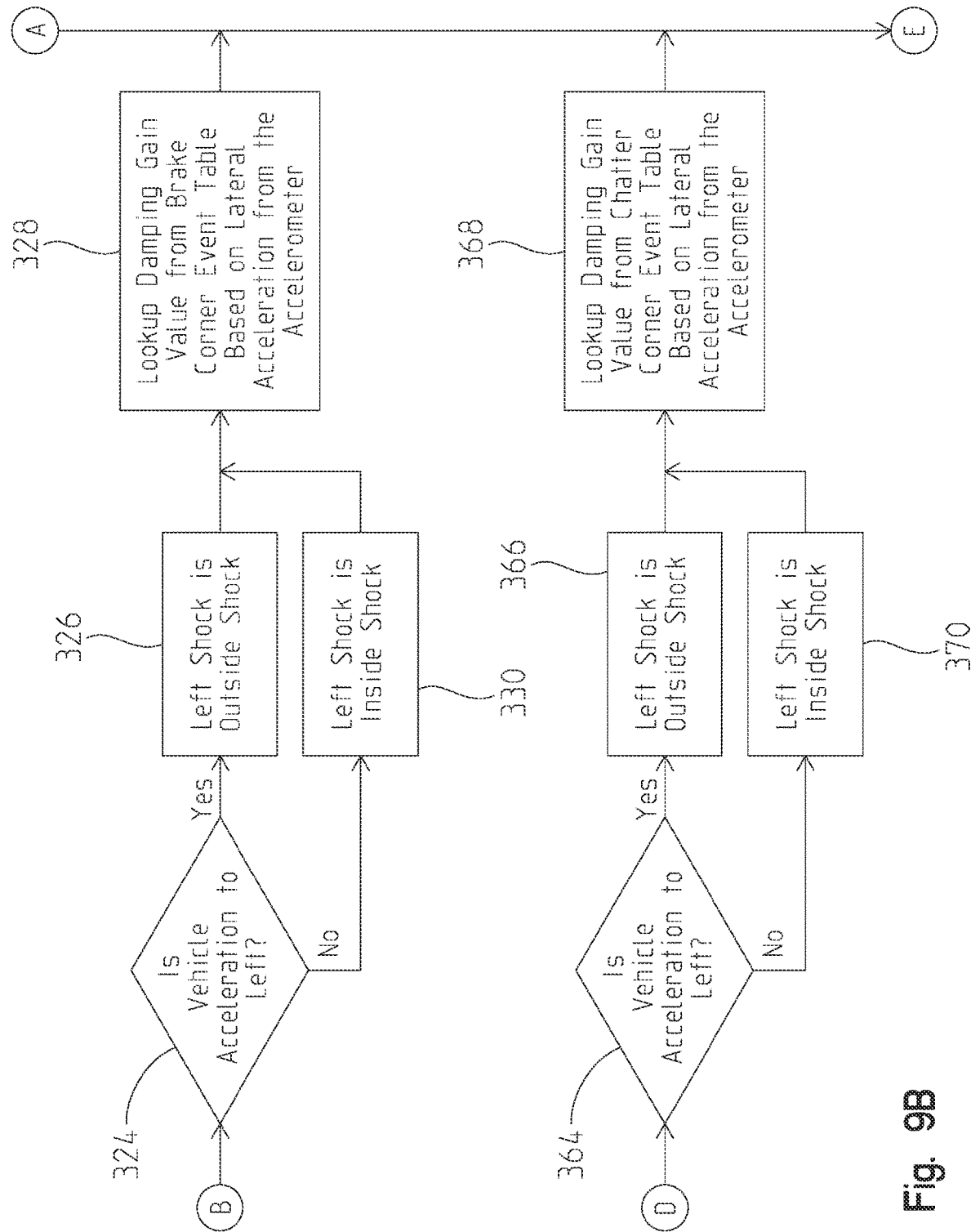
Figure 9C:
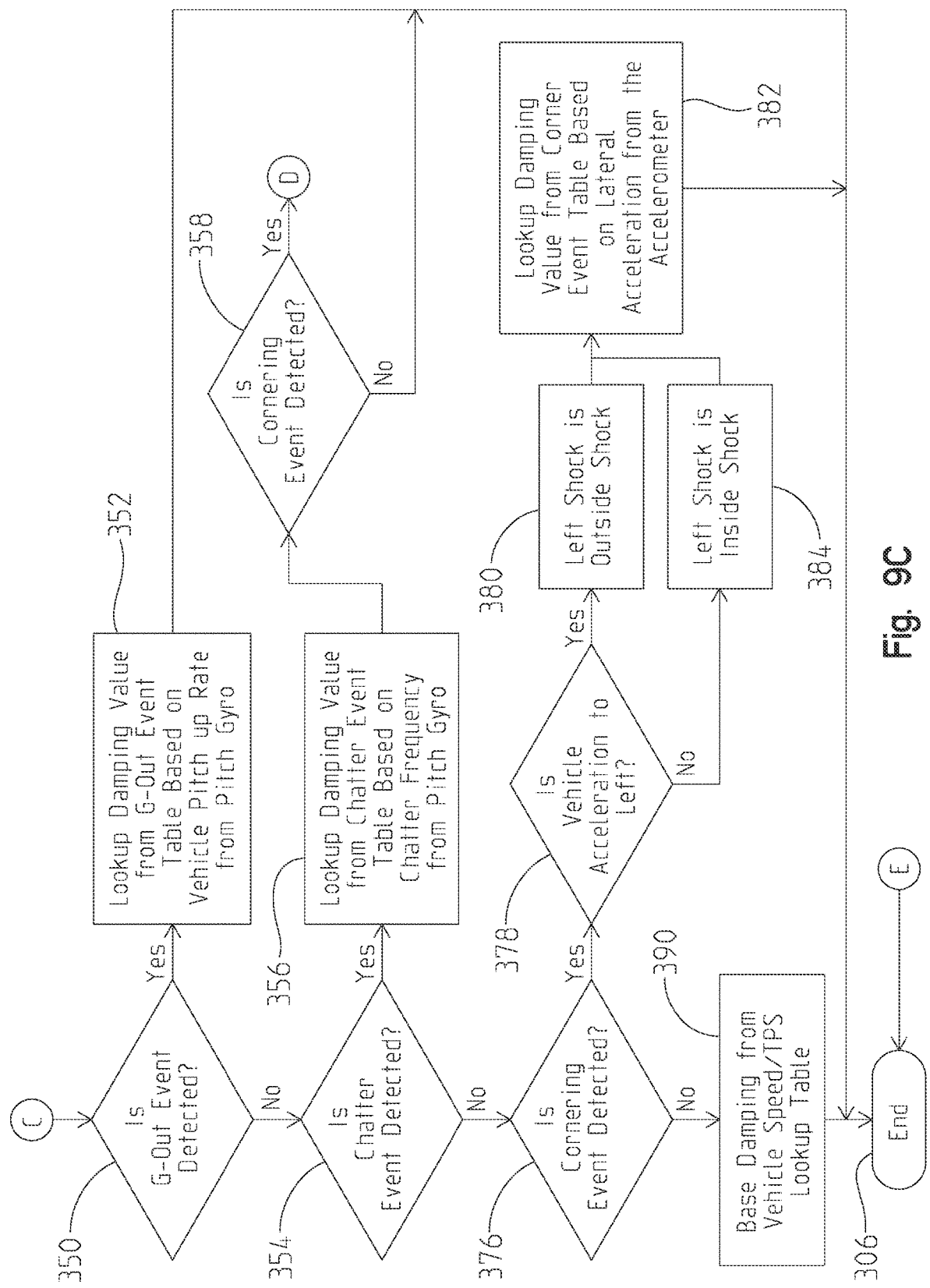
Figure 15:
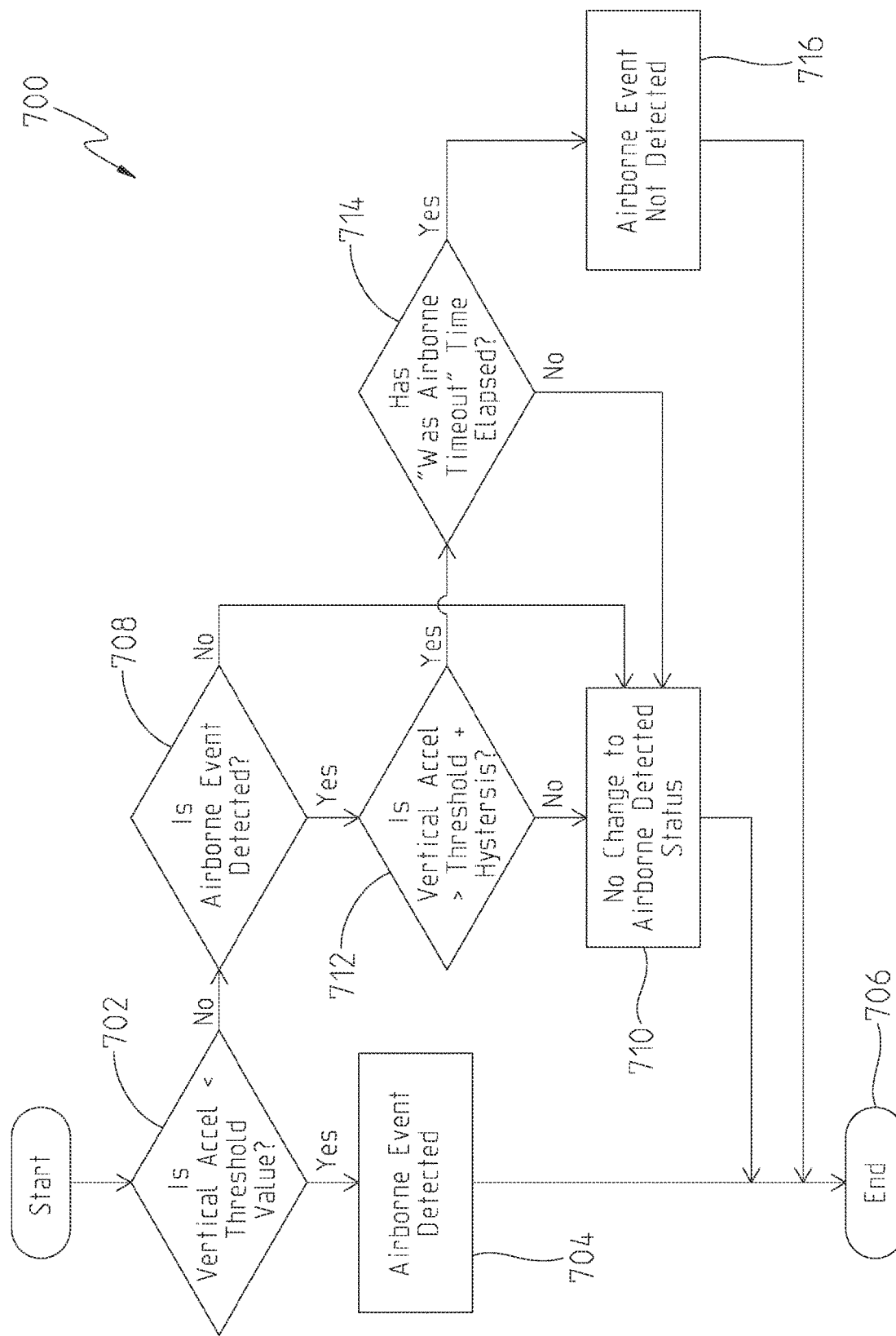
FIG. 15 illustrates an exemplary processing sequence of the shock damping logic of the electronic controller of FIG. 6 for detecting an exemplary airborne event.

Referring to FIGS. 9A-C, an exemplary processing sequence 300 of the shock damping logic 150 of the electronic controller 200 of FIG. 6 for left front adjustable shock absorber 142 provided as part of the suspension 24 of a left front ski 16 of the exemplary snowmobile 10 of FIG. 1. Referring to FIG. 9A, processing sequence 300 determines if an airborne event is detected, as represented by block 302. An exemplary process 700 for detecting an airborne event is illustrated in FIG. 15. If an airborne event is detected, the damping characteristics for left front adjustable shock absorber 142 is set based on the damping value provided in airborne time table 210 of shock damping logic 150, as represented by block 304 and processing sequence 300 is completed, as represented by block 306.

If an airborne event is not detected, shock damping logic 150 determines if a driver actuatable suspension adjust input event is detected, as represented by block 310. If a driver actuatable suspension adjust input event is detected, the damping characteristics for left front adjustable shock absorber 142 is set based on the damping value provided in driver actuatable suspension adjust input table 212 of shock damping logic 150, as represented by block 312 and processing sequence 300 is completed, as represented by block 306.

Figure 14:
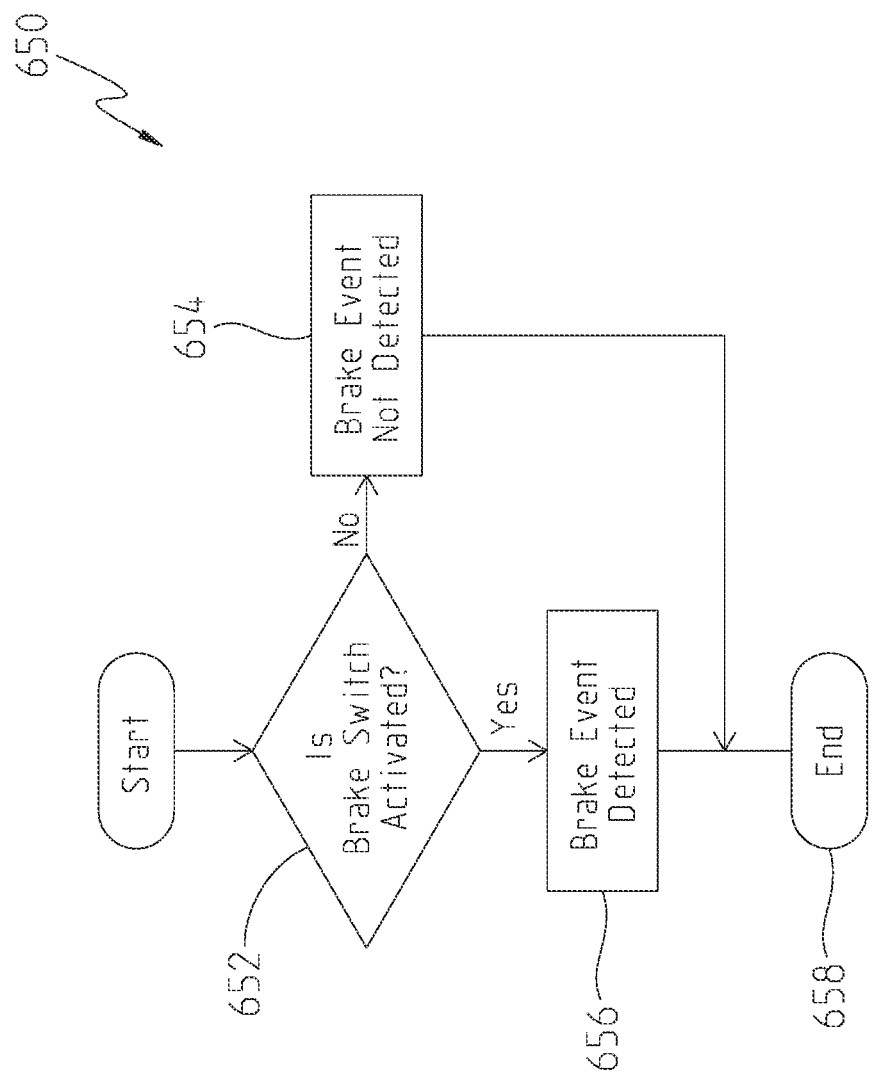
FIG. 14 illustrates an exemplary processing sequence of the shock damping logic of the electronic controller of FIG. 6 for detecting an exemplary brake event.

If a driver actuatable suspension adjust input event is not detected, shock damping logic 150 determines if a braking event is detected, as represented by block 314. An exemplary process 650 for detecting a braking event is illustrated in FIG. 14. If a braking event is detected, shock damping logic 150 determines if an anti-dive time threshold has elapsed, as represented by block 316. If the anti-dive threshold has not elapsed, the damping characteristics for left front adjustable shock absorber 142 is set based on the damping value provided in anti-dive table 216 of shock damping logic 150, as represented by block 318 and processing sequence 300 is completed, as represented by block 306.

If the anti-dive threshold has elapsed, the damping characteristics for left front adjustable shock absorber 142 is set based on the damping value provided in brake event table 214 of shock damping logic 150 based on a value of vehicle deceleration from IMU 132. Shock damping logic 150 next determines if a cornering event is detected, as represented by block 322. If a cornering event is not detected processing sequence 300 is completed, as represented by block 306. If a cornering event is detected, shock damping logic 150 determines if the vehicle acceleration is to the left side of snowmobile 10, as represented by block 324. If the vehicle acceleration is to the left, left front adjustable shock absorber 142 is designated the outside shock, as represented by block 326, and the damping characteristics for left front adjustable shock absorber 142 is set based on the damping value provided in brake corner event table 220 for the outside shock, as represented by block 328, and processing sequence 300 is completed, as represented by block 306. If the vehicle acceleration is not to the left, left front adjustable shock absorber 142 is designated the inside shock, as represented by block 330, and the damping characteristics for left front adjustable shock absorber 142 is set based on the damping value provided in brake corner event table for the inside shock, as represented by block 328, and processing sequence 300 is completed, as represented by block 306.

Figure 20:
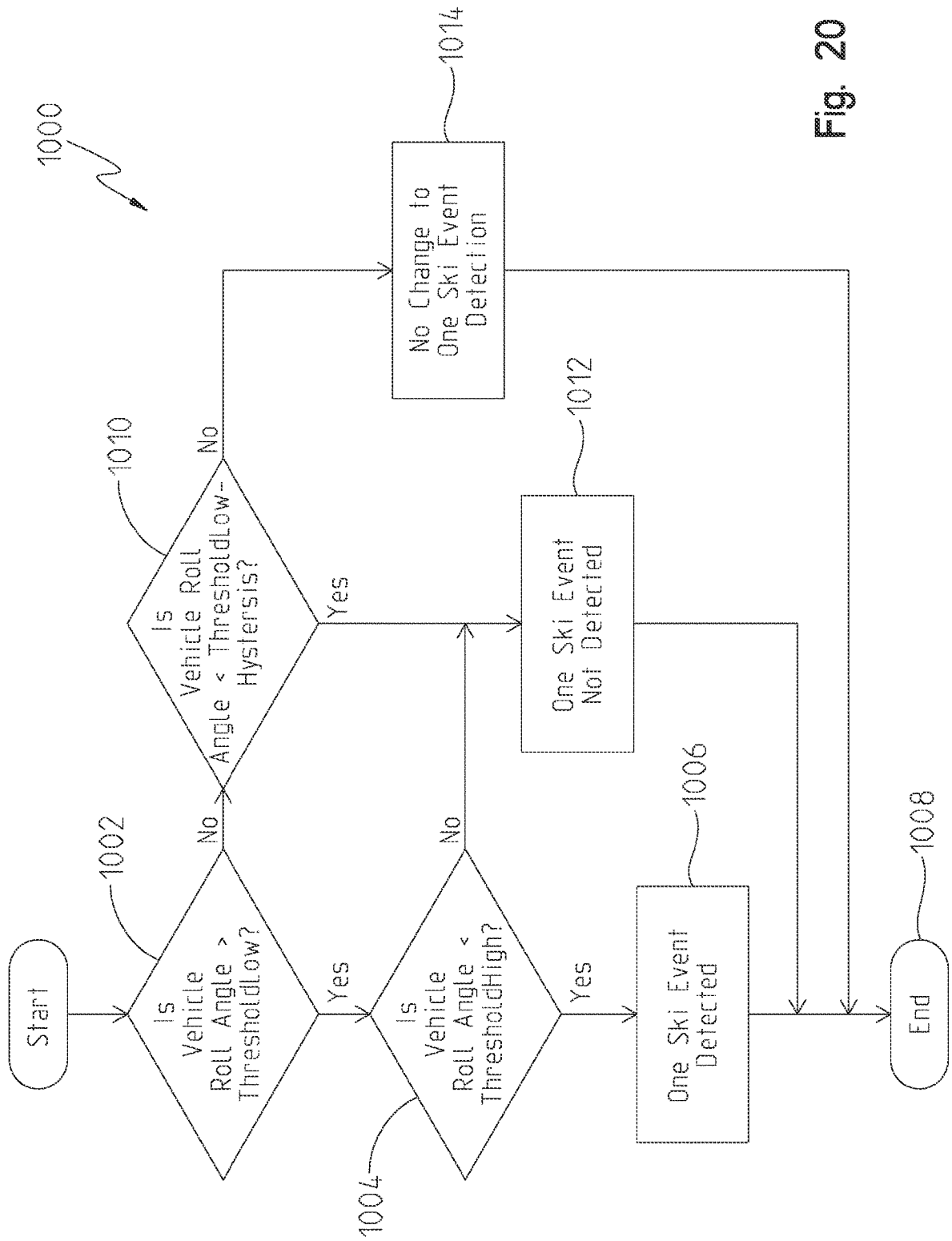
FIG. 20 illustrates an exemplary processing sequence of the shock damping logic of the electronic controller of FIG. 6 for detecting an exemplary one ski event.

If a braking event is not detected, shock damping logic 150 determines if a one ski event is detected, as represented by block 340. An exemplary process 1000 for detecting a one ski event is illustrated in FIG. 20. If a one ski event is detected, shock damping logic 150 determines the damping characteristics for left front adjustable shock absorber 142 is set based on the damping value provided in one ski event table 218 of shock damping logic 150, as represented by block 342 and processing sequence 300 is completed, as represented by block 306.

Figure 13:
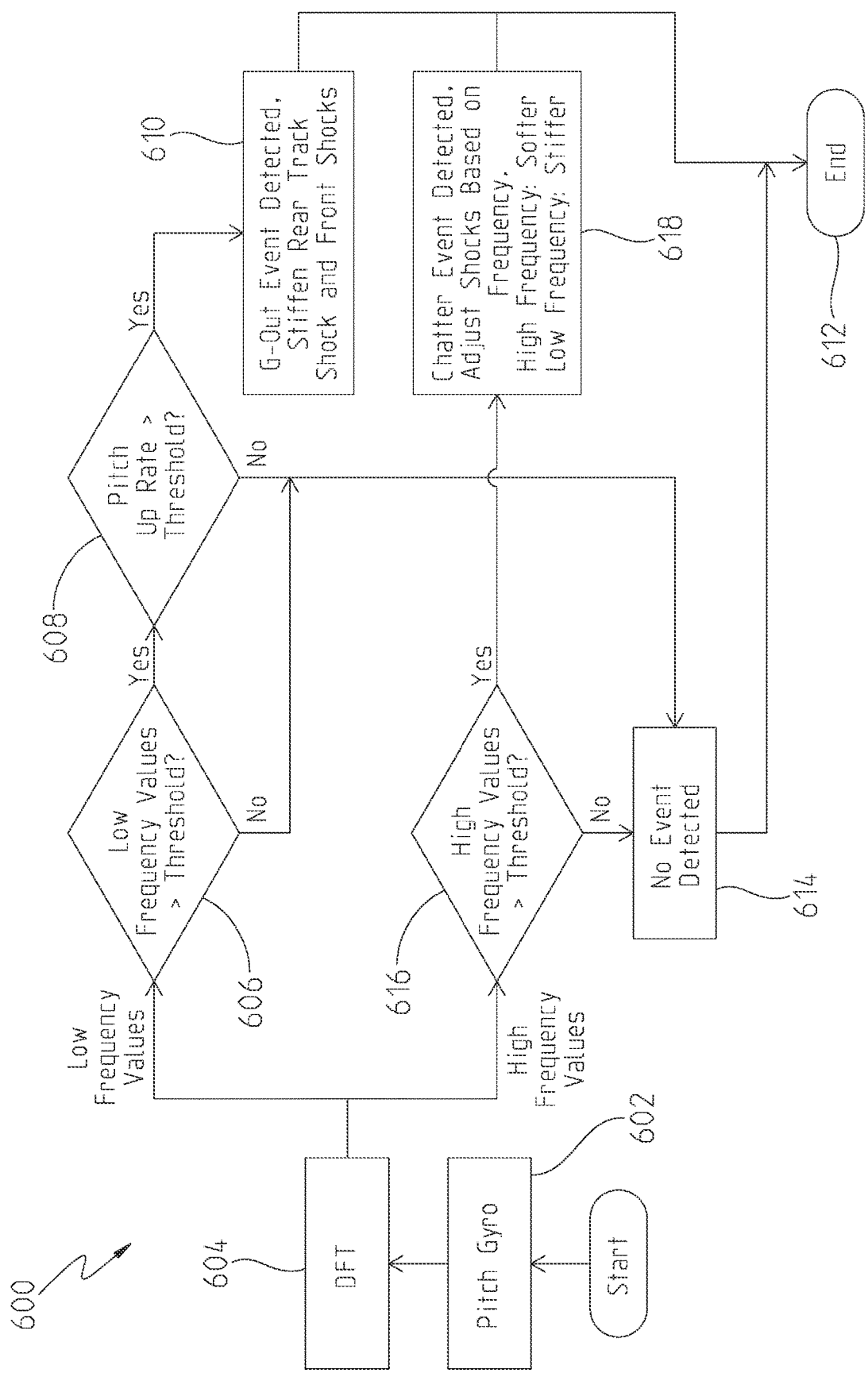
FIG. 13 illustrates an exemplary processing sequence of the shock damping logic of the electronic controller of FIG. 6 for detecting a g-out event or a chatter event.

If a one ski event is not detected, shock damping logic 150 determines if a G-out event is detected, as represented by block 350. An exemplary process 600 for detecting a G-out event is illustrated in FIG. 13. If a G-out event is detected, shock damping logic 150 determines the damping characteristics for left front adjustable shock absorber 142 is set based on the damping value provided in G-out event table 224 of shock damping logic 150, as represented by block 352 and processing sequence 300 is completed, as represented by block 306.

If a G-out event is not detected, shock damping logic 150 determines if a chatter event is detected, as represented by block 354. An exemplary process 600 for detecting a chatter event is illustrated in FIG. 13. If a chatter event is detected, shock damping logic 150 determines the damping characteristics for left front adjustable shock absorber 142 is set based on the damping value provided in chatter event table 226 of shock damping logic 150, as represented by block 356. Shock damping logic 150 then determines if a cornering event is detected, as represented by block 358. If a cornering event is not detected, processing sequence 300 is completed, as represented by block 306. If a cornering event is detected, shock damping logic 150 determines if the vehicle acceleration is to the left side of snowmobile 10, as represented by block 364. If the vehicle acceleration is to the left, left front adjustable shock absorber 142 is designated the outside shock, as represented by block 366, and the damping characteristics for left front adjustable shock absorber 142 is set based on the damping value provided in chatter corner event table 222 for the outside shock, as represented by block 368, and processing sequence 300 is completed, as represented by block 306. If the vehicle acceleration is not to the left, left front adjustable shock absorber 142 is designated the inside shock, as represented by block 370, and the damping characteristics for left front adjustable shock absorber 142 is set based on the damping value provided in chatter corner event table 222 for the inside shock, as represented by block 368, and processing sequence 300 is completed, as represented by block 306.

If a chatter event is not detected, shock damping logic 150 determines if a cornering event is detected, as represented by block 376. An exemplary process 800 for detecting a cornering event is illustrated in FIGS. 17A-D. If a cornering event is detected, shock damping logic 150 determines if the vehicle acceleration is to the left side of snowmobile 10, as represented by block 378. If the vehicle acceleration is to the left, left front adjustable shock absorber 142 is designated the outside shock, as represented by block 380, and the damping characteristics for left front adjustable shock absorber 142 is set based on the damping value provided in the corner event table 228 for the outside shock, as represented by block 382, and processing sequence 300 is completed, as represented by block 306. If the vehicle acceleration is not to the left, left front adjustable shock absorber 142 is designated the inside shock, as represented by block 384, and the damping characteristics for left front adjustable shock absorber 142 is set based on the damping value provided in the corner event table 228 for the inside shock, as represented by block 382, and processing sequence 300 is completed, as represented by block 306. In embodiments, shock damping logic 150 also monitors vehicle acceleration/deceleration along axis 160 and this acceleration/deceleration value is a further input to corner event table. By taking into account the vehicle acceleration/deceleration along axis 160, shock damping logic 150 is able to adjust the damping characteristics for left front adjustable shock absorber 142 differently for when snowmobile 10 is entering a corner (deceleration) and when snowmobile 10 is exiting a corner (acceleration).

If a cornering event is not detected, shock damping logic 150 determines a damping characteristic for left front adjustable shock absorber 142 based on the damping value provided in the base damping table 230, as represented by block 390 and processing sequence 300 is completed, as represented by block 306.

Figure 10A:
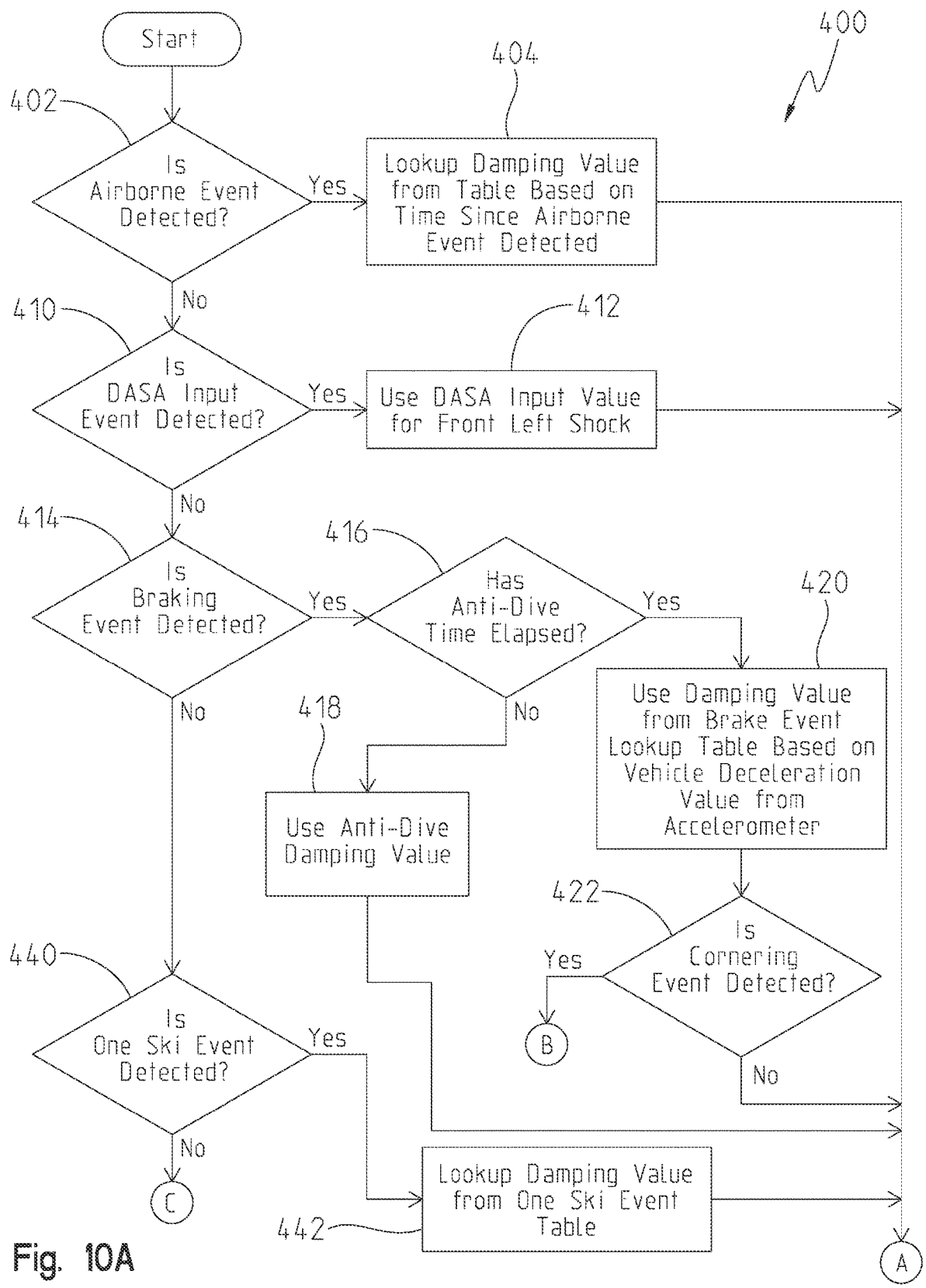
FIGS. 10A-C illustrate an exemplary processing sequence of the shock damping logic of the electronic controller of FIG. 6 for a continuous damping control shock absorber provided as part of the suspension of a right front ski of the exemplary snowmobile of FIG. 1.
Figure 10B:
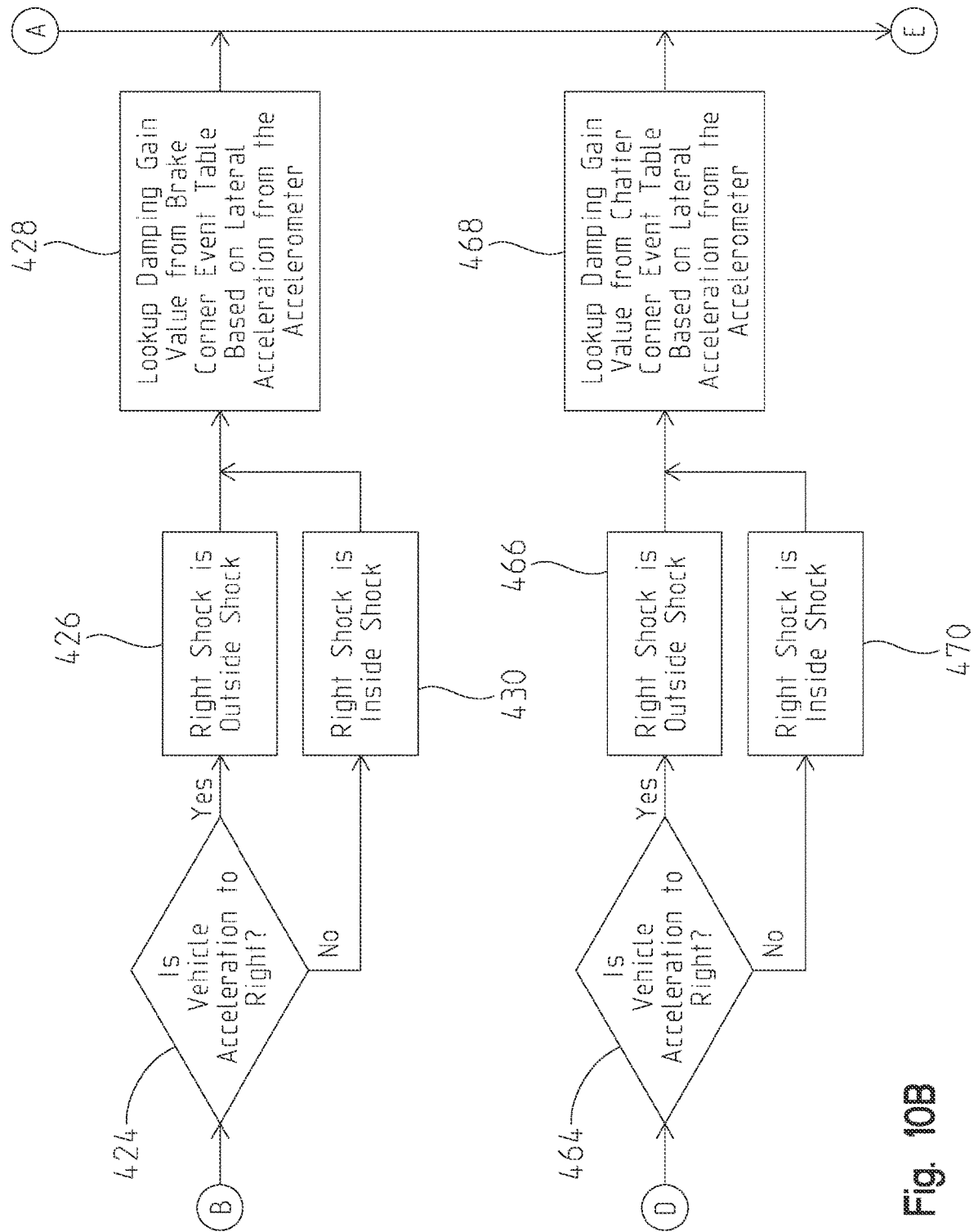
Figure 10C:
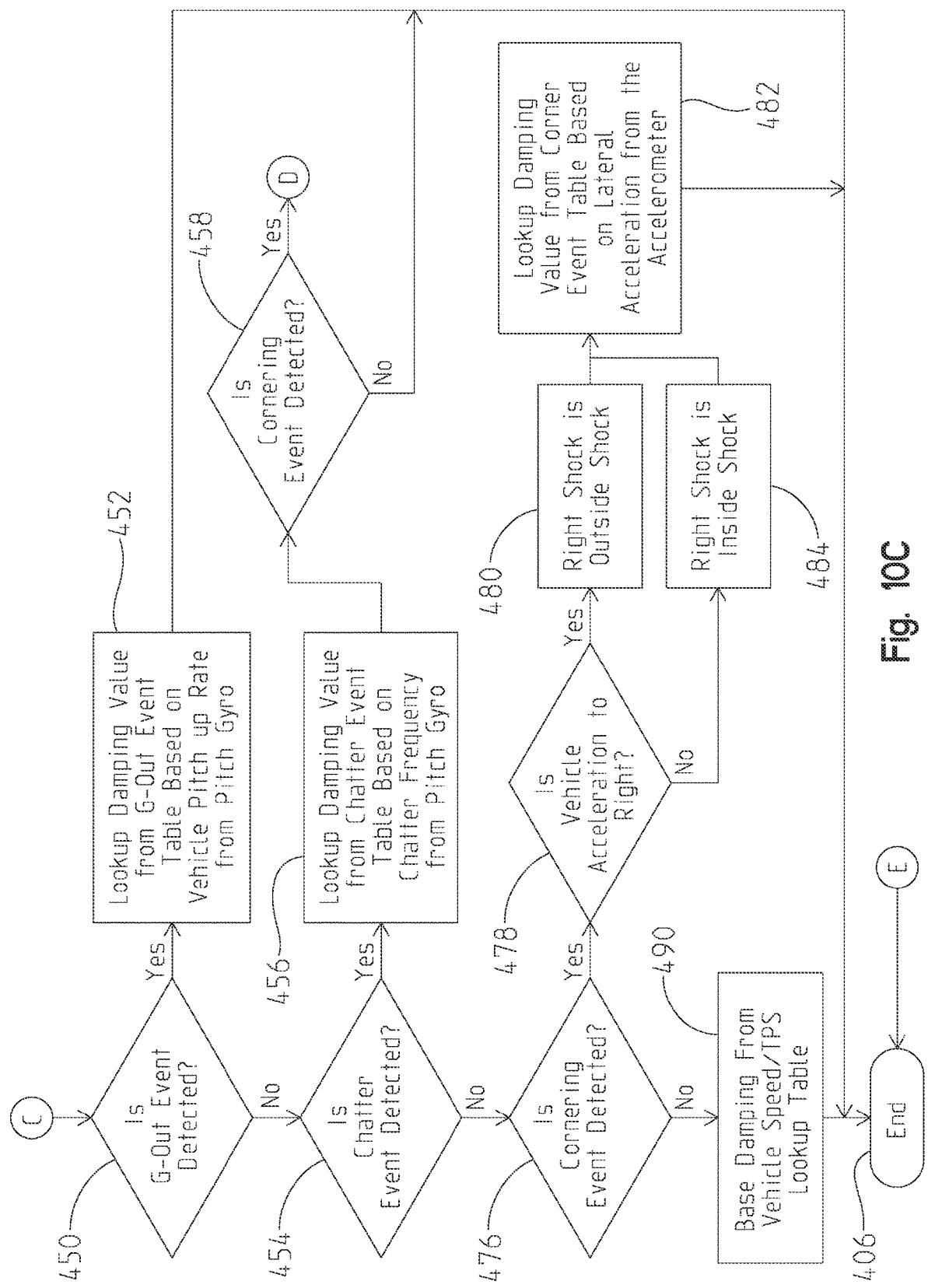

Referring to FIGS. 10A-C, an exemplary processing sequence 400 of the shock damping logic 150 of the electronic controller 200 of FIG. 6 for right front continuous damping control shock absorber 142 provided as part of the suspension 24 of a left front ski 16 of the exemplary snowmobile 10 of FIG. 1. Referring to FIG. 9A, processing sequence 400 determines if an airborne event is detected, as represented by block 402. An exemplary process 700 for detecting an airborne event is illustrated in FIG. 15. If an airborne event is detected, the damping characteristics for right front adjustable shock absorber 140 is set based on the damping value provided in airborne time table 210 of shock damping logic 150, as represented by block 404 and processing sequence 400 is completed, as represented by block 406.

If an airborne event is not detected, shock damping logic 150 determines if a driver actuatable suspension adjust input event is detected, as represented by block 410. If a driver actuatable suspension adjust input event is detected, the damping characteristics for right front adjustable shock absorber 140 is set based on the damping value provided in driver actuatable suspension adjust input table 212 of shock damping logic 150, as represented by block 412 and processing sequence 400 is completed, as represented by block 406.

If a driver actuatable suspension adjust input event is not detected, shock damping logic 150 determines if a braking event is detected, as represented by block 414. An exemplary process 650 for detecting a braking event is illustrated in FIG. 14. If a braking event is detected, shock damping logic 150 determines if an anti-dive time threshold has elapsed, as represented by block 416. If the anti-time threshold has not elapsed, the damping characteristics for right front adjustable shock absorber 140 is set based on the damping value provided in anti-dive table 216 of shock damping logic 150, as represented by block 418 and processing sequence 400 is completed, as represented by block 406.

If the anti-dive time threshold has elapsed, the damping characteristics for right front adjustable shock absorber 140 is set based on the damping value provided in brake event table 214 of shock damping logic 150 based on a value of vehicle deceleration from IMU 132. Shock damping logic 150 next determines if a cornering event is detected, as represented by block 422. If a cornering event is not detected processing sequence 400 is completed, as represented by block 406. If a cornering event is detected, shock damping logic 150 determines if the vehicle acceleration is to the right side of snowmobile 10, as represented by block 424. If the vehicle acceleration is to the right, right front adjustable shock absorber 140 is designated the outside shock, as represented by block 426, and the damping characteristics for right front adjustable shock absorber 140 is set based on the damping value provided in brake corner event table 220 for the outside shock, as represented by block 428, and processing sequence 400 is completed, as represented by block 406. If the vehicle acceleration is not to the left, right front adjustable shock absorber 140 is designated the inside shock, as represented by block 430, and the damping characteristics for right front adjustable shock absorber 140 is set based on the damping value provided in brake corner event table for the inside shock, as represented by block 428, and processing sequence 400 is completed, as represented by block 406.

If a braking event is not detected, shock damping logic 150 determines if a one ski event is detected, as represented by block 440. An exemplary process 1000 for detecting a one ski event is illustrated in FIG. 20. If a one ski event is detected, shock damping logic 150 determines the damping characteristics for right front adjustable shock absorber 140 is set based on the damping value provided in one ski event table 218 of shock damping logic 150, as represented by block 442 and processing sequence 400 is completed, as represented by block 406.

If a one ski event is not detected, shock damping logic 150 determines if a G-out event is detected, as represented by block 450. An exemplary process 600 for detecting a G-out event is illustrated in FIG. 13. If a G-out event is detected, shock damping logic 150 determines the damping characteristics for right front adjustable shock absorber 140 is set based on the damping value provided in G-out event table 224 of shock damping logic 150, as represented by block 452 and processing sequence 400 is completed, as represented by block 406.

If a G-out event is not detected, shock damping logic 150 determines if a chatter event is detected, as represented by block 454. An exemplary process 600 for detecting a chatter event is illustrated in FIG. 13. If a chatter event is detected, shock damping logic 150 determines the damping characteristics for right front adjustable shock absorber 140 is set based on the damping value provided in chatter event table 226 of shock damping logic 150, as represented by block 456. shock damping logic 150 then determines if a cornering event is detected, as represented by block 458. If a cornering event is not detected, processing sequence 400 is completed, as represented by block 406. If a cornering event is detected, shock damping logic 150 determines if the vehicle acceleration is to the right side of snowmobile 10, as represented by block 464. If the vehicle acceleration is to the right, right front adjustable shock absorber 140 is designated the outside shock, as represented by block 466, and the damping characteristics for right front adjustable shock absorber 140 is set based on the damping value provided in chatter corner event table 222 for the outside shock, as represented by block 468, and processing sequence 400 is completed, as represented by block 406. If the vehicle acceleration is not to the left, right front adjustable shock absorber 140 is designated the inside shock, as represented by block 470, and the damping characteristics for right front adjustable shock absorber 140 is set based on the damping value provided in chatter corner event table 222 for the inside shock, as represented by block 468, and processing sequence 400 is completed, as represented by block 406.

If a chatter event is not detected, shock damping logic 150 determines if a cornering event is detected, as represented by block 476. An exemplary process 800 for detecting a cornering event is illustrated in FIGS. 17A-D. If a cornering event is detected, shock damping logic 150 determines if the vehicle acceleration is to the right side of snowmobile 10, as represented by block 478. If the vehicle acceleration is to the right, right front adjustable shock absorber 140 is designated the outside shock, as represented by block 480, and the damping characteristics for right front adjustable shock absorber 140 is set based on the damping value provided in the corner event table 228 for the outside shock, as represented by block 482, and processing sequence 400 is completed, as represented by block 406. If the vehicle acceleration is not to the left, right front adjustable shock absorber 140 is designated the inside shock, as represented by block 484, and the damping characteristics for right front adjustable shock absorber 140 is set based on the damping value provided in the corner event table 228 for the inside shock, as represented by block 482, and processing sequence 400 is completed, as represented by block 406. In embodiments, shock damping logic 150 also monitors vehicle acceleration/deceleration along axis 160 and this acceleration/deceleration value is a further input to corner event table. By taking into account the vehicle acceleration/deceleration along axis 160, shock damping logic 150 is able to adjust the damping characteristics for right front adjustable shock absorber 140 differently for when snowmobile 10 is entering a corner (deceleration) and when snowmobile 10 is exiting a corner (acceleration).

If a cornering event is not detected, shock damping logic 150 determines a damping characteristic for right front adjustable shock absorber 140 based on the damping value provided in the base damping table 230, as represented by block 490 and processing sequence 400 is completed, as represented by block 406.

Figure 11A:
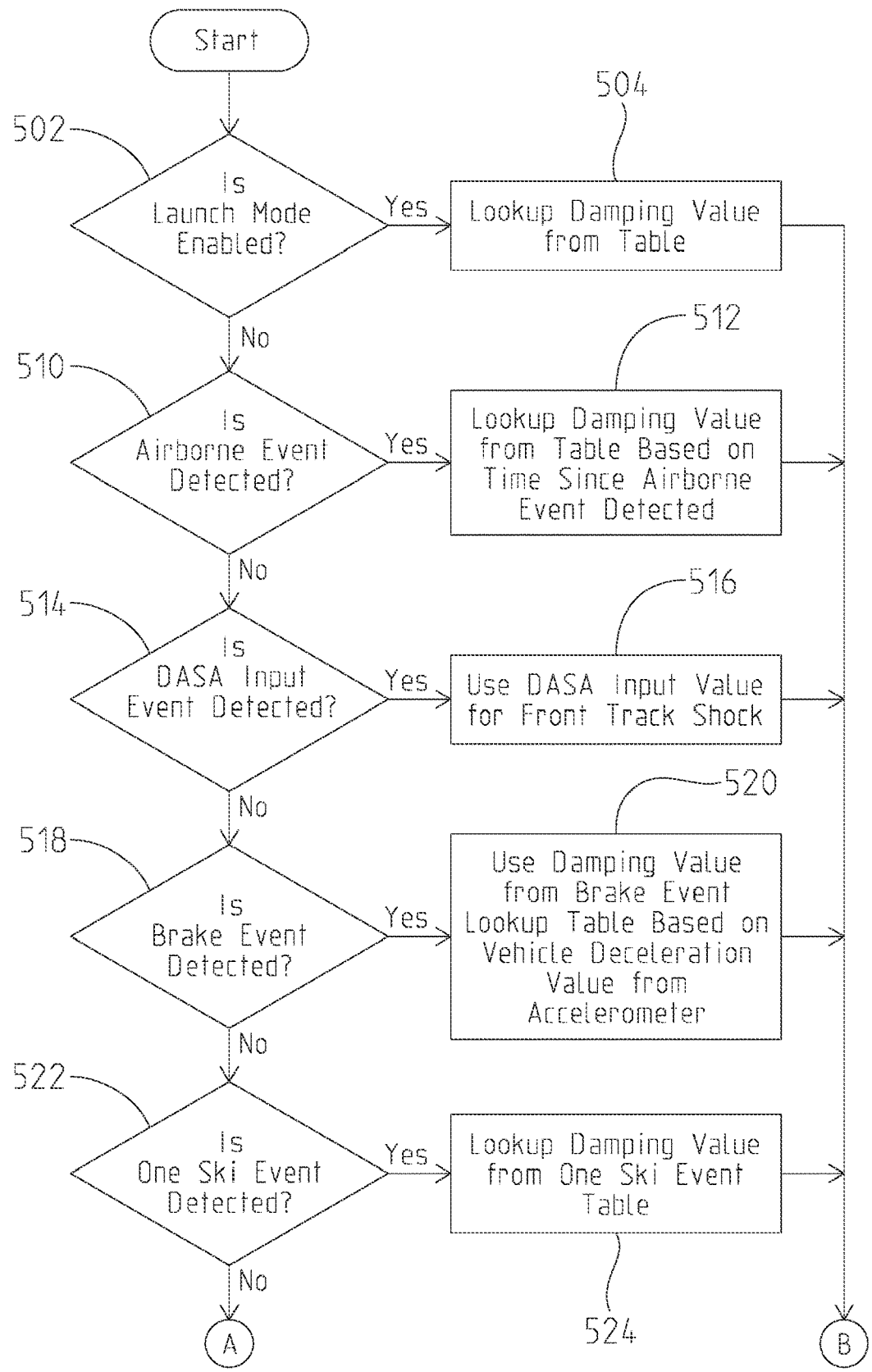
FIGS. 11A and 11B illustrate an exemplary processing sequence of the shock damping logic of the electronic controller of FIG. 6 for a continuous damping control shock absorber provided as part of the suspension for the endless track of the exemplary snowmobile of FIG. 1.
Figure 11B:
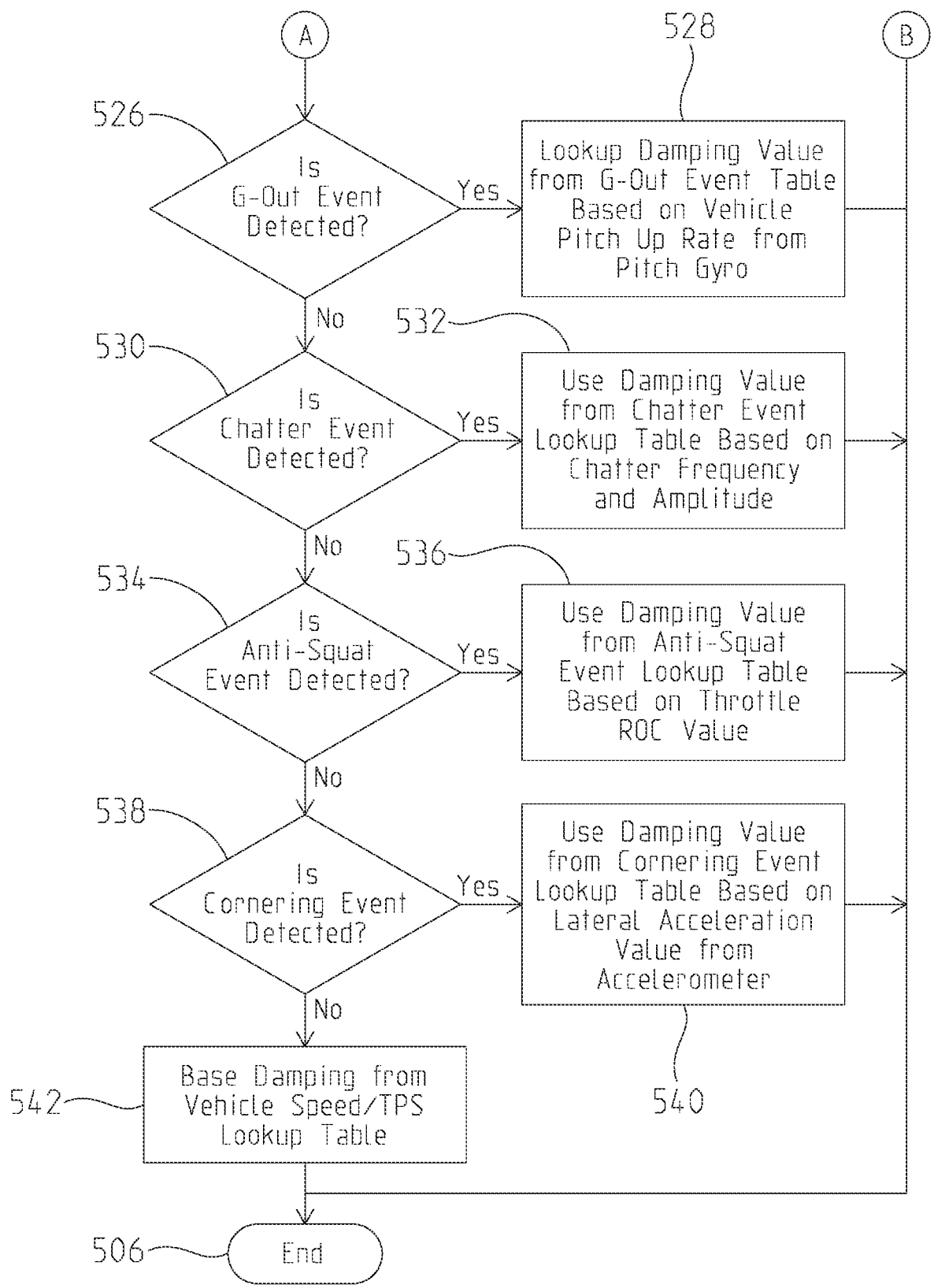

Referring to FIGS. 11A and 11B an exemplary processing sequence 500 of the shock damping logic 150 of the electronic controller 200 of FIG. 6 for first track continuous damping control shock absorber 144 provided as part of the suspension 26 of the exemplary snowmobile 10 of FIG. 1.

Shock damping logic 150 determines if a launch mode has been enabled, as represented by block 502. An exemplary processing sequence 950 for determining if a launch mode has been enabled is provided in FIGS. 19A and 19B. If a launch mode has been enabled, shock damping logic 150 determines a damping characteristic for first track continuous damping control shock absorber 144 based on the damping value provided in the launch mode event table 232, as represented by block 504 and processing sequence 500 is completed, as represented by block 506.

If a launch mode is not detected, shock damping logic 150 determines if an airborne event is detected, as represented by block 510. If an airborne event is detected, shock damping logic 150 determines a damping characteristic for first track continuous damping control shock absorber 144 based on the damping value provided in the airborne event table 210, as represented by block 512 and processing sequence 500 is completed, as represented by block 506.

If an airborne event is not detected, shock damping logic 150 determines if a driver actuatable suspension adjust input event is detected, as represented by block 514. If a driver actuatable suspension adjust input event is detected, shock damping logic 150 determines a damping characteristic for first track continuous damping control shock absorber 144 based on the damping value provided in the driver actuatable suspension adjust input event table 212, as represented by block 516 and processing sequence 500 is completed, as represented by block 506.

If a driver actuatable suspension adjust input event is not detected, shock damping logic 150 determines if a brake event is detected, as represented by block 518. If a brake event is detected, shock damping logic 150 determines a damping characteristic for first track continuous damping control shock absorber 144 based on the damping value provided in the brake event table 214, as represented by block 520 and processing sequence 500 is completed, as represented by block 506.

If a brake event is not detected, shock damping logic 150 determines if a one ski event is detected, as represented by block 522. If a one ski event is detected, shock damping logic 150 determines a damping characteristic for first track continuous damping control shock absorber 144 based on the damping value provided in the one ski event table 218, as represented by block 524 and processing sequence 500 is completed, as represented by block 506.

If a one ski event is not detected, shock damping logic 150 determines if a g-out event is detected, as represented by block 526. If a g-out event is detected, shock damping logic 150 determines a damping characteristic for first track continuous damping control shock absorber 144 based on the damping value provided in the g-out event table 224, as represented by block 528 and processing sequence 500 is completed, as represented by block 506.

If a G-out event is not detected, shock damping logic 150 determines if a chatter event is detected, as represented by block 530. If a chatter event is detected, shock damping logic 150 determines a damping characteristic for first track continuous damping control shock absorber 144 based on the damping value provided in the chatter event table 226, as represented by block 532 and processing sequence 500 is completed, as represented by block 506.

If a chatter event is not detected, shock damping logic 150 determines if an anti-squat event is detected, as represented by block 534. If an anti-squat event is detected, shock damping logic 150 determines a damping characteristic for first track continuous damping control shock absorber 144 based on the damping value provided in the anti-squat event table 234, as represented by block 536 and processing sequence 500 is completed, as represented by block 506.

If an anti-squat event is not detected, shock damping logic 150 determines if a cornering event is detected, as represented by block 538. If a cornering event is detected, shock damping logic 150 determines a damping characteristic for first track continuous damping control shock absorber 144 based on the damping value provided in the cornering event table 228, as represented by block 540 and processing sequence 500 is completed, as represented by block 506. In embodiments, shock damping logic 150 also monitors vehicle acceleration/deceleration along axis 160 and this acceleration/deceleration value is a further input to corner event table. By taking into account the vehicle acceleration/deceleration along axis 160, shock damping logic 150 is able to adjust the damping characteristics for front track adjustable shock absorber 144 differently for when snowmobile 10 is entering a corner (deceleration) and when snowmobile 10 is exiting a corner (acceleration).

If a cornering event is not detected, shock damping logic 150 determines a damping characteristic for first track continuous damping control shock absorber 144 based on the damping value provided in the base damping table 230, as represented by block 542 and processing sequence 500 is completed, as represented by block 506.

Figure 12A:
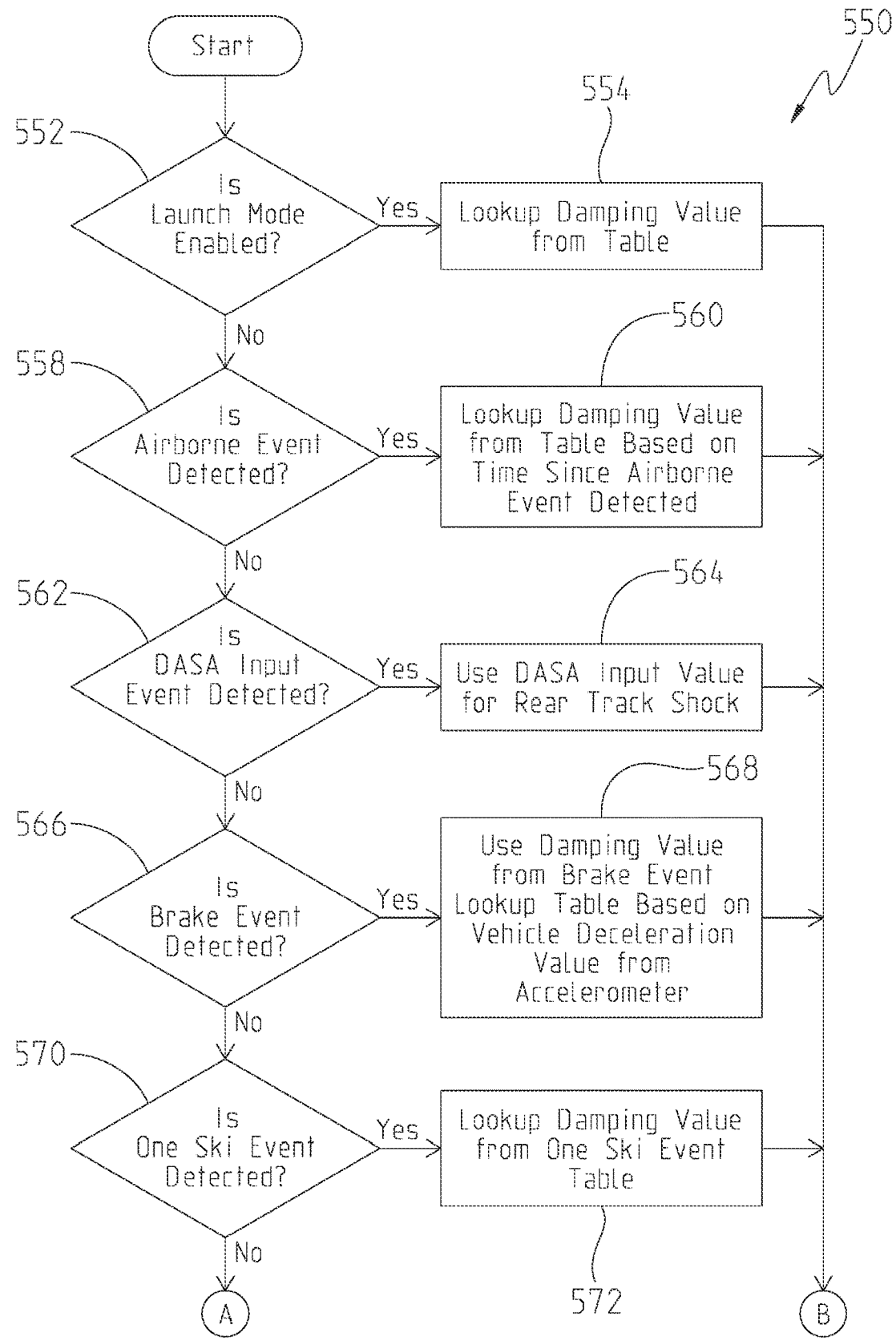
FIGS. 12A and 12B illustrate an exemplary processing sequence of the shock damping logic of the electronic controller of FIG. 6 for a continuous damping control shock absorber provided as part of the suspension for the endless track of the exemplary snowmobile of FIG. 1.
Figure 12B:
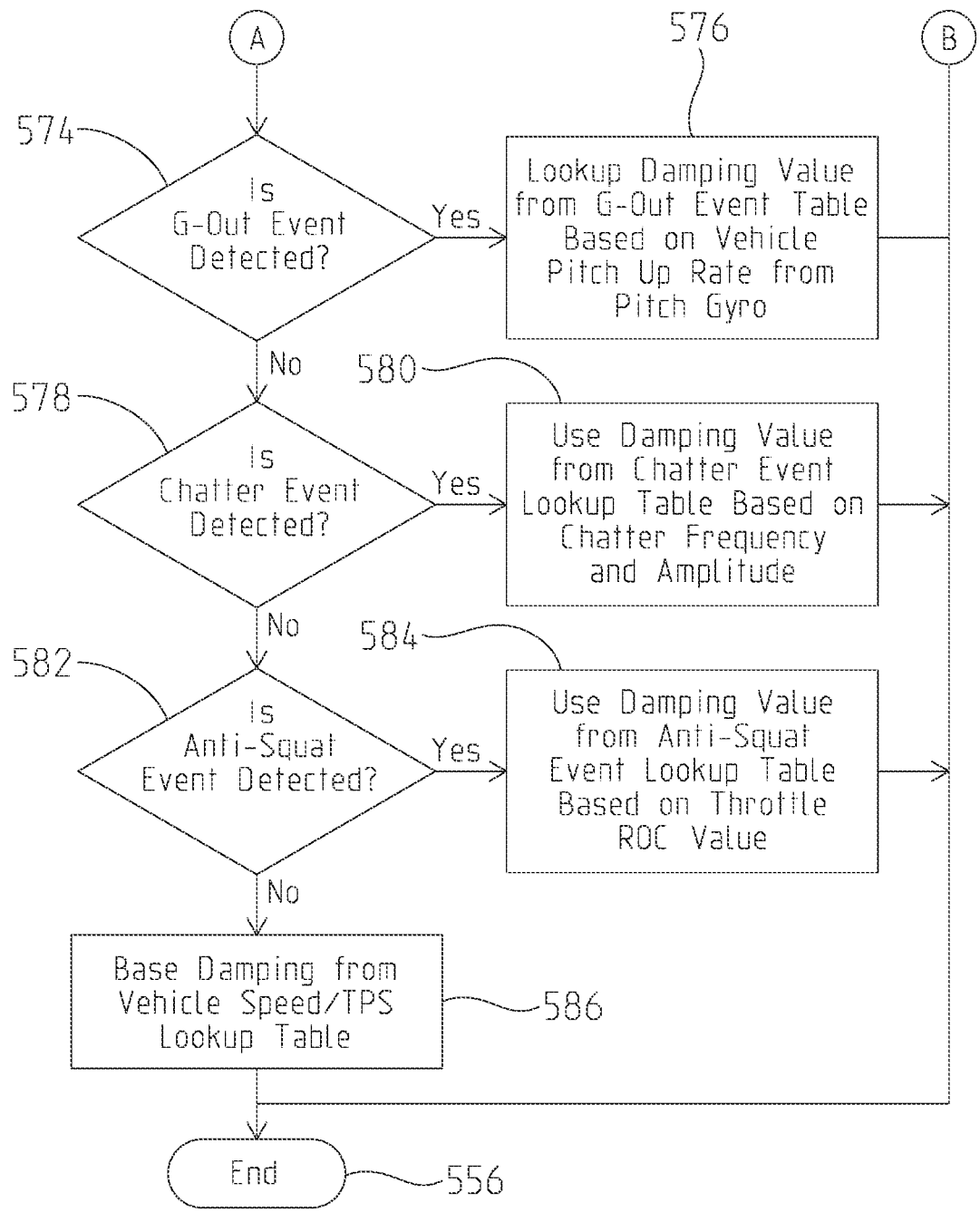

Referring to FIGS. 12A and 12B an exemplary processing sequence 550 of the shock damping logic 150 of the electronic controller 200 of FIG. 6 for second track continuous damping control shock absorber 146 provided as part of the suspension 26 of the exemplary snowmobile 10 of FIG. 1.

Shock damping logic 150 determines if a launch mode has been enabled, as represented by block 552. An exemplary processing sequence for determining if a launch mode has been enabled is provided in FIGS. 19A and 19B. If a launch mode has been enabled, shock damping logic 150 determines a damping characteristic for second track continuous damping control shock absorber 146 based on the damping value provided in the launch mode event table 232, as represented by block 554 and processing sequence 550 is completed, as represented by block 556.

If a launch mode is not detected, shock damping logic 150 determines if an airborne event is detected, as represented by block 558. If an airborne event is detected, shock damping logic 150 determines a damping characteristic for second track continuous damping control shock absorber 146 based on the damping value provided in the airborne event table 210, as represented by block 560 and processing sequence 550 is completed, as represented by block 556.

If an airborne event is not detected, shock damping logic 150 determines if a driver actuatable suspension adjust input event is detected, as represented by block 562. If a driver actuatable suspension adjust input event is detected, shock damping logic 150 determines a damping characteristic for second track continuous damping control shock absorber 146 based on the damping value provided in the driver actuatable suspension adjust input event table 212, as represented by block 564 and processing sequence 550 is completed, as represented by block 556.

If a driver actuatable suspension adjust input event is not detected, shock damping logic 150 determines if a brake event is detected, as represented by block 566. If a brake event is detected, shock damping logic 150 determines a damping characteristic for second track continuous damping control shock absorber 146 based on the damping value provided in the brake event table 214, as represented by block 568 and processing sequence 550 is completed, as represented by block 556.

If a brake event is not detected, shock damping logic 150 determines if a one ski event is detected, as represented by block 570. If a one ski event is detected, shock damping logic 150 determines a damping characteristic for second track continuous damping control shock absorber 146 based on the damping value provided in the one ski event table 218, as represented by block 572 and processing sequence 550 is completed, as represented by block 556.

If a one ski event is not detected, shock damping logic 150 determines if a g-out event is detected, as represented by block 574. If a g-out event is detected, shock damping logic 150 determines a damping characteristic for second track continuous damping control shock absorber 146 based on the damping value provided in the g-out event table 224, as represented by block 576 and processing sequence 550 is completed, as represented by block 556.

If a g-out event is not detected, shock damping logic 150 determines if a chatter event is detected, as represented by block 578. If a chatter event is detected, shock damping logic 150 determines a damping characteristic for second track continuous damping control shock absorber 146 based on the damping value provided in the chatter event table 226, as represented by block 580 and processing sequence 550 is completed, as represented by block 556.

If a chatter event is not detected, shock damping logic 150 determines if an anti-squat event is detected, as represented by block 582. If an anti-squat event is detected, shock damping logic 150 determines a damping characteristic for second track continuous damping control shock absorber 146 based on the damping value provided in the anti-squat event table 234, as represented by block 584 and processing sequence 550 is completed, as represented by block 556.

If an anti-squat event is not detected, shock damping logic 150 determines a damping characteristic for second track continuous damping control shock absorber 146 based on the damping value provided in the base damping table 230, as represented by block 586 and processing sequence 550 is completed, as represented by block 556.

Referring to FIG. 13, an exemplary processing sequence 600 of the shock damping logic 150 of the electronic controller 200 of FIG. 6 for detecting a g-out event or a chatter event is illustrated. suspension controller 200 samples from IMU 132 a pitch of snowmobile 10 about axis 162 over a window of time, as represented by block 602. The sampled values are input to a discrete Fourier transform ("DFT"), as represented by block 604, to provide a frequency map of the changes in pitch of snowmobile 10.

The magnitude of the low frequency values, such as from 0 Hz to 3 Hz, are compared a low frequency threshold, as represented by block 606. If the magnitude of the low frequency values do not satisfy the low frequency threshold, then no event is detected and the low frequency portion of processing sequence 600 ends, as represented by blocks 614 and 612. If the magnitude of the low frequency values satisfy the low frequency threshold, then processing sequence 600 compares a pitch up rate from a gyroscope input from the IMU 132 to another threshold, as represented by block 608. If the pitch-up rate does not satisfy the threshold, then no event is detected and the low frequency portion of processing sequence 600 ends, as represented by blocks 614 and 612. If the pitch-up rate satisfies the threshold, then a g-out event is detected, as represented by block 610. The detection of a g-out event as explained herein results in the damping characteristics for one or more of right front adjustable shock absorber 140, left front adjustable shock absorber 142, front track adjustable shock absorber 144, and rear track adjustable shock absorber 146 being selected based on g-out event table 224. In general, the damping characteristics are increased stiffness of right front adjustable shock absorber 140, left front adjustable shock absorber 142, and rear track adjustable shock absorber 146.

The magnitude of the high frequency values, such as from 3 Hz to 10 Hz, are compared a high frequency threshold, as represented by block 616. If the magnitude of the high frequency values does not satisfy the high frequency threshold, then no event is detected and the high frequency portion of processing sequence 600 ends, as represented by blocks 614 and 612. If the magnitude of the high frequency values satisfies the high frequency threshold, then a chatter event is detected, as represented by block 618. The detection of a chatter event as explained herein results in the damping characteristics for one or more of right front adjustable shock absorber 140, left front adjustable shock absorber 142, front track adjustable shock absorber 144, and rear track adjustable shock absorber 146 being selected based on chatter event table 226.

Referring to FIG. 14, an exemplary processing sequence 650 of the shock damping logic 150 of the electronic controller 200 of FIG. 6 for detecting an exemplary brake event is illustrated. shock damping logic 150 determines if a brake switch is activated, as represented by block 652. In embodiments, a switch is closed when a brake input is actuated. If the brake switch is not activated, no brake event is detected, as represented by block 654, and processing sequence 650 is completed. If the brake switch is activated, a brake event is detected, as represented by block 656, and processing sequence 650 is completed.

FIG. 15 illustrates an exemplary processing sequence 700 of the shock damping logic 150 of the electronic controller 200 of FIG. 6 for detecting an exemplary airborne event. shock damping logic 150 if an acceleration of snowmobile 10 along axis 164 detected by IMU 132 is below a threshold value, as represented by block 702. If the detected acceleration is below the threshold value, an airborne event is detected, as represented by block 704 and processing sequence 700 is completed. If the detected acceleration is greater than the threshold, then shock damping logic 150 checks to see if the current status of snowmobile 10 is that an airborne event is active for snowmobile 10 meaning that snowmobile 10 was recently determined to be in and is still in an airborne event, as represented by block 708. If an airborne event is not active, no change is made meaning snowmobile 10 is not found to now be in an airborne event, as represented by block 710, and processing sequence 700 is completed. If an airborne event is active, shock damping logic 150 determines if the detected vertical acceleration exceeds the threshold value plus a hysteresis value of IMU 132, as represented by block 712. If not, no change is made meaning snowmobile 10 remains in an airborne event, as represented by block 710, and processing sequence 700 is completed, as represented by block 706. If the detected vertical acceleration does exceed the threshold value plus the hysteresis value of IMU 132, shock damping logic 150 determines if the elapsed time from the determination that snowmobile 10 is in an airborne event exceeds a timeout value, as represented by block 714. If the elapsed time does not exceed the timeout value, no change is made meaning snowmobile 10 remains in an airborne event, as represented by block 710, and processing sequence 700 is completed, as represented by block 706. If the elapsed time does exceed the timeout value, the status of snowmobile 10 is changed to airborne event not detected, as represented by block 716, and processing sequence 700 is completed, as represented by block 706.

Figure 16A:
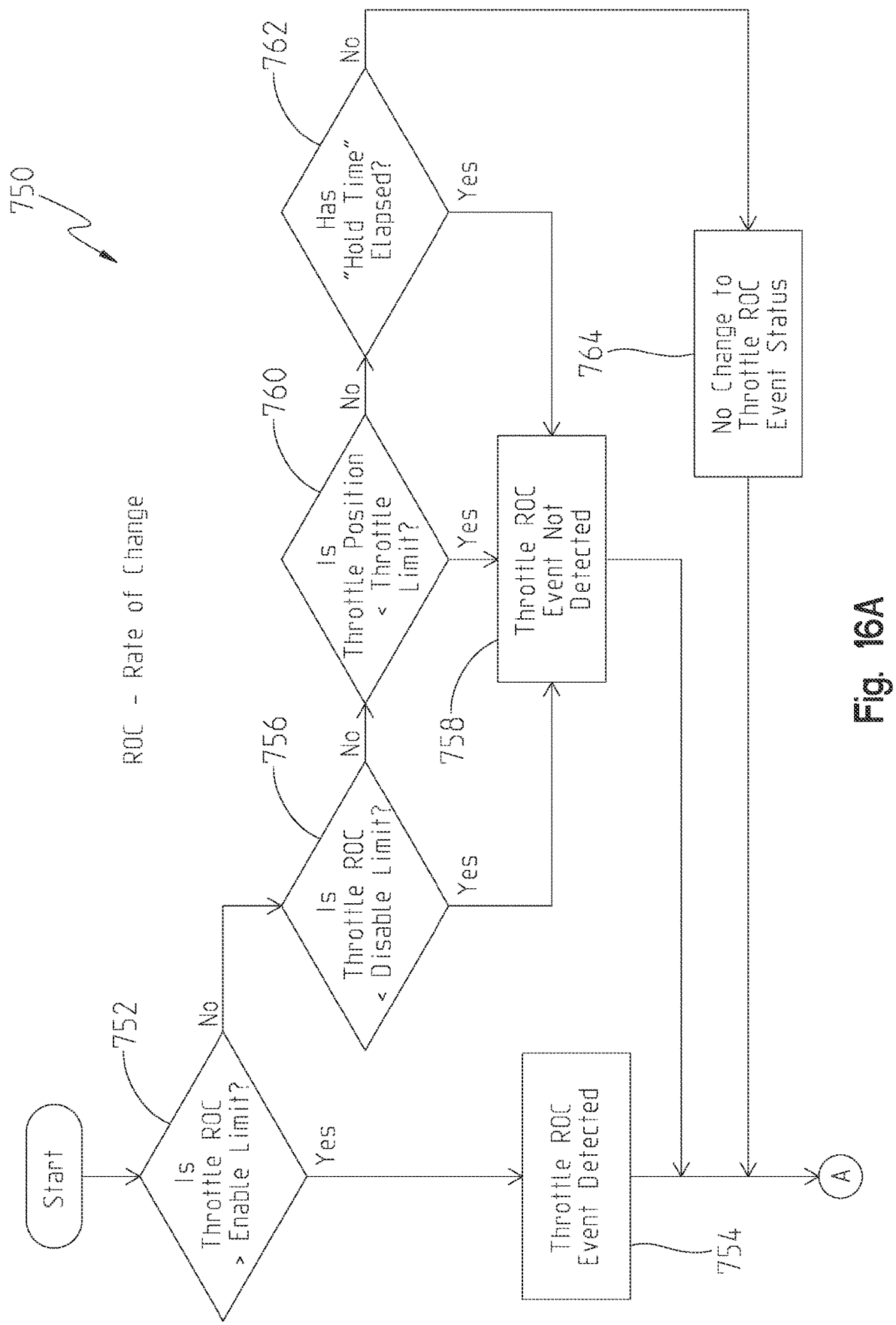
Figure 16B:
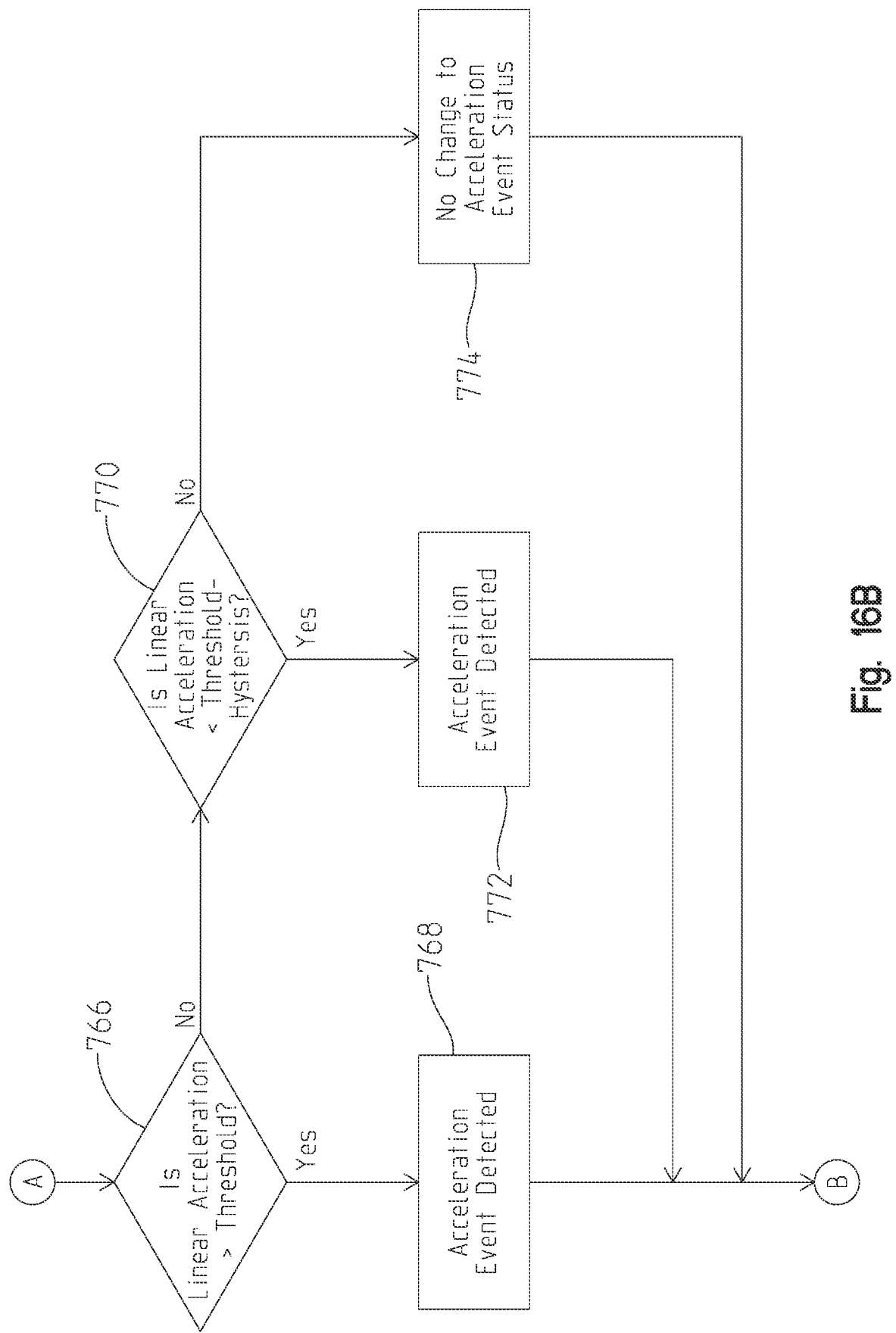

FIGS. 16A-C illustrates an exemplary processing sequence 750 of the shock damping logic 150 of the electronic controller 200 of FIG. 6 for detecting an exemplary anti-squat event. shock damping logic 150 determines if a rate of change of the throttle input detected by throttle position sensor 138 exceeds an enable limit, as represented by block 752. If so, then shock damping logic 150 determines that a throttle rate of change event is detected, as represented by block 754. If not, shock damping logic 150 determines if a rate of change of the throttle input is less than a disable limit, as represented by block 756. If the rate of change of the throttle input is less than the disable limit, shock damping logic 150 determines that a throttle rate of change event is not detected, as represented by block 758. If the rate of change of the throttle input is not less than the disable limit, shock damping logic 150 determines if the detected throttle position is less than a throttle limit meaning that the operator has backed off on the throttle, as represented by block 760. If the detected throttle position is less than the throttle limit, shock damping logic 150 determines that a throttle rate of change event is not detected, as represented by block 758. If the detected throttle position is greater than the throttle limit, shock damping logic 150 determines if the elapsed time since a throttle rate of change event was detected exceeds a hold time threshold, as represented by block 762. If the elapsed time since the throttle rate of change event was detected does not exceed the hold time threshold, no change is made to whether a throttle rate of change event is active or not, as represented by block 764. If the elapsed time since the throttle rate of change event was detected does exceed the hold time threshold, shock damping logic 150 determines that a throttle rate of change event is not detected, as represented by block 758.

Turning to FIG. 16B, shock damping logic 150 next determines if a linear acceleration of snowmobile 10 along axis 160 exceeds a threshold, as represented by block 766. If the linear acceleration of snowmobile 10 along axis 160 exceeds the threshold, then an acceleration event is detected, as represented by block 768. If the linear acceleration of snowmobile 10 along axis 160 does not exceed the threshold, shock damping logic 150 determines if the linear acceleration of snowmobile 10 is less than the threshold minus a hysteresis of IMU 132, as represented by block 770. If so, an acceleration event is not detected, as represented by block 772. If not, no change is made to the current status of whether an acceleration event is active or not for snowmobile 10, as represented by block 774.

Turning to FIG. 16C, shock damping logic 150 determines if one of a throttle rate of change event or an acceleration event is active for snowmobile 10, as represented by block 780. If either is active, an anti-squat event is determined, as represented by block 782, and processing sequence 750 is completed, as represented by block 790. If not, then shock damping logic 150 checks to verify both the throttle rate of change event and the acceleration event are not active, as represented by block 784. If both are inactive, shock damping logic 150 disables an anti-squat event, as represented by block 786, and processing sequence 750 is completed, as represented by block 790. If one of the throttle rate of change event and the acceleration event are active, no change is made to the anti-squat status of snowmobile 10, as represented by block 788, and processing sequence 750 is completed, as represented by block 790.

FIGS. 17A-D illustrates an exemplary processing sequence 800 of the shock damping logic 150 of the electronic controller 200 of FIG. 6 for detecting an exemplary cornering event. shock damping logic 150 determines if an absolute value of a detected steering angle detected by steering angle sensor 136 exceeds a threshold (a zero steering angle corresponds with the skis pointing directly forward along axis 160), as represented by block 802. If the absolute value of the detected steering angle detected by steering angle sensor 136 exceeds the threshold, a steering event is detected, as represented by block 804. If not, the absolute value of the detected steering angle detected by steering angle sensor 136 is compared to the threshold minus a hysteresis value of the steering angle sensor 136, as represented by block 806. If the absolute value of the detected steering angle detected by steering angle sensor 136 is less than the threshold minus the hysteresis value of the steering angle sensor 136, shock damping logic 150 determines that a steering event is not detected, as represented by block 808. If the absolute value of the detected steering angle detected by steering angle sensor 136 is not less than the threshold minus the hysteresis value of the steering angle sensor 136, shock damping logic 150 makes no change to the steering event status of snowmobile 10, as represented by block 810.

Figure 17A:
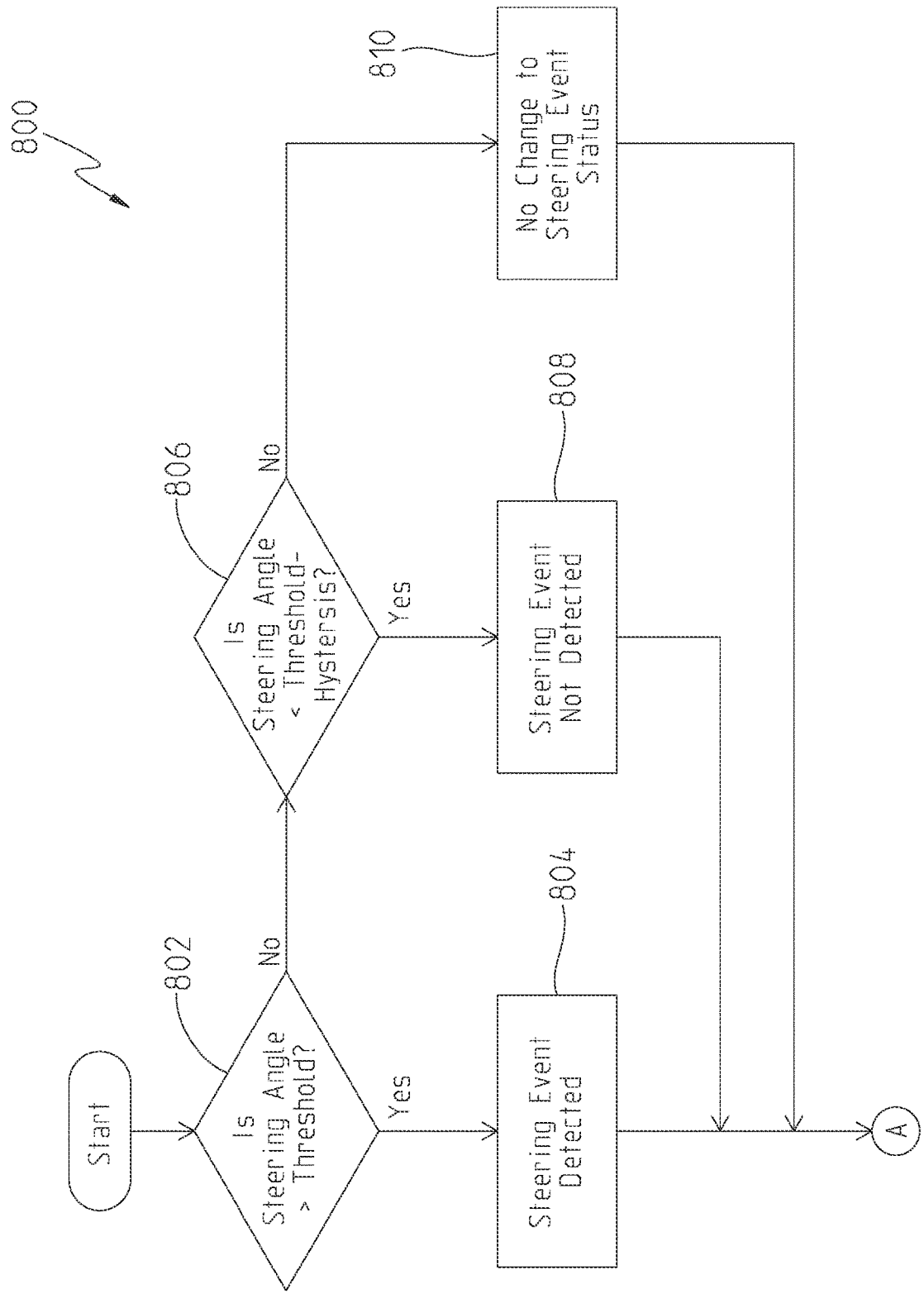
FIGS. 17A-D illustrates an exemplary processing sequence of the shock damping logic of the electronic controller of FIG. 6 for detecting an exemplary cornering event.
Figure 17B:
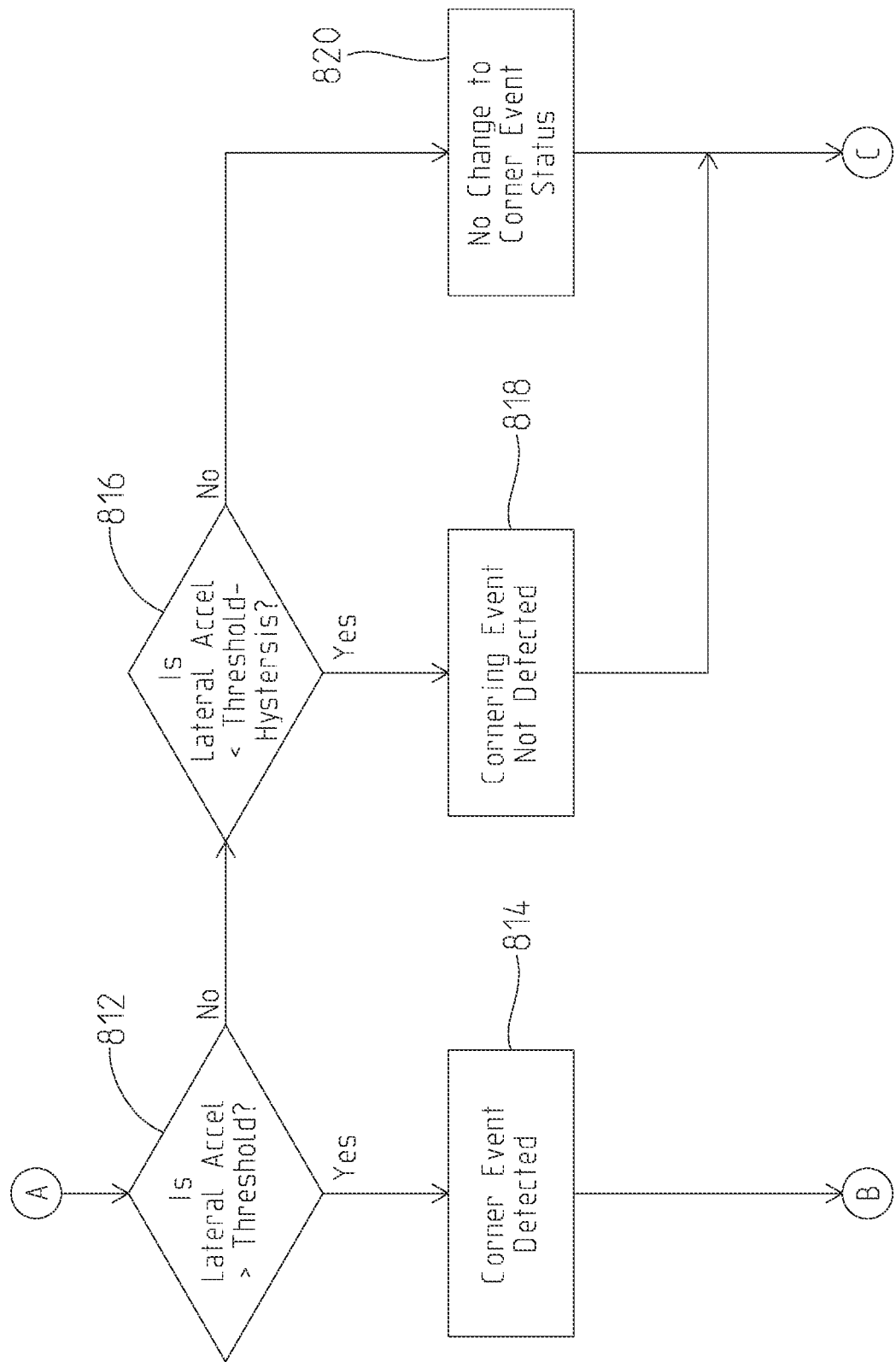

Turning to FIG. 17B, shock damping logic 150 determines if a lateral acceleration of snowmobile 10 along axis 162 exceeds a threshold value, as represented by block 812. If the lateral acceleration of snowmobile 10 along axis 162 exceeds the threshold value, then a corner event is detected, as represented by block 814. If not, the absolute value of the detected lateral acceleration of snowmobile 10 is compared to the threshold minus a hysteresis value of IMU 132, as represented by block 816. If the absolute value of the detected lateral acceleration of snowmobile 10 is less than the threshold minus the hysteresis value of IMU 132, shock damping logic 150 determines that a cornering event is not detected, as represented by block 818. If the absolute value of the detected lateral acceleration of snowmobile 10 is not less than the threshold minus the hysteresis value of IMU 132, shock damping logic 150 makes no change to the corner event status of snowmobile 10, as represented by block 820.

Figure 17C:
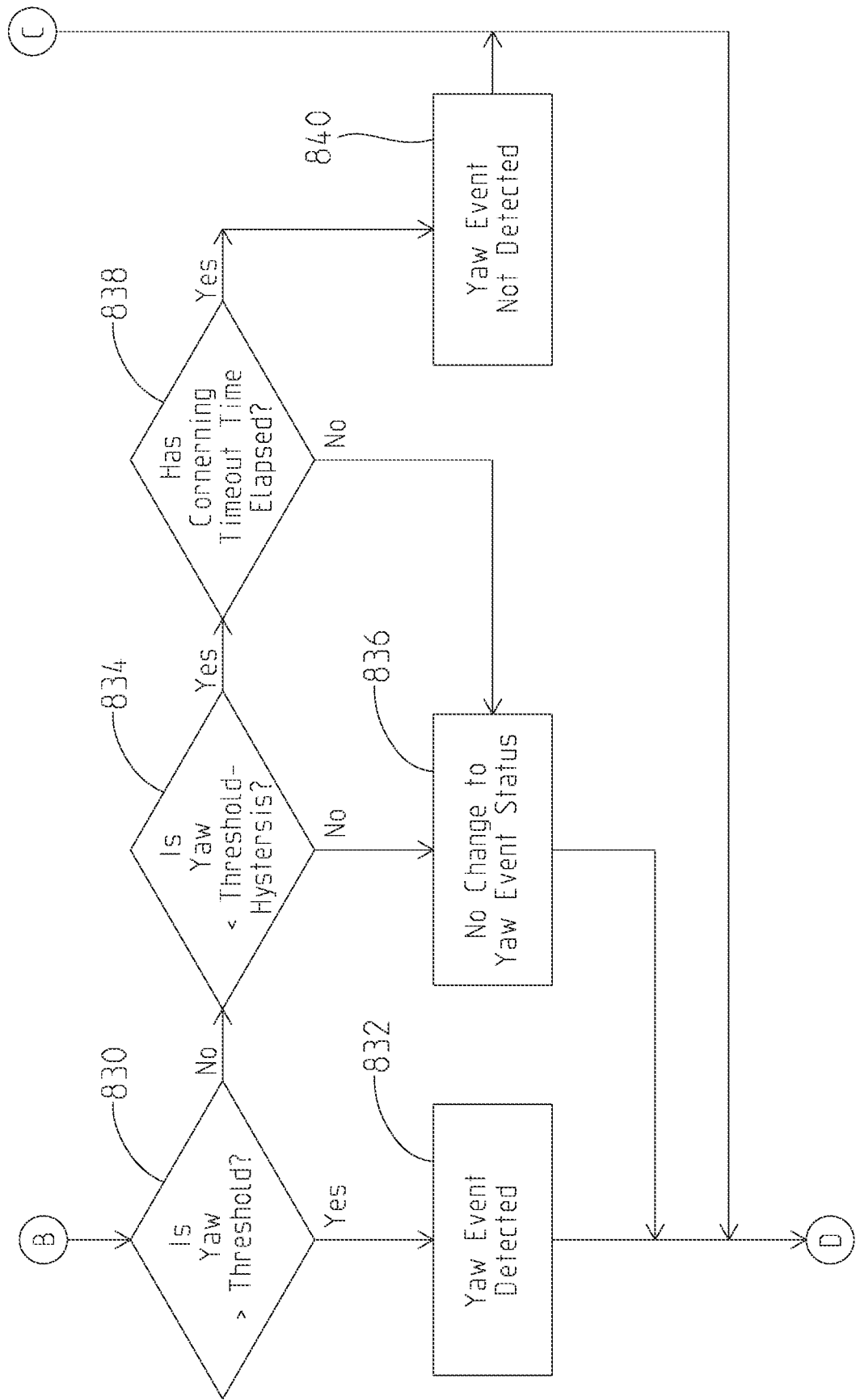

Turning to FIG. 17C, shock damping logic 150 determines if an absolute value of yaw rate and/or angle about axis 164 exceeds a threshold value, as represented by block 830. If the absolute value of yaw rate and/or angle about axis 164 exceeds the threshold value, then a yaw event is detected, as represented by block 832. If not, the absolute value of yaw rate and/or angle about axis 164 is compared to the threshold minus a hysteresis value of IMU 132, as represented by block 834. If the absolute value of the absolute value of yaw rate and/or angle about axis 164 is not less than the threshold minus the hysteresis value of IMU 132, shock damping logic 150 makes no change to the yaw status of snowmobile 10, as represented by block 836. If the absolute value of absolute value of yaw rate and/or angle about axis 164 is less than the threshold minus the hysteresis value of IMU 132, shock damping logic 150 determines if a cornering event timeout time has elapsed, as represented by block 838. If the cornering timeout time has not elapsed, shock damping logic 150 makes no change to the yaw status of snowmobile 10, as represented by block 836. If the cornering timeout time has elapsed, then a yaw event is detected, as represented by block 840.

Figure 17D:
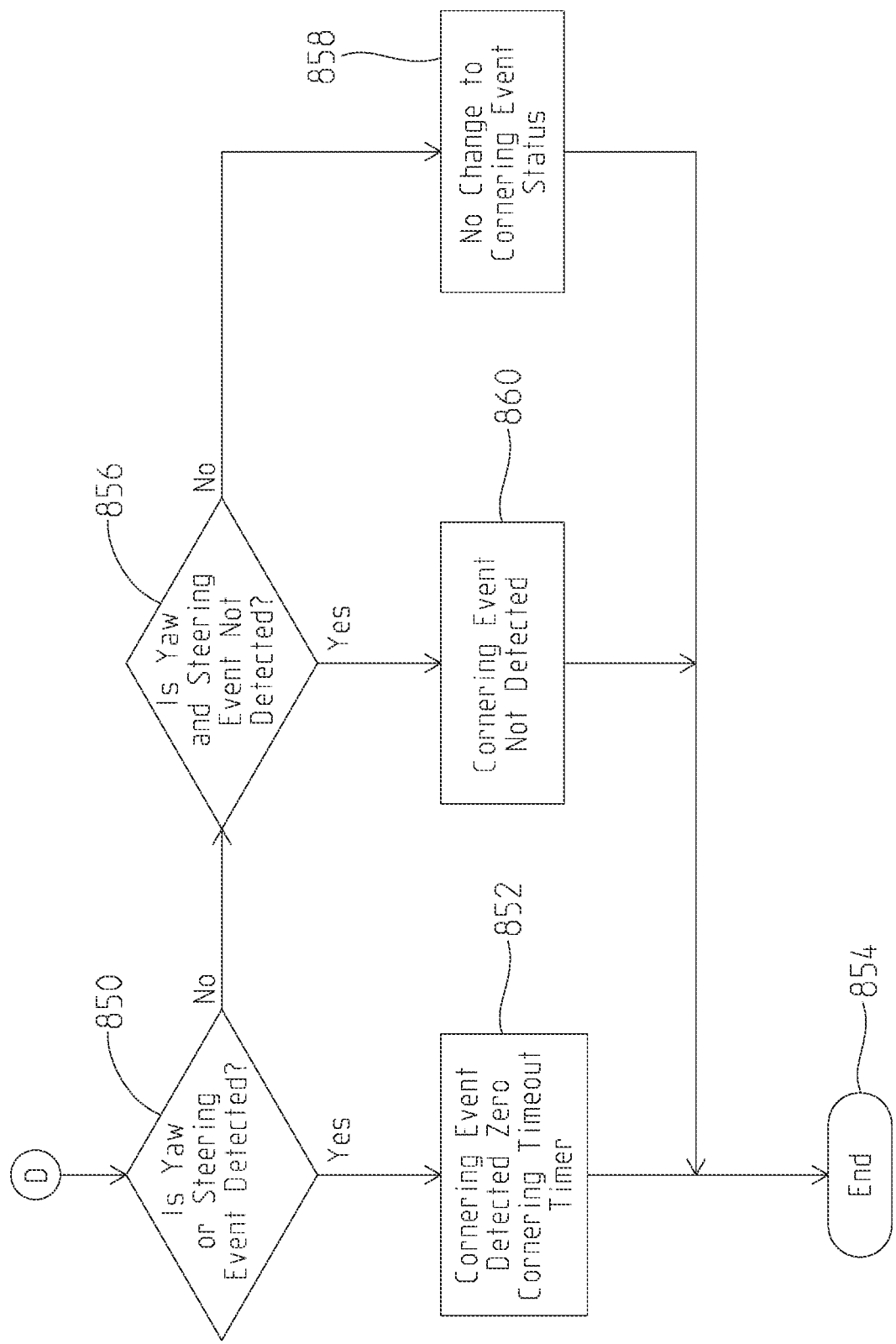

Turning to FIG. 17D, shock damping logic 150 determines if a yaw event or a steering event was detected in processing sequence 800, as represented by block 850. If one of the yaw event and steering event was detected then a cornering event is detected and the cornering timeout timer is set to zero, as represented by block 852, and processing sequence 800 is completed, as represented by block 854. If one of the yaw event and steering event was not detected then shock damping logic 150 determines if both the yaw event and steering event not detected, as represented by block 856. If not, then there is no change to the cornering event status as represented by block 858, and processing sequence 800 exits, as represented by block 854. If so, then shock damping logic 150 determines a cornering event is not detected as represented by block 860, and processing sequence 800 exits, as represented by block 854.

Figure 18:
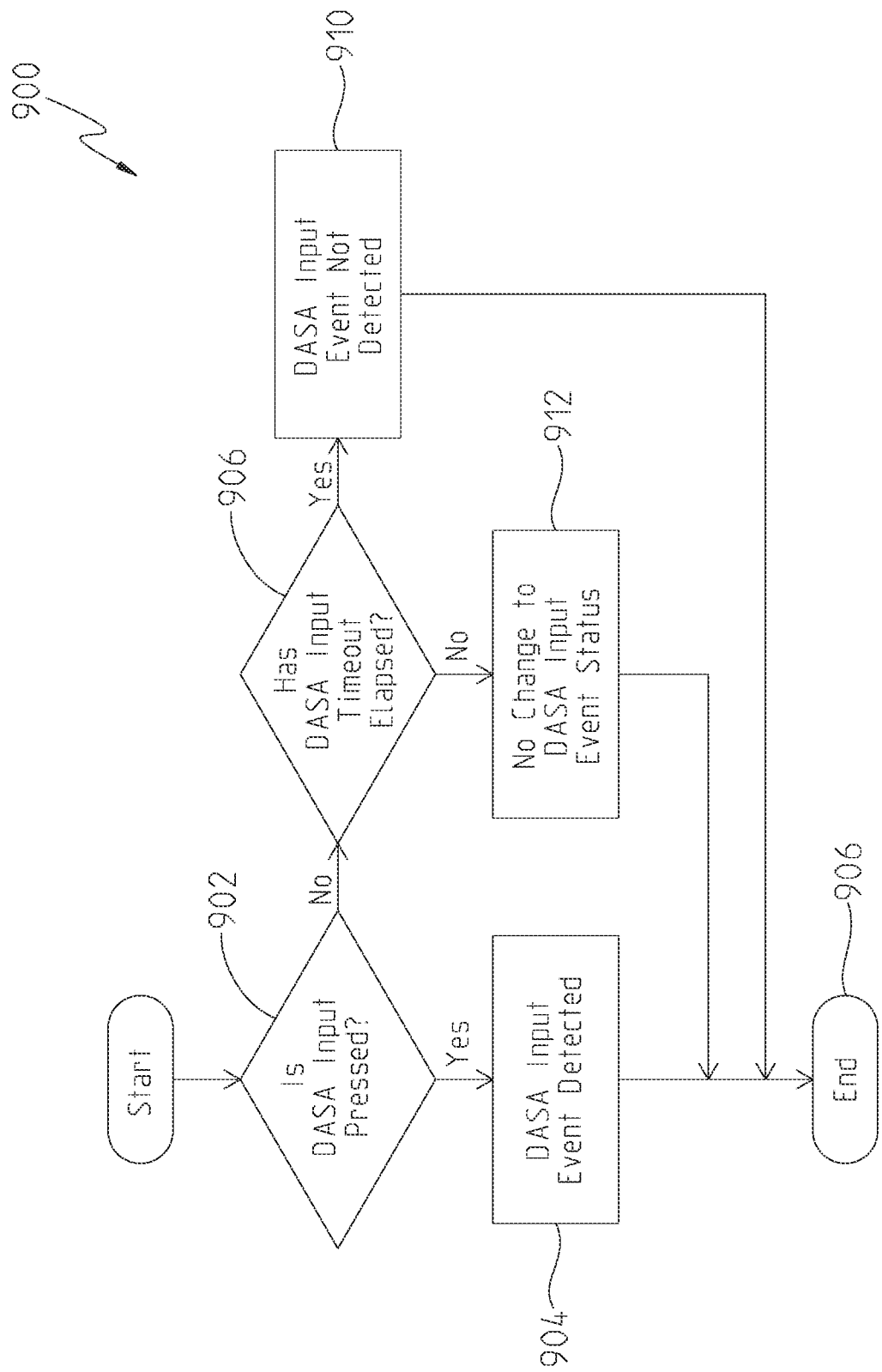
FIG. 18 illustrates an exemplary processing sequence of the shock damping logic of the electronic controller of FIG. 6 for detecting an exemplary driver actuatable suspension adjust input event.

FIG. 18 illustrates an exemplary processing sequence 900 of the shock damping logic 150 of the electronic controller 200 of FIG. 6 for detecting an exemplary driver actuatable suspension adjust input event. shock damping logic 150 monitors whether driver actuatable suspension adjust input 172 has been actuated, as represented by block 902. If driver actuatable suspension adjust input 172 has been actuated, a driver actuatable suspension adjust input event is detected, as represented by block 904 and processing sequence 900 is completed. If driver actuatable suspension adjust input 172 has not been actuated, shock damping logic 150 checks to see of a driver actuatable suspension adjust input timeout counter is active and, if so, has it elapsed, as represented by block 908. If the driver actuatable suspension adjust input timeout has elapsed, shock damping logic 150 determines that a driver actuatable suspension adjust input event has not been detected, as represented by block 910 and processing sequence 900 is complete. If the driver actuatable suspension adjust input timeout has not elapsed, shock damping logic 150 keeps the current state of the driver actuatable suspension adjust input event status, as represented by block 912, and processing sequence 900 is complete.

Figure 19A:
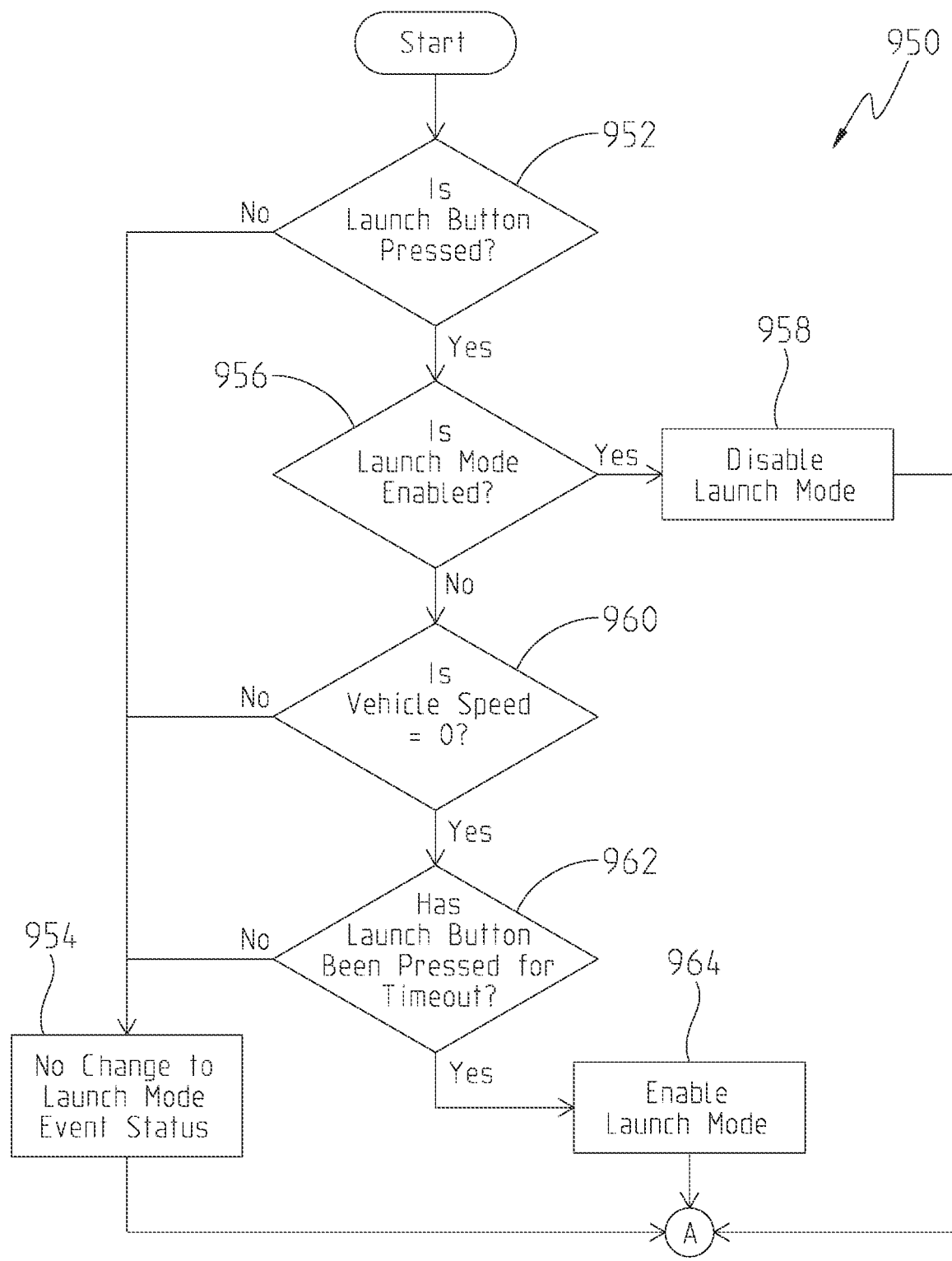
FIGS. 19A and 19B illustrate an exemplary processing sequence of the shock damping logic of the electronic controller of FIG. 6 for detecting an exemplary launch mode event.
Figure 19B:
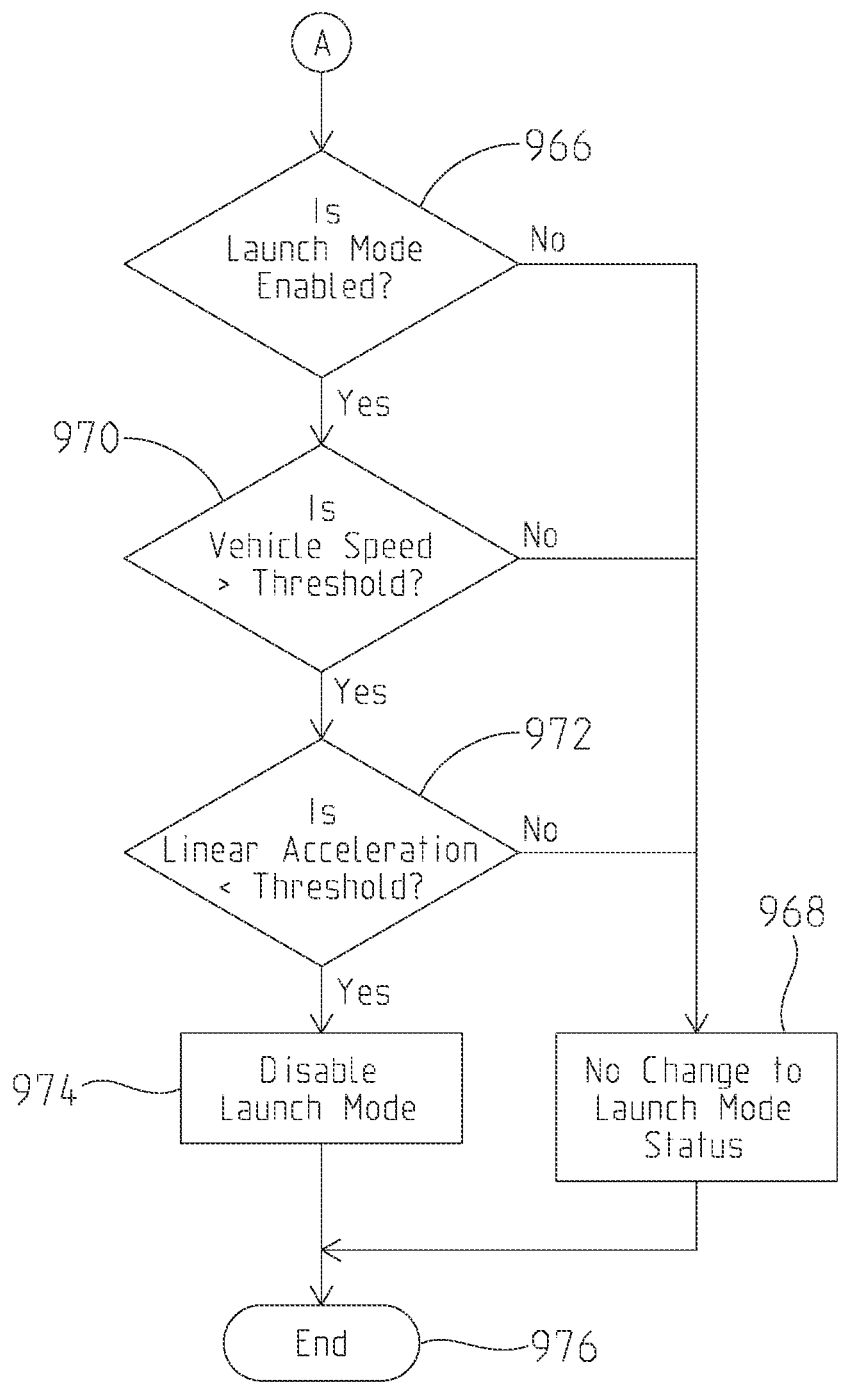

FIGS. 19A and 19B illustrate an exemplary processing sequence 950 of the shock damping logic 150 of the electronic controller 200 of FIG. 6 for detecting an exemplary launch mode event. Referring to FIG. 19A, shock damping logic 150 monitors to determine if a launch mode input 174 has been actuated, as represented by block 952. If launch mode input 174 has not been actuated then no change is made to the launch mode event status, as represented by block 954. If launch mode input 174 has been actuated, shock damping logic 150 determines if a launch mode is currently active, as represented by block 956. If a launch mode is currently active, then the actuation of launch mode input 174 causes the launch mode to be disabled, as represented by block 958. If a launch mode is not currently enabled, shock damping logic 150 based on vehicle speed sensor 139 determines if the speed of snowmobile 10 is zero, as represented by block 960. If the vehicle speed is not zero, no change is made to the launch mode status, as represented by block 954. If the vehicle speed is zero, shock damping logic 150 determines if the launch button 174 has been actuated for timeout, as represented by block 962. If not, no change is made to the launch mode status, as represented by block 954. If so, shock damping logic 150 enables the launch mode, as represented by block 964.

Referring to FIG. 19B, shock damping logic 150 determines if the launch mode is enabled, as represented by block 966. If not, no change is made to the launch mode status, as represented by block 968. If the launch mode is enabled, shock damping logic 150 determines based on vehicle speed sensor 139 if the vehicle speed is above a threshold, as represented by block 970. If not, no change is made to the launch mode status, as represented by block 968. If the vehicle speed is above the threshold then shock damping logic 150 determines if the linear acceleration of snowmobile 10 along axis 160 is less than a threshold, as represented by block 972. If not, no change is made to the launch mode status, as represented by block 968. If the linear acceleration of snowmobile 10 along axis 160 is less than the threshold, shock damping logic 150 disables the launch mode because snowmobile 10 is traveling closer to a constant speed than quickly accelerating, as represented by block 974.

FIG. 20 illustrates an exemplary processing sequence 1000 of the shock damping logic 150 of the electronic controller 200 of FIG. 6 for detecting an exemplary one ski event. shock damping logic 150 based on IMU 132 monitors if a roll rate and/or angle of snowmobile 10 about axis 160 is greater than a low threshold, as represented by block 1002. If so, shock damping logic 150 then checks to see if the monitored roll rate and/or angle is less than a high roll rate and/or angle threshold, as represented by block 1004. If the vehicle roll rate and/or angle is in the range between the low threshold and the high threshold, a one ski event is detected, as represented by block 1006, and processing sequence 1000 is completed, as represented by block 1008. Returning back to block 1002, if the vehicle roll rate and/or angle is not greater than the low threshold, shock damping logic 150 determines if the vehicle roll rate and/or angle is less than the low threshold minus the hysteresis of the IMU 132, as represented by block 1010. If not, no change is made by shock damping logic 150 to the one ski event status, as represented by block 1014. If so, shock damping logic 150 determines that a one ski event is not detected, as represented by block 1012 and processing sequence 1000 is completed, as represented by block 1008. Returning to block 1004, if the vehicle roll rate and/or angle is not less than the high threshold, shock damping logic 150 determines that a one ski event is not detected, as represented by block 1012 and processing sequence 1000 is completed, as represented by block 1008.

In embodiments, power is provided to front track adjustable shock absorber 144 and/or rear track adjustable shock absorber 146 through a wired connection routed through the suspension components or entering an interior of the track from a lateral side. In embodiments, communication signals are provided to and/or sent by front track adjustable shock absorber 144 and/or rear track adjustable shock absorber 146 through a wired connection routed through the suspension components or entering an interior of the track from a lateral side. In embodiments, both communication signals and power are provided to/from front track adjustable shock absorber 144 and/or rear track adjustable shock absorber 146 through a wired connection routed through the suspension components or entering an interior of the track from a lateral side. In embodiments, at least one of front track adjustable shock absorber 144 and rear track adjustable shock absorber 146 include a power source and/or receive/transmit communication signals to controller 100 wirelessly.

In embodiments, snowmobile 10 includes a demo mode to illustrate the functionality of right front adjustable shock absorber 140, left front adjustable shock absorber 142, front track adjustable shock absorber 144, and rear track adjustable shock absorber 146. In one embodiment, snowmobile 10 includes a battery and an operator input is provided to activate accessory power on snowmobile 10. In this example, an operator is able to select different operating modes (comfort, handling, rough trail) and/or input adjustments to right front adjustable shock absorber 140, left front adjustable shock absorber 142, front track adjustable shock absorber 144, and rear track adjustable shock absorber 146. In one example, an operator can select a left turn option and experience the change in the damping characteristics for right front adjustable shock absorber 140, left front adjustable shock absorber 142, front track adjustable shock absorber 144, and rear track adjustable shock absorber 146 for a left turn. In another embodiment, snowmobile 10 does not include a battery. In this example, a power connection is provided on snowmobile 10 which allows for an external power source to be plugged into snowmobile 10 to power snowmobile 10 to operate in the demo mode.

In embodiments, during operation of vehicle 10 or 10', the damping characteristics of at least one of front track adjustable shock absorber 144 and rear track adjustable shock absorber 146 may be further adjusted to alter handling. In examples, the base damping profile for a given mode (such as comfort or sport), predicted acceleration damping profile (longitudinal or lateral), braking damping profile, and cornering damping profile include adjustments to damping characteristics of at least one of front track adjustable shock absorber 144 and rear track adjustable shock absorber 146.

During normal straight line driving (no appreciable cornering or change in acceleration), the base damping characteristics of front track adjustable shock absorber 144 may be different from rear track adjustable shock absorber 146 or the same as rear track adjustable shock absorber 146. Changes in driving, such as cornering or changes in acceleration may result in adjustments to the base damping profile.

For example, in the comfort mode, during normal straight line driving, front track adjustable shock absorber 144 has a first setup relative to rear track adjustable shock absorber 146 in compression damping (stiffer or the same). This setup biases snowmobile 10 balance to have less ski pressure on the ground for skis 16 and generally less positive tracking of skis 16. The compression damping of front track adjustable shock absorber 144 is still soft enough to not sacrifice ride comfort. When snowmobile 10 brakes, decelerates or corners or is predicted to do so; the compression damping of front track adjustable shock absorber 144 is increased relative to its previous state. This adjustment prevents weight transfer to skis 16 and makes the turning effort of snowmobile 10 less with sacrificed traction on skis 16.

In another example, in sport mode, during normal driving, front track adjustable shock absorber 144 has a first setup relative to rear track adjustable shock absorber 146 in compression damping (softer or the same). This setup biases snowmobile 10 balance to have more ski pressure on the ground for skis 16 and generally more positive tracking of skis 16. When snowmobile 10 brakes, decelerates or corners or is predicted to do so; the compression damping of front track adjustable shock absorber 144 is decreased relative to its previous state. This adjustment adds weight transfer to skis 16 and creates increased traction on skis 16 at the sacrifice of increased steering effort.

In embodiments, electronic controller 100 monitors the outputs of IMU 132 (a three-axis accelerometer and a three-axis gyroscope) to evaluate terrain and/or driver aggressiveness. Driver aggressiveness may be monitored by the longitudinal acceleration and lateral acceleration experienced by vehicle 10. Further, throttle position, brake pressure, and steering angle, and steering velocity may provide indicators. Electronic controller 100 may monitor these factors and adjust the damping characteristics of one or more of right front adjustable shock absorber 140, left front adjustable shock absorber 142, front track adjustable shock absorber 144, and rear track adjustable shock absorber 146 based thereon. Terrain type may be monitored by longitudinal acceleration, lateral acceleration, vertical acceleration, and all three angular rates of IMU 132. In embodiments, the outputs are analyzed to determine the frequency response of each. The frequency responses may be determined through one or more bandpass filters, fast Fourier transform, or other methods. For example, the roll angular frequency response may be monitored with a bandpass filter for frequencies in a first range, such as 8-15 Hertz, to provide an indication of chatter. The monitored frequency response for one or more of the outputs are compared to stored ranges for different terrain types and the damping characteristics of one or more of right front adjustable shock absorber 140, left front adjustable shock absorber 142, front track adjustable shock absorber 144, and rear track adjustable shock absorber 146 are adjusted based thereon.

In embodiments, electronic controller 100 also monitors GPS sensor 131. A given location might indicate a first terrain type based on the frequency responses of the IMU 132 on a first day, such as fresh snow, and a second terrain type based on the frequency responses of the IMU 132 on a second day, such as hard snow. Based on those different terrain types and the historical data of the location, electronic controller may adjust the damping characteristics of one or more of right front adjustable shock absorber 140, left front adjustable shock absorber 142, front track adjustable shock absorber 144, and rear track adjustable shock absorber 146 to make the hard snow of the second day feel more like the fresh snow of the first day. This provides the ability for snowmobile 10 to have the same feel for the same location on different days even if the terrain characteristics have changed.

In embodiments, sensors 130 includes a sensor which monitors if rear suspension assembly 26 is in a coupled state or uncoupled state. An exemplary sensor is a position sensor, an angular sensor, a pressure sensor, or a contact sensor which monitors when the suspension arm contacts a coupling block of rear suspension assembly 26. In embodiments, the damping characteristics (compression and/or rebound) of front track adjustable shock absorber 144 and/or rear track adjustable shock absorber 146 are adjusted based on whether rear suspension assembly 26 is in a coupled state or uncoupled state.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A snowmobile for propelled movement relative to the ground, comprising
a plurality of ground engaging members including an endless track positioned along a centerline vertical longitudinal plane of the snowmobile having a lateral width, a left front ski positioned on a left side of the centerline vertical longitudinal plane of the snowmobile, and a right front ski positioned on a right side of the centerline vertical longitudinal plane of the snowmobile;
a frame supported by the plurality of ground engaging members;
a steering system supported by the frame and operatively coupled to the left front ski and the right front ski to control a direction of travel of the snowmobile;
a left ski suspension operatively coupling the left front ski to the frame;
a right ski suspension operatively coupling the right front ski to the frame;

a track suspension operatively coupling the endless track to the frame, the track suspension including a first adjustable shock absorber, the first adjustable shock absorber having at least one adjustable damping characteristic, the first adjustable shock absorber being laterally positioned within the lateral width of the endless track;

a plurality of sensors supported by the ground engaging members; and at least one electronic controller operatively coupled to the first adjustable shock absorber, the at least one electronic controller based on a sensor measurement from a sensor spaced apart from each of the left ski suspension, right ski suspension, and track suspension operable to determine an airborne condition, and in response to the airborne condition the electronic controller alters at least one damping characteristic of the first adjustable shock absorber, wherein the at least one damping characteristic includes a rebound damping characteristic and the controller is operable to alter the rebound damping characteristic based upon a length of time that the snowmobile has been airborne.

2. The snowmobile of claim 1, the first adjustable shock absorber of the first suspension is positioned within an interior bounded by the endless track.

3. The snowmobile of claim 1, the track suspension further comprises a second adjustable shock absorber having at least one adjustable damping characteristic, the second adjustable shock absorber being laterally positioned within the lateral width of the endless track, the first adjustable shock absorber is a front track adjustable shock absorber and the second adjustable shock absorber is a rear track adjustable shock absorber.

4. The snowmobile of claim 3, the second adjustable shock absorber of the track suspension is positioned within the interior bounded by the endless track.

5. The snowmobile of claim 3, the second adjustable shock absorber of the track suspension is positioned outside of the interior bounded by the endless track.

6. The snowmobile of claim 1, wherein the at least one electronic controller alters the at least one damping characteristic of the first adjustable shock absorber while the snowmobile is moving relative to the ground.

7. The snowmobile of claim 6, wherein the at least one electronic controller alters a compression damping characteristic of the first adjustable shock absorber.

8. The snowmobile of claim 1, further comprising a third adjustable shock absorber and a fourth adjustable shock absorber, the third adjustable shock absorber is part of the left ski suspension operatively coupling the left front ski to the frame and the fourth adjustable shock absorber is part of the right ski suspension operatively coupling the right front ski to the frame.

9. The snowmobile of claim 1, wherein a first damping characteristic of the first adjustable shock absorber is adjusted by the at least one electronic controller based on a longitudinal acceleration of the snowmobile.

10. The snowmobile of claim 1, wherein a first damping characteristic of the first adjustable shock absorber is adjusted by the at least one electronic controller based on a vehicle pitch motion of the snowmobile.

11. The snowmobile of claim 1, wherein the at least one electronic controller adjusts a compression damping characteristic of the first adjustable shock absorber in response to the snowmobile being airborne.

12. The snowmobile of claim 11, wherein the adjustment of the compression damping characteristic of the first adjustable shock absorber is dependent on the length of time that the snowmobile has been airborne.

13. A method of controlling ride characteristics of a snowmobile, the method comprising the steps of:

monitoring with at least one electronic controller a plurality of sensors supported by the snowmobile while the snowmobile is moving;

predictively determining a longitudinal acceleration of the snowmobile based on a current sensor value of at least one sensor of the plurality of sensors; and adjusting with the at least one electronic controller at least one damping characteristic of an adjustable shock absorber while the vehicle is moving, based on the predicted longitudinal acceleration of the vehicle, the adjustable shock absorber being apart of a suspension of an endless track of the snowmobile.

14. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a longitudinal acceleration of the snowmobile.

15. The method of claim 14, wherein the longitudinal acceleration of the snowmobile is measured by at least one sensor.

16. The method of claim 15, further comprising the steps of: determining the longitudinal acceleration of the snowmobile indicates an acceleration of the snowmobile; and changing a rebound damping characteristic of the adjustable shock absorber.

17. The method of claim 15, further comprising the steps of: determining the longitudinal acceleration of the snowmobile indicates an acceleration of the snowmobile; and changing a compression damping characteristic of the adjustable shock absorber.

18. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a predicted pitch motion of the snowmobile.

19. The method of claim 18, wherein the predicted pitch motion of the snowmobile is based on the predicted vehicle longitudinal acceleration.

20. The method of claim 18, wherein step of adjusting the at least one damping characteristic based on the predicted pitch motion of the snowmobile includes determining the predicted vehicle longitudinal acceleration and determining a direction of travel of the snowmobile.

21. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a turning of the snowmobile.

22. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on a braking of the snowmobile.

23. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic based on the snowmobile being airborne.

24. The method of claim 13, wherein the step of adjusting with the at least one electronic controller the at least one damping characteristic of the adjustable shock absorber which is apart of the suspension of the endless track of the snowmobile while the vehicle is moving, includes the step of adjusting the at least one damping characteristic to promote a lifting of the skis of the snowmobile.

25. The method of claim 24, wherein the step of adjusting the at least one damping characteristic to promote the lifting of the skis of the snowmobile includes the steps of decreasing a compression damping characteristic of the adjustable shock absorber.

26. The method of claim 25, wherein the step of adjusting the at least one damping characteristic to promote the lifting of the skis of the snowmobile includes the steps of increasing a rebound damping characteristic of a second adjustable shock absorber associated with the suspension of the endless track.

27. A method of controlling a damping characteristic of at least one adjustable shock absorber of a vehicle being operated by a driver, the method comprising:
receiving with an electronic controller a plurality of inputs from a plurality of sensors supported by the vehicle;
predictively determining a longitudinal acceleration of the vehicle based on a current sensor value of at least one sensor of the plurality of sensors; and
adjusting the damping characteristic of the at least one adjustable shock absorber of the vehicle based on the predicted longitudinal acceleration of the vehicle.

28. The method of claim 27, wherein the step of adjusting the damping characteristic of the at least one adjustable shock absorber of the vehicle based on the predicted longitudinal acceleration of the vehicle, includes the step of adjusting the at least one damping characteristic based on a predicted pitch motion of the snowmobile.

29. The method of claim 28, wherein the at least one adjustable shock absorber includes a left adjustable shock absorber and a right adjustable shock absorber, and in response to a predicted increase in vehicle pitch motion, altering a damping characteristic of the left adjustable shock absorber and a damping characteristic of the right adjustable shock absorber.

30. The method of claim 29, wherein the at least one adjustable shock absorber includes a rear adjustable shock absorber, and in response to a predicted increase in vehicle pitch motion, altering the damping characteristic of the rear adjustable shock absorber.

31. The method of claim 30, wherein each of the left adjustable shock absorber, right adjustable shock absorber, and rear adjustable shock absorber have a first damping characteristic and a second damping characteristic, the second damping characteristic being different than the first damping characteristic, and in response to a predicted increase in vehicle pitch motion, increasing the first damping characteristic of the left adjustable shock absorber and the right adjustable shock absorber and increasing the second damping characteristic of the rear adjustable shock absorber.

32. The method of claim 27, further comprising the steps of: predictively determining a longitudinal pitch motion of the vehicle; and adjusting the damping characteristic of the at least one adjustable shock absorber of the vehicle based on the predicted longitudinal pitch motion of the vehicle.

33. The method of claim 32, wherein the predicted longitudinal acceleration is determined by the steps of: determining a predicted power for a prime mover of the snowmobile; determining an output power of the drivetrain based on the determined predicted power, the drivetrain including a CVT; determining a forward moving force of the snowmobile based on the determined output power of the drivetrain; determining a resultant forward moving force by subtracting at least one of a coast down force and an applied braking force from the determined forward moving force; and dividing the resultant forward moving force by a mass of the snowmobile to determine the predicted vehicle longitudinal acceleration.

* * * * *